United States Patent [19]
Taketomi et al.

[11] Patent Number: 5,978,354
[45] Date of Patent: Nov. 2, 1999

[54] OPTICAL TRANSMISSION SYSTEM AND TRANSMISSION LINE SWITCHING CONTROL METHOD

[75] Inventors: Hisashi Taketomi; Hatsumi Iino; Fumihiro Ikawa; Kanji Naito; Junichi Moriyama, all of Kawasaki, Japan

[73] Assignee: Fujitsu Limited, Kanagawa, Japan

[21] Appl. No.: 08/617,288

[22] Filed: Mar. 18, 1996

[30] Foreign Application Priority Data

Jul. 21, 1995 [JP] Japan ................................ 7-185377

[51] Int. Cl.[6] ................... H04J 1/16; H04J 3/08
[52] U.S. Cl. ............... 370/226; 370/228; 370/243; 340/825.01; 340/827
[58] Field of Search ...................... 370/216, 217, 370/219, 220, 221, 222, 223, 224, 225, 226, 227, 228, 242, 243, 246, 247, 248, 907, 360, 249; 359/110, 115, 117, 174, 176, 177; 340/827, 825.01

[56] References Cited

U.S. PATENT DOCUMENTS

| | | | |
|---|---|---|---|
| 4,598,399 | 7/1986 | Bath | 370/226 |
| 5,069,521 | 12/1991 | Hardwick | 359/110 |
| 5,163,041 | 11/1992 | Moriyama . | |
| 5,263,017 | 11/1993 | Nakajima et al. . | |
| 5,311,501 | 5/1994 | Takatsu . | |
| 5,343,464 | 8/1994 | Iino et al. . | |
| 5,457,555 | 10/1995 | Moriyama | 359/110 |
| 5,479,608 | 12/1995 | Richardson | 370/217 |
| 5,532,862 | 7/1996 | Tada et al. | 359/161 |
| 5,574,719 | 11/1996 | Ishiwatari | 370/351 |

Primary Examiner—Chau Nguyen
Assistant Examiner—Soon-Dong Hyun
Attorney, Agent, or Firm—Helfgott & Karas, PC.

[57] ABSTRACT

Disclosed is an optical transmission system for transmitting data via an optical transmission line in accordance with a frame format having overhead which includes a K1 byte used for a switching request and a K2 byte used to respond to the K1 byte. The optical transmission system includes N sets of working terminal stations, one set of protection terminal stations, N-number of optical transmission lines for interconnecting respective ones of the N sets of working terminal stations one optical protection transmission line for interconnecting the one set of protection terminal stations, repeater stations, which are provided in the optical transmission lines between the N sets of working terminal stations, for demultiplexing and outputting data extracted from the transmission lines or for multiplexing data and inserting the data in the transmission lines, protection transmission line connecting units, which are provided at positions in a protection transmission line corresponding to positions at which the repeater stations are disposed, for switching a failed transmission line to the protection transmission line in every section demarcated by the repeater stations. A working terminal station or repeater station that has detected occurrence of failure in a transmission line of a prescribed section sends K1 byte to and receives K2 byte from an opposing working terminal station or repeater station of the section via a protection terminal station or protection transmission line connecting unit and switches the failed transmission line section to the protection transmission line.

7 Claims, 45 Drawing Sheets

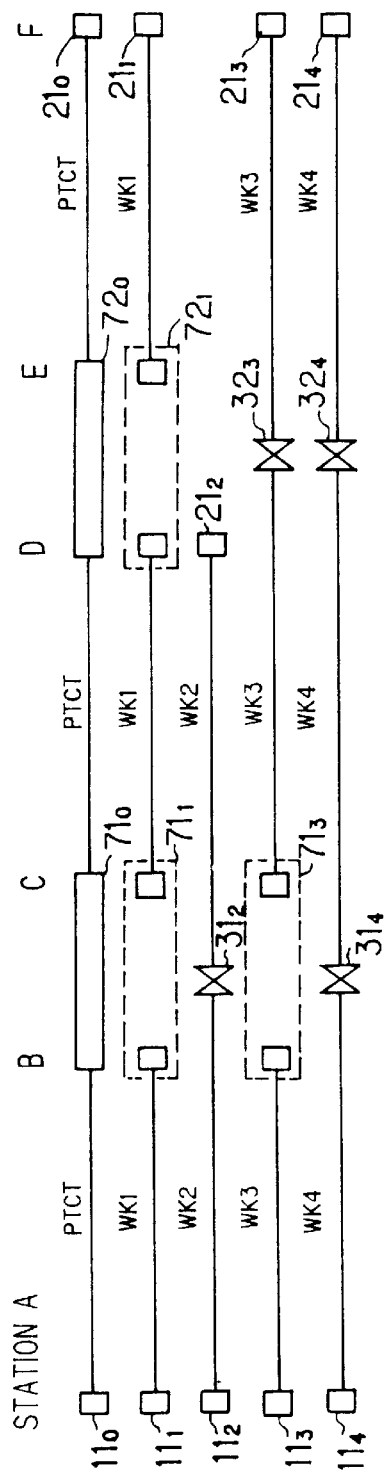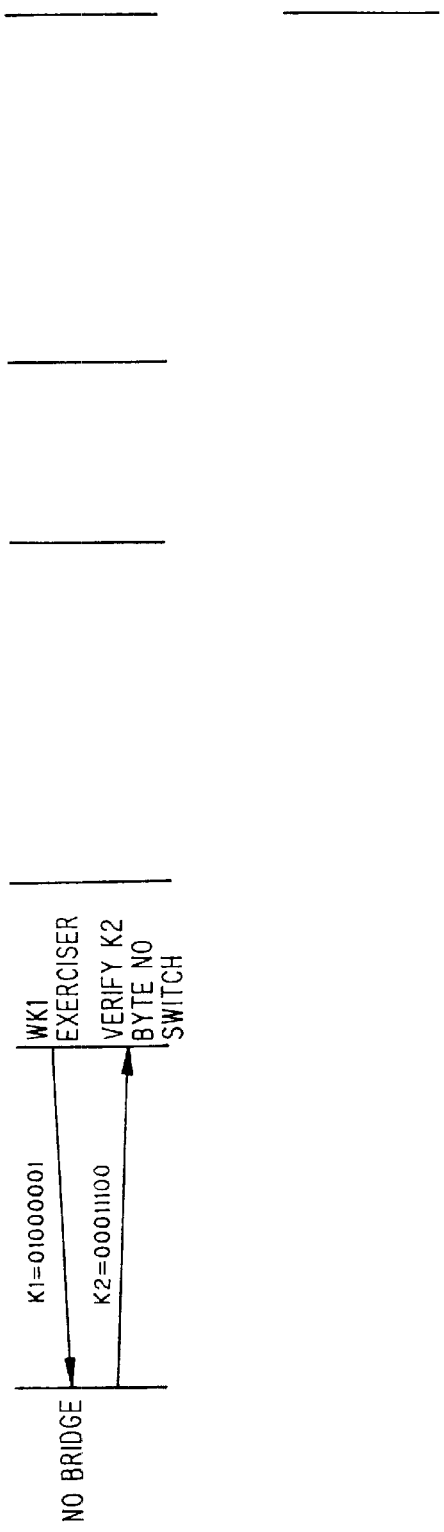
FIG. 20

FIG.21
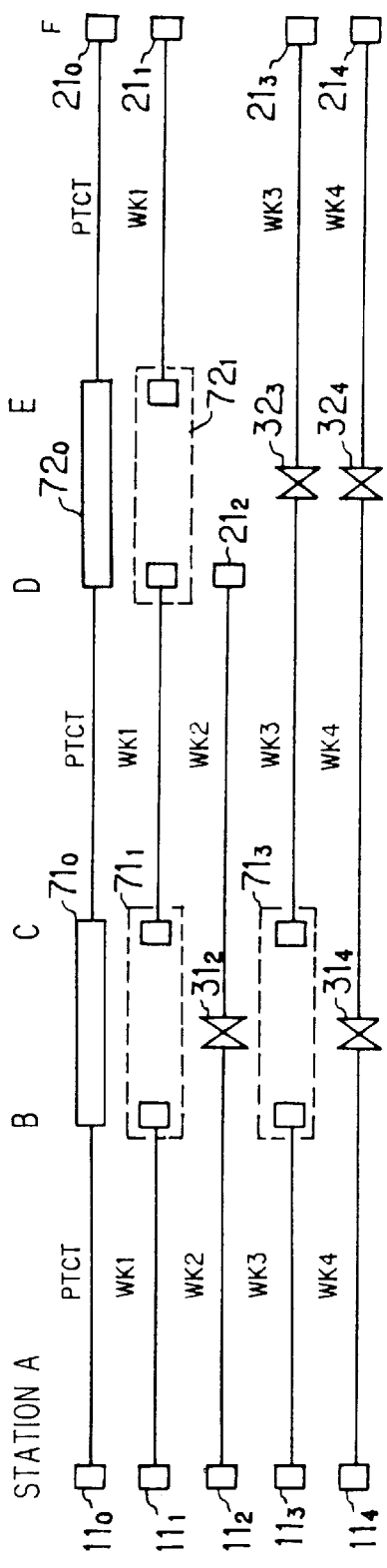
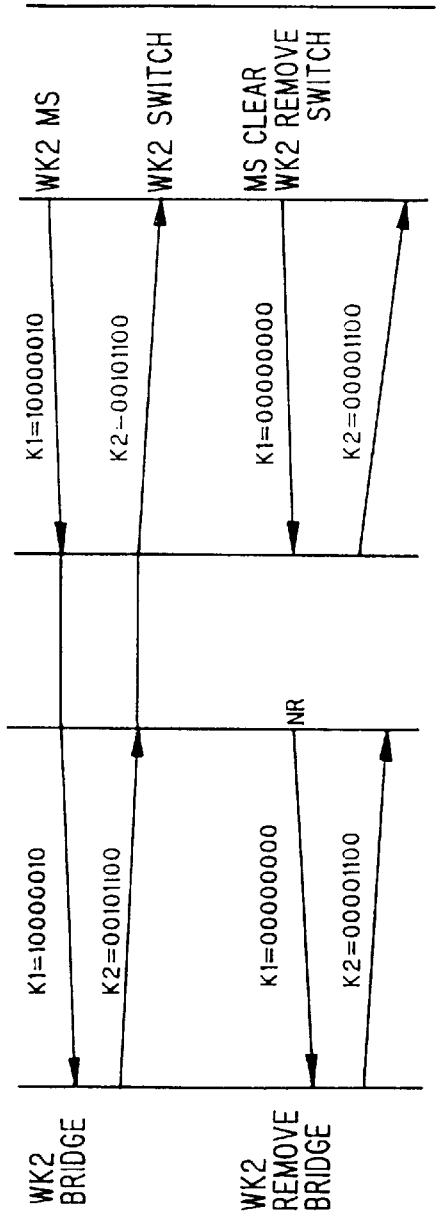

FIG.22
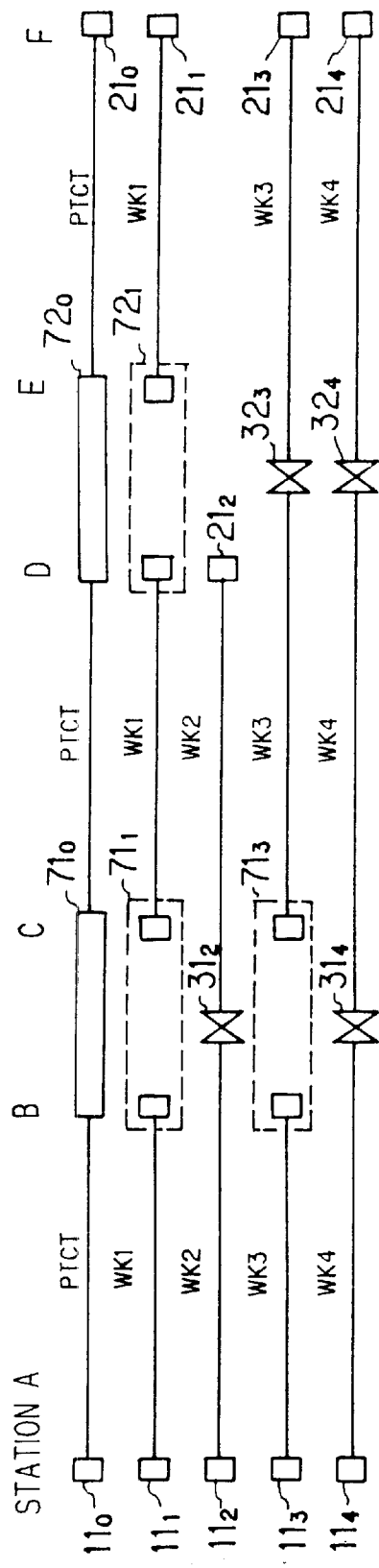
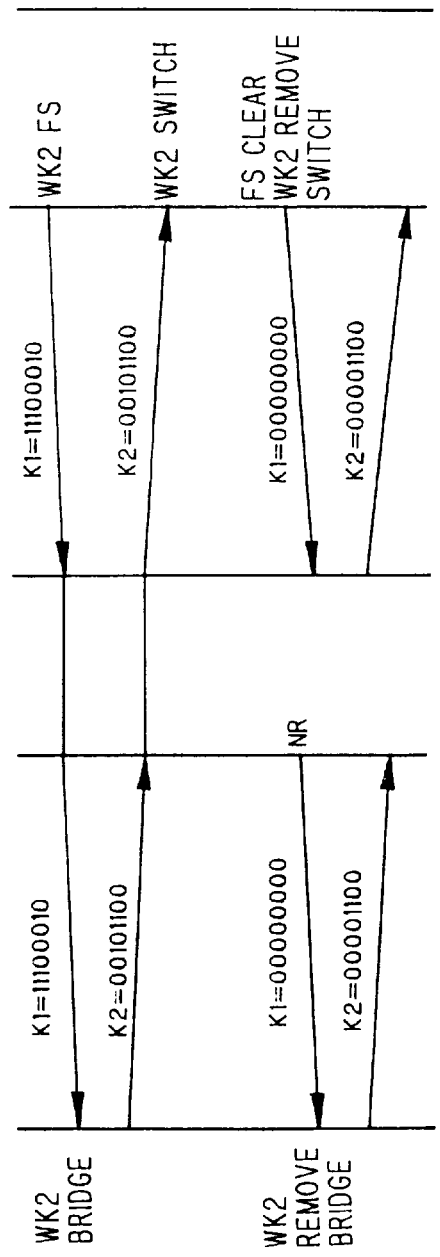

FIG. 23
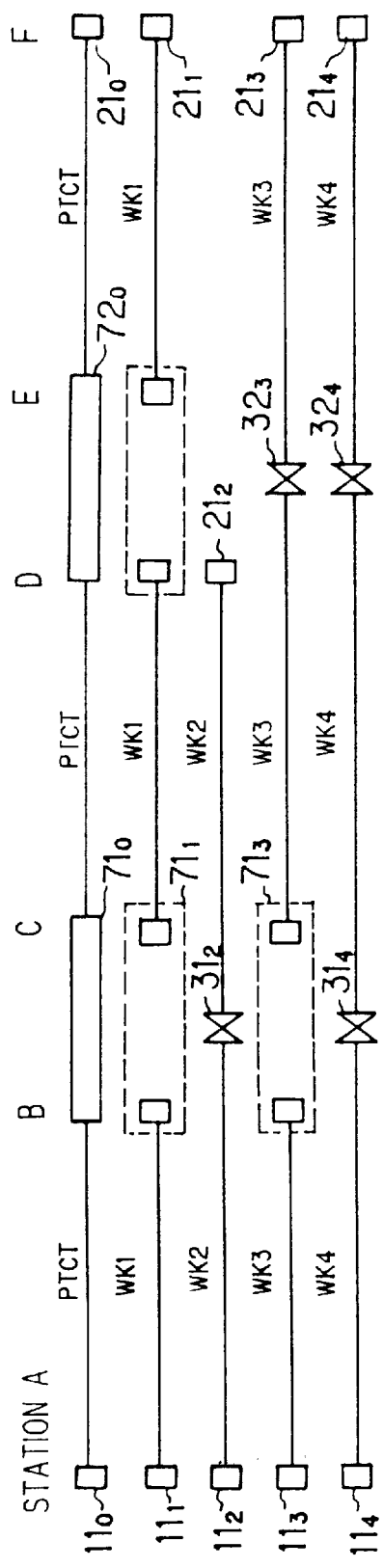
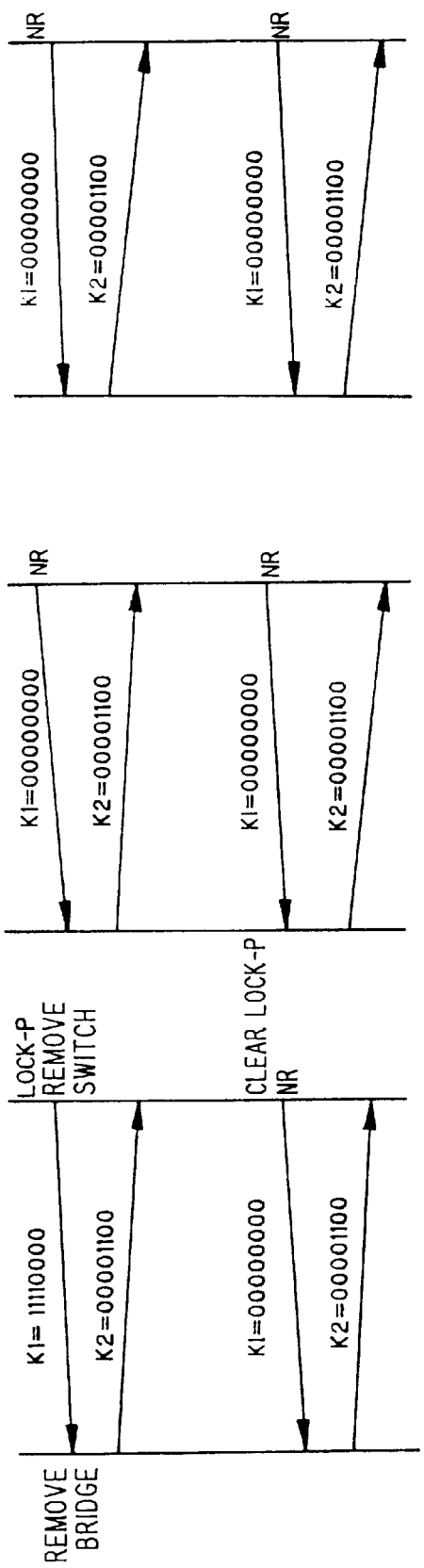
Lockout of PTCT

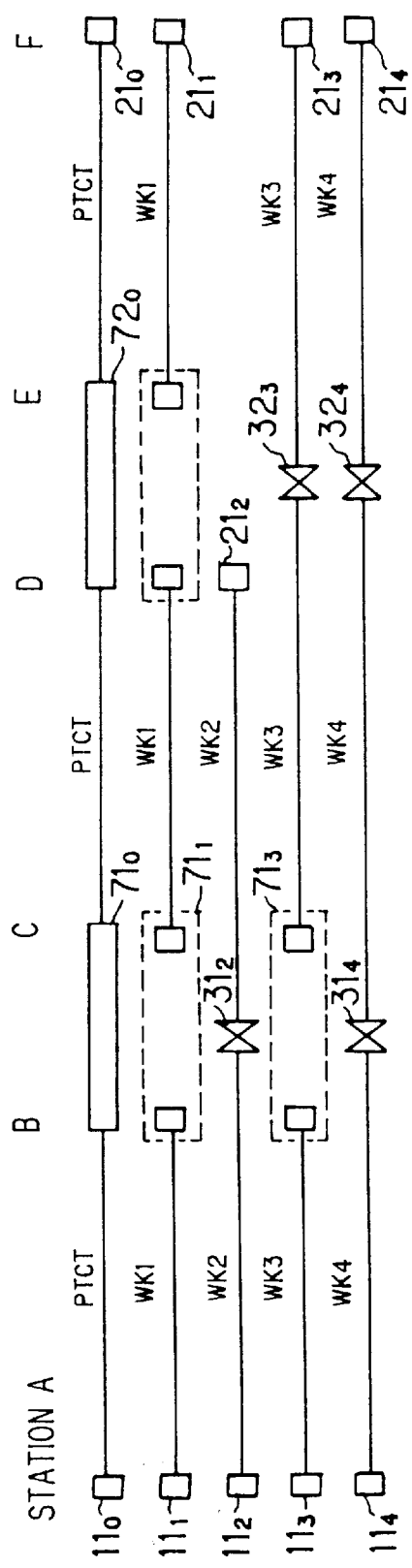
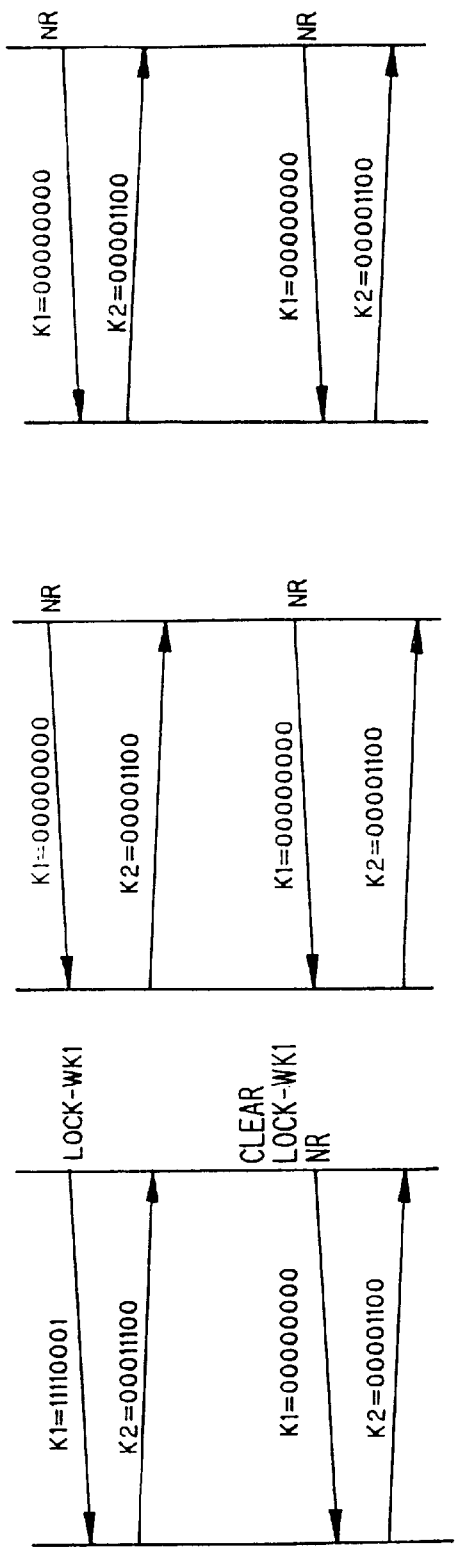
FIG. 24

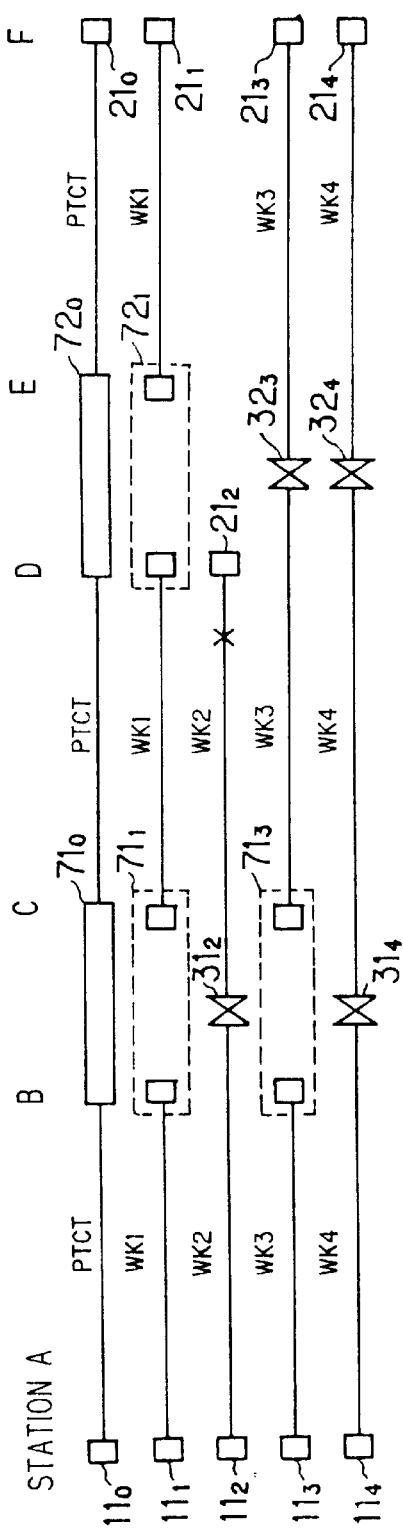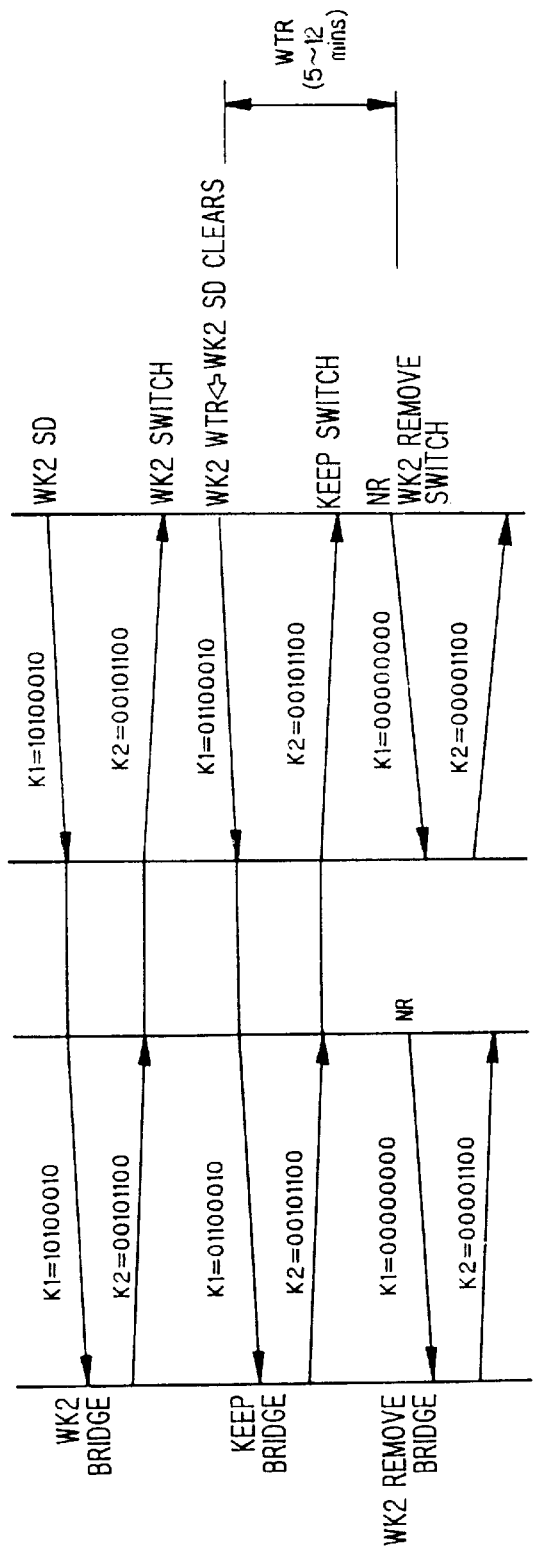
FIG. 25

FIG. 26
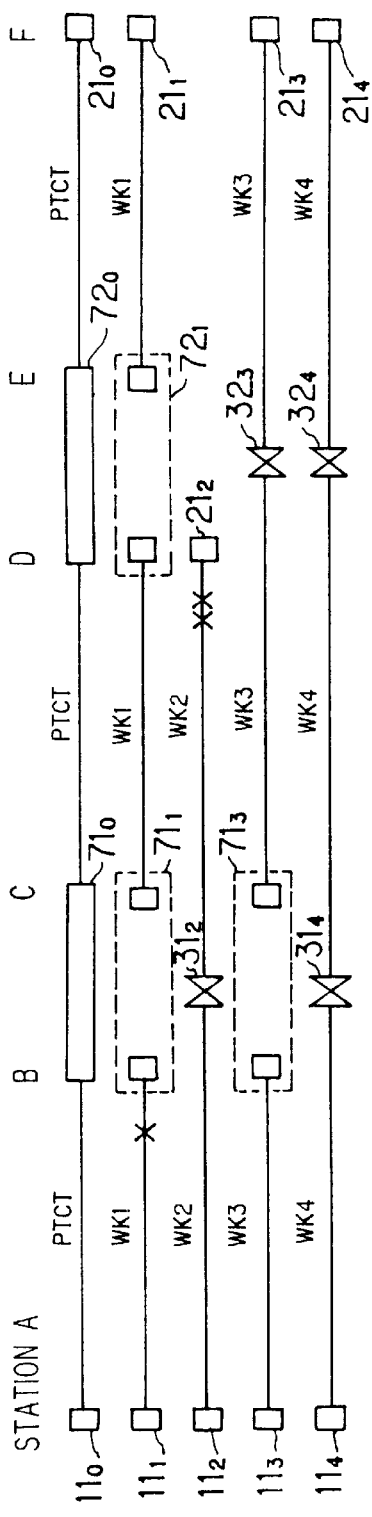
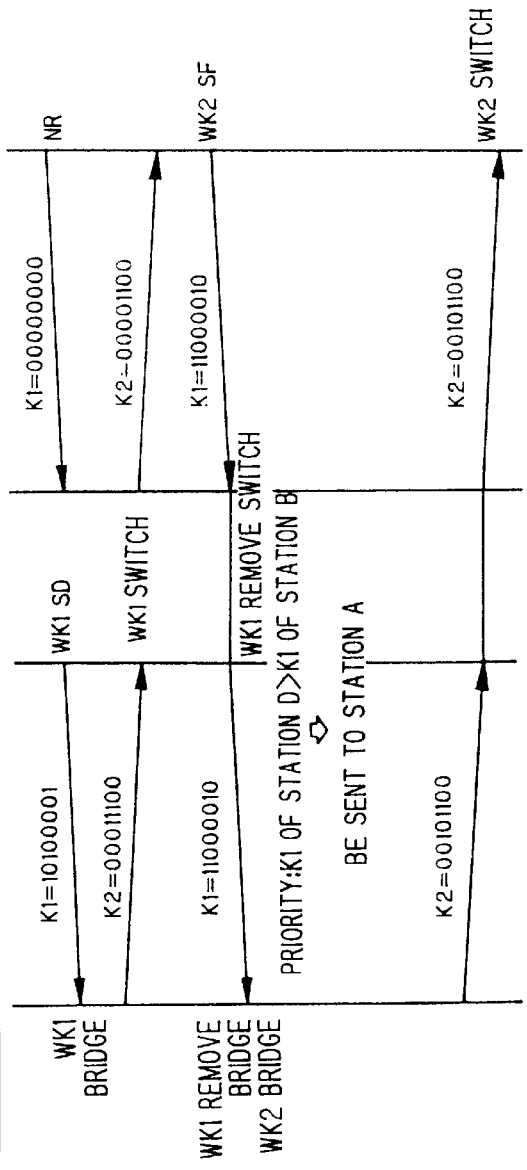

FIG. 27
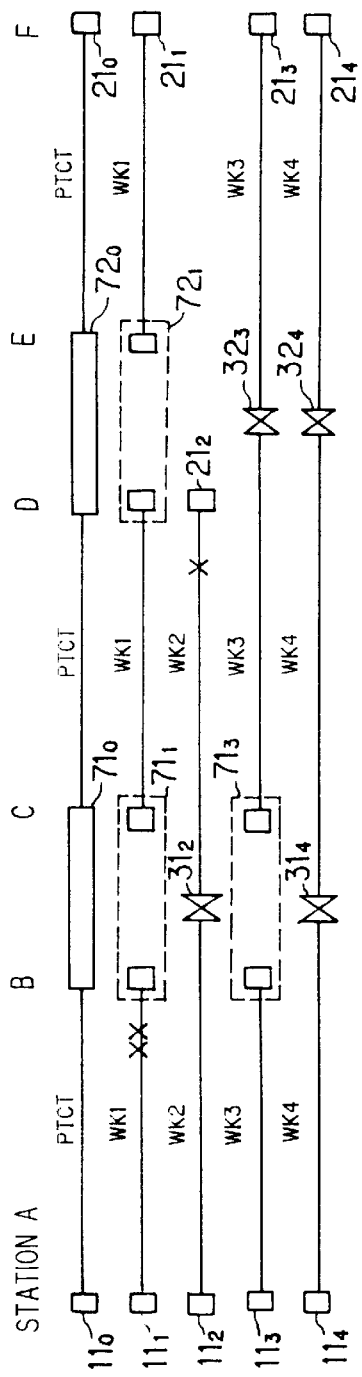
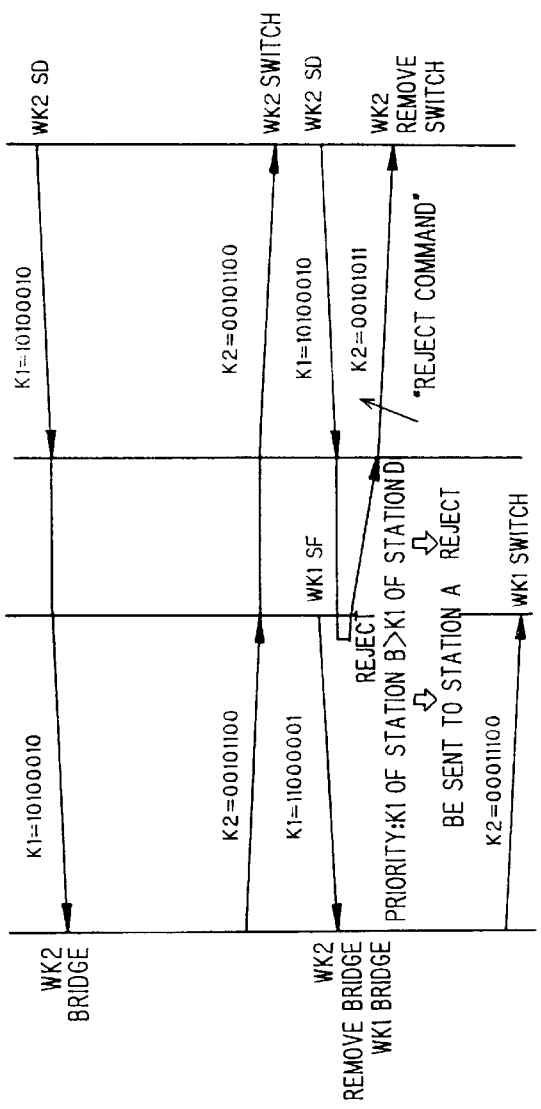

FIG.29
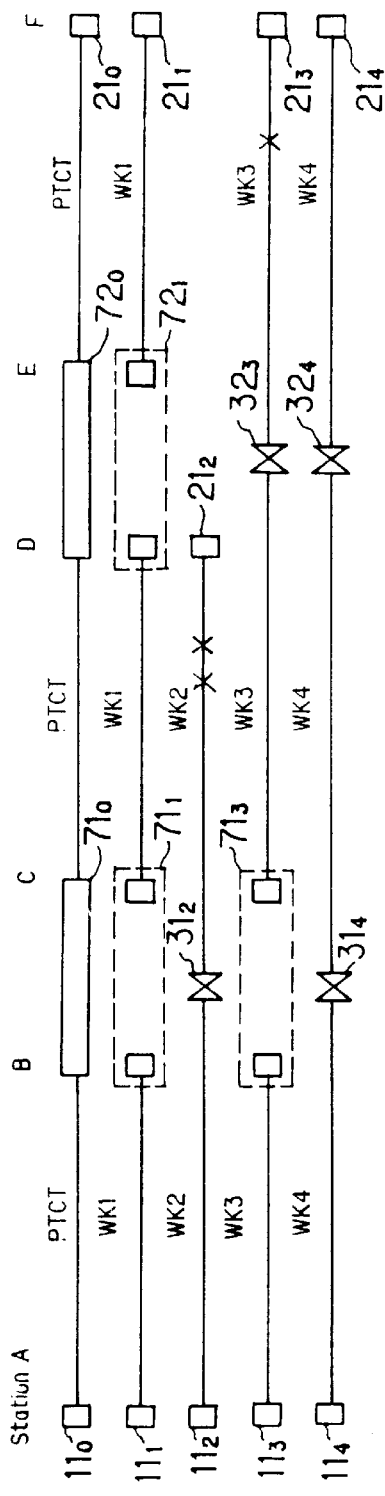
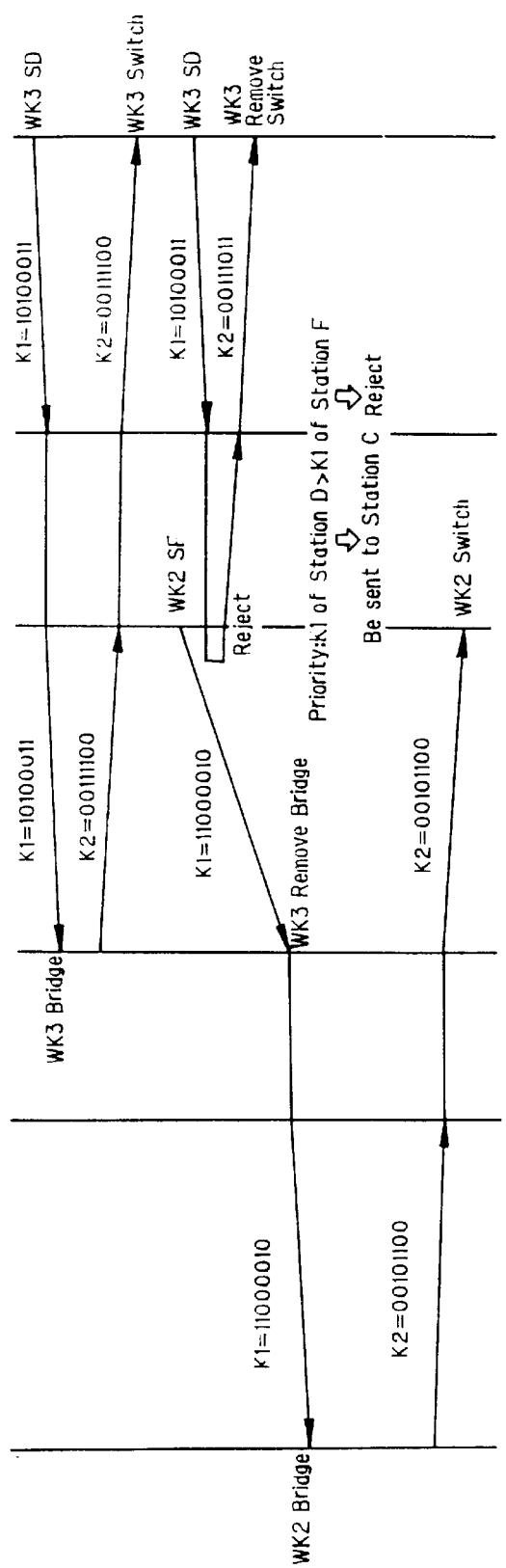

FIG. 30
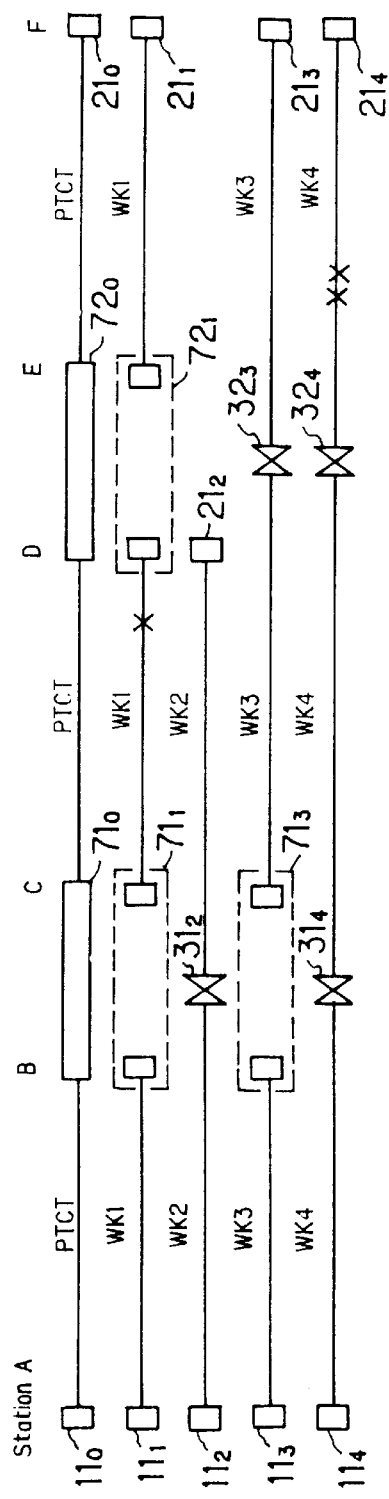
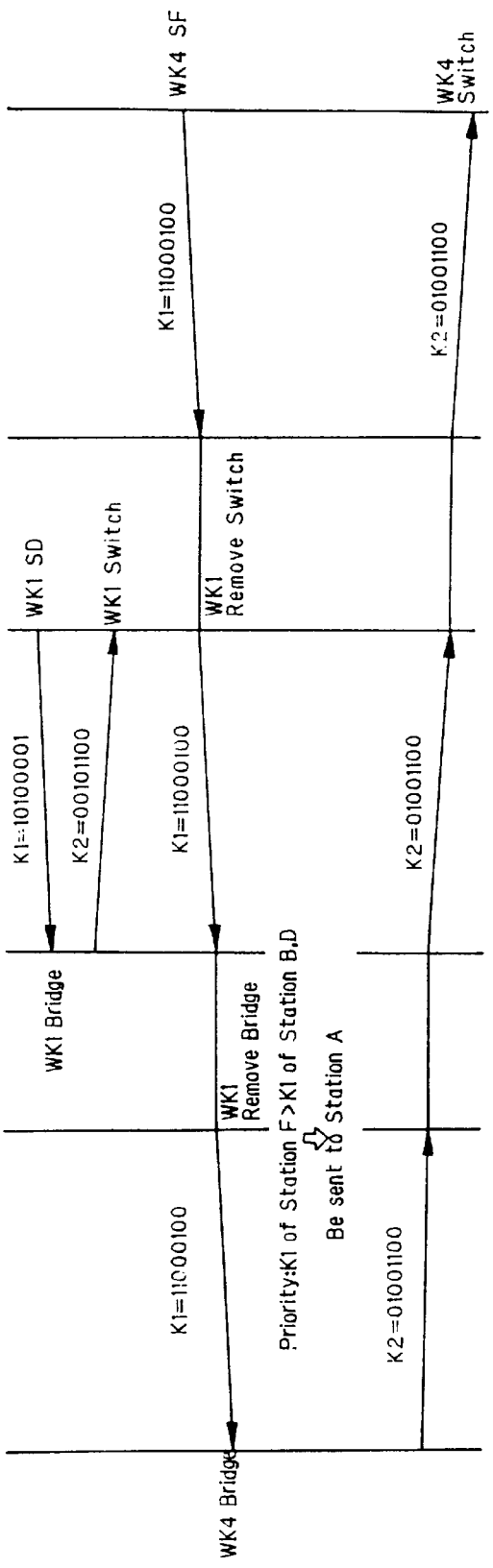

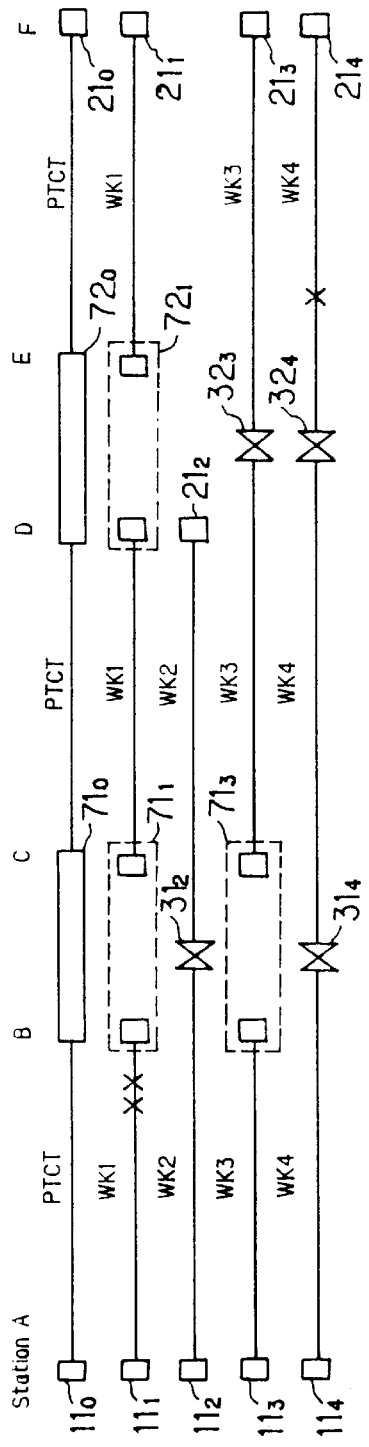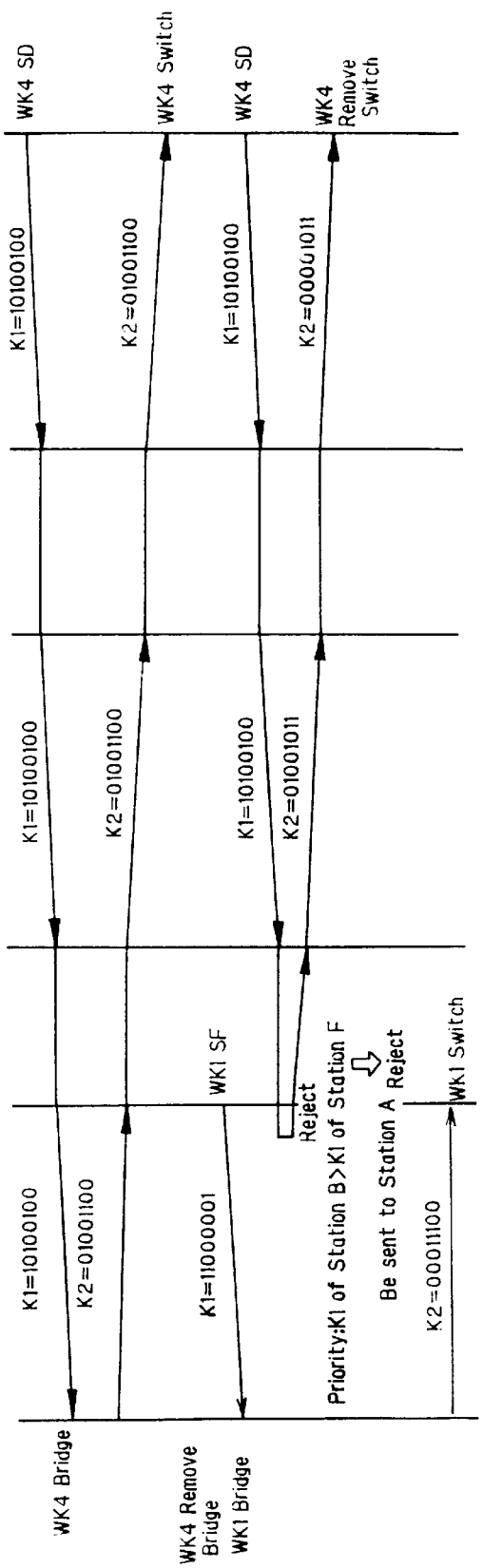
FIG.31

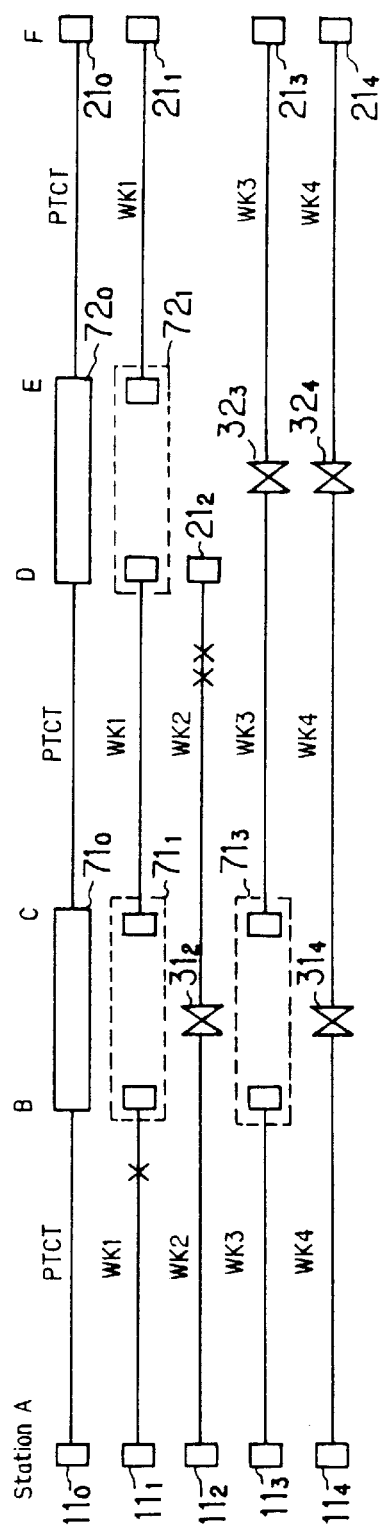
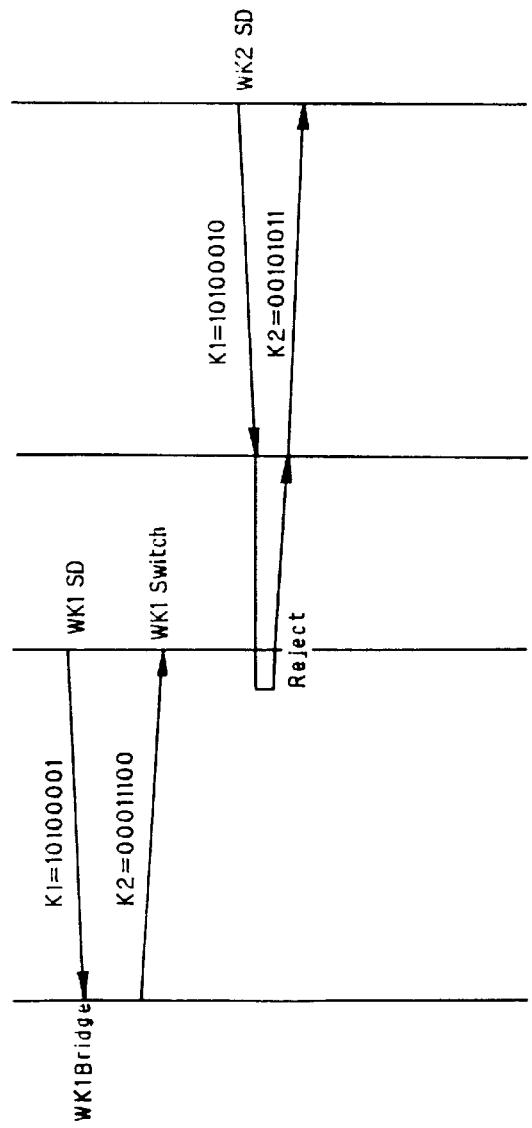
FIG.32

FIG.33
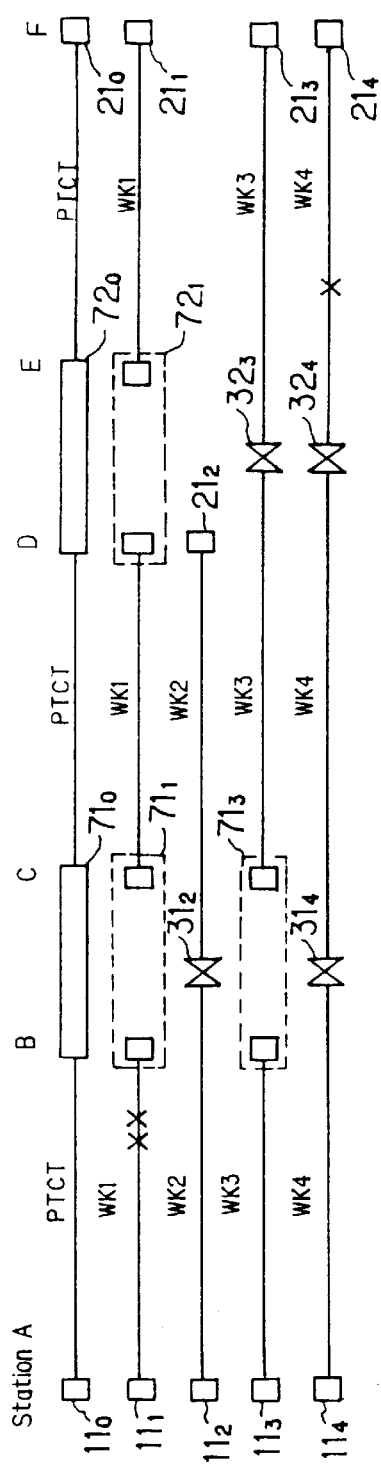
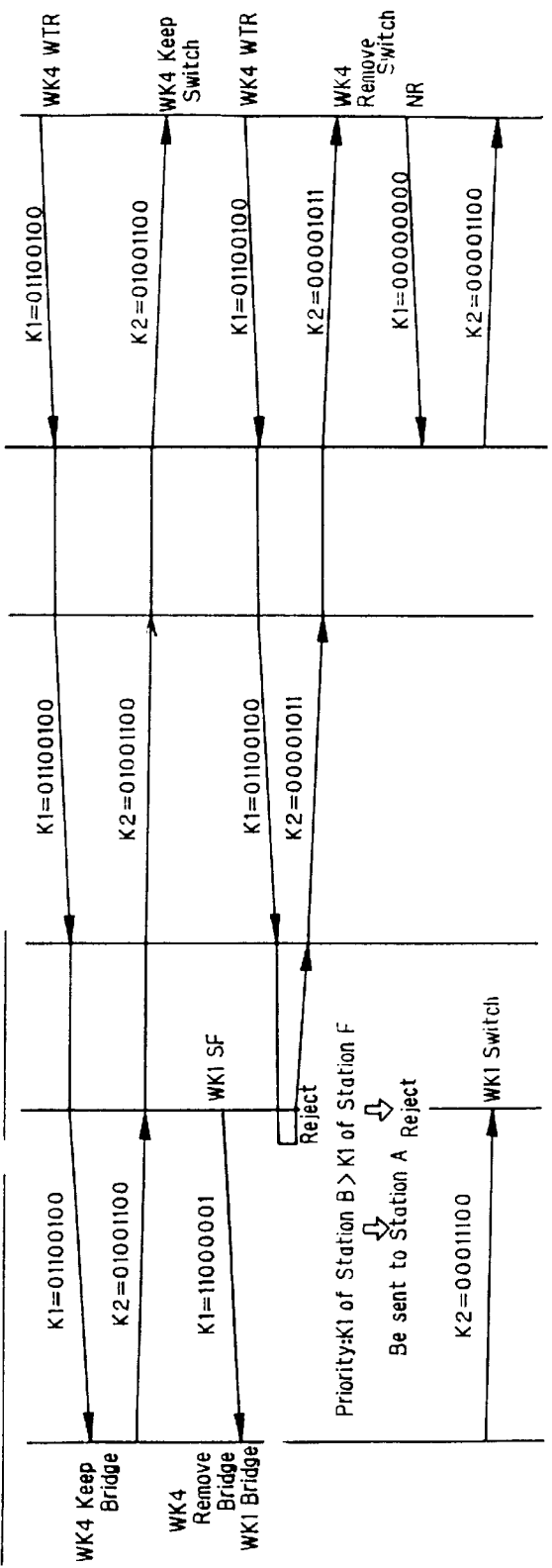

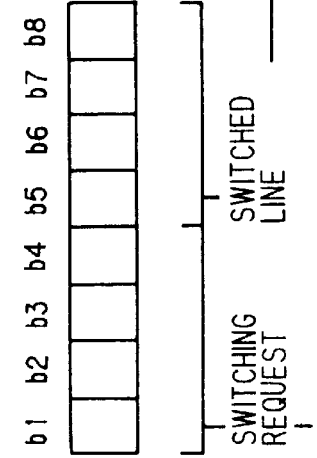

FIG. 45 (PRIOR ART)

| b5-8 | |
|---|---|
| 0000 | USED WHEN PTCT IS NOT USED, WHEN PTCT FAILS AND WHEN LOCKOUT OF PROTECTION IS REQUESTED |
| 0001 ~ 1110 | DESIGNATED WK1 ~ WK14 |
| 1111 | Extra traffic channel (Low-priority traffic) |

| b1-4 | SWITCHING REQUEST | REMARKS | |
|---|---|---|---|
| 1111 | Lockout of Protection | | |
| 1110 | Forced Switch | | 1+1 NON-REV NOT USED |
| 1101 | SF (High Priority) | 1:n ONLY | |
| 1100 | SF (Low Priority) | 1:n ONLY | |
| 1011 | SD (High Priority) | | (OK TO OMIT?) |
| 1010 | SD (Low Priority) | | |
| 1001 | — | | |
| 1000 | Manual Switch | | |
| 0111 | | | |
| 0110 | Wait-to-Restore | | |
| 0101 | Exerciser | | |
| 0100 | | | |
| 0011 | | | |
| 0010 | Reverse Request | | ONLY BIDIRECTIONAL |
| 0001 | Do Not Revert | | ONLY 1+1 NON-REV |
| 0000 | No Request | | 1+1 NON-REV NOT USED |

FIG. 46 (PRIOR ART)

| BIT | |
|---|---|
| $b_1 \sim b_4$ | • NULL WHEN RECEIVED K1 BYTE IS NULL CHANNEL (0)<br>• CHANNEL NUMBER BRIDGED FOR SAKE OF PROTECTION IN OTHER CASES |
| $b_5$ | • "1" ・・・ 1 + 1 NETWORK<br>• "0" ・・・ 1 : N NETWORK |
| $b_6 \sim b_8$ | • "101" ・・・ BIDIRECTIONAL SWITCHING<br>• "100" ・・・ UNIDIRECTIONAL SWITCHING<br>• "011"<br>  "010" } ・・ 1 : n D/I (DROP/INSERT) PROTECTION SWITCHING<br>  "001"<br>• "111" ・・・ AIS (Alame Indication Signal)<br>• "110" ・・・ FERF (Far End Receive Failure) |

OPTICAL TRANSMISSION SYSTEM AND TRANSMISSION LINE SWITCHING CONTROL METHOD

BACKGROUND OF THE INVENTION

The present invention relates to an optical transmission system and a method of controlling switching of a transmission line in the event of a transmission line failure. More particularly, the invention relates to an optical transmission system, which has N-number of currently working optical transmission lines and one protection (standby) optical transmission line, in which data is sent and received between stations via the transmission lines in a frame format having overhead, and to a 1:N transmission line switching control method in such a system.

Shelf

Several basic shelves are prepared, the selves are assembled to construct a terminal station, a repeater station and a signal regenerator, and these are used to construct an optical transmission system.

FIGS. 34A and 34B are diagrams illustrating an HS (high-speed) shelf, and FIGS. 35A and 35B are diagrams illustrating a TRIB (tributary) shelf. As shown in FIG. 34A, an HS shelf 150 has line-optical interfaces 151, 152 for interfacing OC-48 (2.4 Ghz) optical transmission lines, a switch 153, an alarm interface 154, a controller 155, a clock source 156, a tributary-side optical interface 157, and a tributary-side electrical interface 158. As shown in FIG. 34B, the line-optical interfaces 151, 152 respectively have O/E converters 151a, 152a, E/O converters 151b, 152b for converting electric signals to optical signals, demultiplexers (DMUX) 151c, 152c for demultiplexing a higher-order group signal (an OC-48 optical signal) into three types of signals STS-1, STS-3C, STS-12c, and multiplexers 151d, 152d for multiplexing the signals STS-1, STS-3C, STS-12c. The switch 153 has a function for passing the three types of signals demultiplexed by the demultiplexers 151c, 152c or for dropping these signals on the tributary side. Further, the switch 153 switches the signals STS-1, STS-3C, STS-12c, which have been inserted from the tributary side, to the E (East) or W (West) direction.

As shown in FIG. 35A, an HS shelf 160 has interfaces 161, 162 for lower-order group signals (DS 3×12ch, STS-1×12ch, OC-3/3c×2ch, OC-12/12C×1ch), a switch 163 and an interface 164 for interfacing the HS shelf. As shown in FIG. 35B, the tributary-side interfaces 161, 162 respectively have multiplexer/demultiplexers (MUX/DMUX) 161a, 162a for multiplexing the lower-order group signals to signals STS-1, STS-3C, STS-12c, entering these signals into the switch 163, demultiplexing signals that have entered from the switch 163 and then outputting these signals, and interfaces 161b, 162b for interfacing multiplexers located within station.

LTE, LNR ADM, REG

By combining the HS shelf 150 and TRIB shelf 160, it is possible to construct an LTE (line terminal equipment), which serves as a terminal station for an optical transmission line, as shown in FIGS. 36A, 36B, or an LNR ADM (linear add/drop multiplexer), which serves as a repeater station (D/I: drop/insert), as shown in FIG. 36C. In a case where the system is expanded, it is required that the terminal station of LTE construction be changed to a repeater station. In such case the two LTEs of FIGS. 36A and 36B are connected back to back, as depicted in FIG. 37, thereby forming a repeater station provided with a function equivalent to that of the LNR ADM having the add/drop function. Furthermore, a signal regenerator REG (regenerator) can be constructed by allowing signals to pass through using the switch of the HS shelf 150. In the LTEs illustrated in FIGS. 36A, 36B, only the line-optical interface on one side of the HS shelf is used.

Construction of Transmission System

A point-to-point optical transmission system can be constructed by using the LTEs, arranged as set forth above, as terminal stations (station A and station B) of an OS-48 optical transmission line, as illustrated in FIG. 38. Further, a ring system can be constructed by connecting LNR ADMs in a ring-shaped configuration, as shown in FIG. 39. Furthermore, a linear ADM system can be constructed by using the LTEs as terminal stations (stations A and C) and using the LNR ADM as a repeater (station B), as depicted in FIG. 40.

Further, as shown in FIG. 41, a 1+1 line switching point-to-point system can be constructed by adding 2.4 G switch controllers (2.4 G SW CONT) onto a 1+1 arrangement having one working line WORK1 and one protection (standby) line PTCT. Similarly, as shown in FIG. 42, a 1:N line switching point-to-point system can be constructed by adding 2.4 G switch controllers (2.4 G SW CONT) onto a 1:N arrangement having N-number of working lines WORK1~WORKN and one protection line PTCT.

Lower-order group signals are capable of being supported with regard to the LTE in the protection line as well. The function in which the LTE of the protection line supports a lower-order group signal is referred to as PCA (protection channel access). In an ordinary system, optical transmission lines can be utilized efficiently by transmitting a PCA signal using a protection line, namely a line which is not transmitting a signal. It should be noted that when a working line is switched over to the protection line, transmission of the PCA signal using the protection line is no longer carried out.

Changeover of Optical Signal Line

In the 1:N line switching point-to-point system, the sending and receiving of information relating to switching of the OC-48 optical signal line is performed using K1/K2 bytes of overhead bytes stipulated by a SONET (synchronous optical network) standard, which is in line with the new synchronous network standard of North America.

(1) Frame format

FIG. 43A is a diagram for describing the frame format of a SONET STS-3(OC-3). One frame consists of 9×270 bytes. The first 9×9 bytes constitute section overhead (SOH), and the remaining bytes constitute path overhead (POH) and payload (PL). Section overhead is for transmitting information (a frame synchronizing signal) representing the beginning of the frame, information specific to the transmission line (information for checking error at the time of transmission, information for maintaining the network, etc.), and a pointer indicating the position of the path overhead POH. Further, the path overhead POH is for transmitting information for end-to-end monitoring within the network, and the payload PL is for transmitting 150 Mbps information.

The section overhead SOH is composed of repeater section overhead of 3×9 bytes, a pointer of 1×9 bytes and multiplex section overhead of 5×9 bytes. The repeater section overhead has bytes A1~A2, C1, B1, E1, F1 and D1~D3, as shown in FIG. 43B. The multiplexer section overhead has bytes B2, K1~K2, D4~D12 and Z1~Z2. The repeater section overhead and multiplexer section overhead have a number of undefined bytes and use thereof is left to the communications manufacturer.

FIG. 44 is a diagram for describing the SONET OC-12 frame format produced by multiplexing SONET OC-3 frames. The frame is composed of section overhead SOH of 9×9×4 bytes, path overhead POH of 9×4 bytes and a payload PL of 9×260×4 bytes. A SONET OC-48 frame is similarly constructed.

Among the overhead bytes, the K1 byte is used mainly to request switching and designates the level of the switching request and the line switched. The K2 byte is used mainly to respond to the K1 byte. In addition, this is used to express the system architecture, the switching mode and AIS/FERF (AIS: alarm indication signal; FERF: far end receive failure). Switching requests include, in addition to the switching request at the time of signal failure, switching requests based upon lock-out, a forced switch and a manual switch. FIGS. 45 and 46 illustrate the arrangement of the K1/K2 bytes stipulated by the SONET standard, as well as a list of the meanings of the bytes.

(2) K1 byte

The first four bits b1~b4 of the K1 byte represent a switching request, and the last four bits b5~b8 represent a switching line. A maximum of 14 transmission lines can be designated. "Lockout of Projection" is a switching request which inhibits switching to a protection transmission line. "Forced Switch" is an artificial switching request for a designated transmission line. If a changeover has been made, no changeover is made to any other line that has failed. "SF" (signal failure) is a switching request for when a signal on a transmission line has been lost. This request has two priorities, namely high and low. "SD" (signal degrade) is a switching request in response to deterioration of a signal on a transmission line and has the two priorities high and low. It should be noted that the SF switching request has a higher priority than the SD switching request. "Manual Switch" is an artificial switching request. When a failure has occurred elsewhere, priority is given to changeover of this switch. "Wait-to-Restore" is a request which, if a request for switching back has been issued after restoration of a failed line, performs switch-back upon elapse of a prescribed period of time. "Exercise" is a request for automatically diagnosing, by actually performing switching, whether the switching operation has been performed normally. "No Request" is sent when operation is normal or when a bridge is removed.

Switch-back modes that can be set are of two types, namely a non-revertive mode in which, if a fault that caused switching has been eliminated, the line to which the changeover has been made is kept as is and is not switched back, and a revertive mode in which the line to which the changeover has been made is switched back to the original line. The former is used mainly in case of the 1+1 arrangement and the latter in case of the 1:N arrangement. The revertive mode has the WTR (wait to restore) function. Specifically, after the cause of switching is eliminated, switch-back is performed not immediately but upon elapse of a specific period of time. This is a function which prevents noisy switching and is stipulated as being between 5 and 12 minutes according to the SONET standard.

In a case where there is contention for a protection line at the time of switching, priority is given to the switching request having the higher level. Further, two degrees of priority (LOW/HIGH) can be set for each line. In a case where switching requests have the same level, the line having the higher degree of priority is switched. In a case where switching requests have the same level and the degrees of priority of the lines are also the same, the line that issued the switching request first is switched. In a case where the levels of the switching requests, the degrees of priority of the lines and the timings at which the switching requests were issued are the same, the line having the youngest line number is given precedence in changeover. This is the order of priority stipulated by the SONET standard. However, there are cases where other orders of priority are requested depending upon the customer.

(3) K2 byte

Bits b1~b4 of the K2 byte designate the number of the transmission line. These bits are nulled (0000) in a case where the bits b5~b8 of the received K1 byte are null and become the number of the transmission line switched in other cases. The b5 bit indicates the network construction; a "1" indicates the 1+1 system and a "0" indicates the 1:N system. The bits b6~b8 indicate the particular switching mode, the details of a failure, etc. There are two types of switching modes, namely a unidirectional mode in which only a unidirectional signal is switched, and a bidirectional mode in which signals in two directions are switched simultaneously.

(4) Switching sequence using K1, K2 bytes

In the unidirectional mode, the B station sends the K1 byte (switch request) to the A station upon detecting SF (signal failure), as shown in FIG. 47A. The A station performs bridge control with respect to the line designated by the K1 byte (switch request) received. Bridge control refers to control for sending identical signals to both the working line and the protection line. After performing bridge control, the A station sends the B station the K2 byte (switch response) corresponding to the K1 byte received. Upon receiving the K2 byte, the B station performs switch control. Switch control means control in which the line signal of the designated reception direction is changed over to the protection line.

In the bidirectional mode, the B station sends the K1 byte (switch request) to the A station upon detecting SF, as shown in FIG. 47B. The A station performs bridge control with respect to the line designated by the K1 byte (switch request) received, sends back the K2 byte (switch response) in the same manner as in the unidirectional mode, and simultaneously sends a K1 byte designating a reverse request (RR). Upon receiving the RR, the B station performs switch control and bridge control with respect to the line designated by the K1 byte which it itself sent, and sends the K2 byte (switch response) to the A station. Upon receiving the K2 byte (switch response), the A station performs switch control.

The following problems arise in the currently existing SONET standard.

(1-1) A PCA signal passed utilizing the protection line when a changeover has not been made is interrupted at execution of "exercise" (self-diagnosis of the switching operation) in the working line.

(1-2) According to the SONET standard, switching priority based upon the importance of the failure is set to be higher than switching priority based upon the importance of the line. However, there are also users who desire that the switching priority based upon the importance of the line be set to be the higher, in which case the SONET standard cannot be accommodated.

(1-3) The number of working lines per system is limited to 14 or less by the existing SONET standard, and a 1:N system having 15 or more working lines cannot be constructed.

(1-4) The existing SONET standard stipulates only a 1:N line switching point-to-point system; there are no standards for a 1:N line switching LNR ADM system or 1:N line switching nested system. In the 1:N line switching point-to-point system, the switching section is a single section from one terminal station to another. More specifically, the SONET standard only supports line switching of one section. There is no standard for a case where a transmission line between terminal stations is divided into a plurality of sections and line switching is performed per section.

(1-5) In a case where a transmission line between terminal stations is divided into a plurality of sections and line switching is performed per section, LNR ADMs (repeater stations) are placed at the boundaries of the switching sections. When a K1/K2 byte is entered in such a case, control is required for either accepting and terminating a byte or not accepting the byte and passing it through to the next stage. Further, when a K1/K2 byte has been sent to the next stage erroneously, line switching takes place in the wrong section.

(1-6) The SONET standard stipulates an ambiguous 5~12 min as the time for WTR (wait to restore). A specifically set time or interval is not clearly indicated.

Further, the following problems arise in the conventional optical transmission system:

(2-1) Each terminal station in the system is managed and controlled using a craft interface via TL-1 message and a 1:N switching function unit is managed and controlled using a separately provided independent craft interface. Operation must be performed using different procedures and different operating systems.

(2-2) In a case where a repeater (D/I) station is constructed using LTEs instead of an LNR ADM, a thru-signal also is connected back to back in a lower-order group. The problem which arises in a large number of shelves in the station.

(2-3) In a case where a D/I station is constructed using LTEs, the connection is back to back (the DS 3 signal in the prior art). Consequently, even a signal that is to be passed through is temporarily terminated and the line section becomes one which is different from the line section stipulated by the SONET standard.

(2-4) In the multiplexer (MUX) of protection shelves when switching is performed, the presently prevailing input signal can be processed only in units (STS1C, 3C or 12C) set for each shelf. Consequently, in a case where lower-order group signals of each working line are constituted by units of various types and a signal constituted by a unit other than the set units is switched, the changeover cannot be performed while satisfying the SONET standard. In other words, if working line 1 is set by OC-3C, working line 2 by STS-1 and the protection shelf by STS- 1, then OC-3C is broken down to the STS-1 level when working line 1 is switched.

(2-5) In order to change the 1:N point-to-point system to a 1:N nested switching system or vice-versa, it is necessary to replace units for monitoring/control.

(2-6) In an existing system, an LTE must be used in the protection line of the terminal station. Consequently, in a case where the station has become a repeater owing system enlargement, it becomes necessary to change the LTE (i.e., to enlarge the shelf).

(2-7) In a 1:N nested system, the PCA channel cannot be used between repeater stations; it can be used only between terminal stations.

SUMMARY OF THE INVENTION

Accordingly, a first object of the present invention is to provide an optical transmission system and a method of controlling the switching of transmission lines which solve the aforementioned problems encountered with the SONET standard.

A second object of the present invention is to so arrange it that a PCA signal passed utilizing a protection line is not interrupted at execution of an exercise in a working line.

A third object of the present invention is to make it possible to change the priority level of switching priority based upon importance of a failure and the priority level of switching priority based upon importance of a line.

A fourth object of the present invention is to make it possible to provide 15 or more working lines per system.

A fifth object of the present invention is to provide an optical transmission system and a method of controlling the switching of transmission lines wherein a transmission line is divided into a plurality of sections and the transmission line can be changed over accurately section by section.

A sixth object of the present invention is to so arrange it that the time of WTR (wait to restore) can be changed at will.

A seventh object of the present invention is to provide an optical transmission system and a method of controlling the switching of transmission lines which eliminates the aforementioned problems encountered in the conventional optical transmission system.

In accordance with the present invention, the foregoing objects are attained by providing a 1:N point-to-point optical transmission system for transmitting data via an optical transmission line in accordance with a frame format having overhead, wherein working and protection terminal stations are each provided with an overhead processor for performing 1:N line switching control by executing processing in accordance with a protocol which uses K1, K2 bytes contained in the overhead.

Further, in accordance with the present invention, the foregoing objects are attained by providing a 1:N point-to-point optical transmission system for transmitting data via an optical transmission line in accordance with a frame format having overhead, wherein first and second line switching controllers are respectively provided to correspond to a first terminal station group of N+1 sets of terminal stations and a second terminal station group of the N+1 sets of terminal stations for performing control to switch a faulty transmission line to a protection transmission line by executing processing in accordance with a protocol which uses K1, K2 bytes contained in the overhead.

Further, in accordance with the present invention, the foregoing objects are attained by providing a 1:N nested optical transmission system for transmitting data via an optical transmission line in accordance with a frame format having overhead, wherein a repeater station is provided in a transmission line for demultiplexing and outputting data extracted from the transmission line or for multiplexing data and inserting the data in the transmission line, and a protection transmission line connecting unit (protection repeater station) is provided at a position on a protection transmission line corresponding to a position at which each repeater station is disposed for switching a faulty transmission line to the protection transmission line every section demarcated by the repeater station.

Further, in accordance with the present invention, the foregoing objects are attained by providing a 1:N nested optical transmission system for transmitting data via an optical transmission line in accordance with a frame format having overhead, wherein a repeater station is provided on a transmission line for demultiplexing and outputting data extracted from the transmission line or for multiplexing data and inserting the data in the transmission line, a protection transmission line connecting unit (protection repeater station) is provided at a position on a protection transmission line corresponding to a position at which each repeater station is disposed for switching a faulty transmission line to the protection transmission line every section demarcated by the repeater station, and line switching controllers are provided to correspond to respective ones of a protection terminal station and the protection transmission line connecting unit for executing processing in accordance with a protocol which uses K1, K2 bytes contained in the overhead.

Other features and advantages of the present invention will be apparent from the following description taken in conjunction with the accompanying drawings.

BRIEF DESCRIPTION OF THE DRAWINGS

FIG. 20 is a diagram for describing switching control (self-diagnosis) based upon K1/K2 bytes;

FIG. 21 is a diagram for describing switching control (manual switching) based upon K1/K2 bytes;

FIG. 22 is a diagram for describing switching control (forced switching) based upon K1/K2 bytes;

FIG. 23 is a diagram for describing switching control (protection line lockout) based upon K1/K2 bytes;

FIG. 24 is a diagram for describing switching control (working line lockout) based upon K1/K2 bytes;

FIG. 25 is a diagram for describing switching control (WTR) based upon K1/K2 bytes;

FIG. 26 is a diagram for describing switching control (double failure) based upon K1/K2 bytes;

FIG. 27 is a diagram for describing switching control (double failure) based upon K1/K2 bytes;

FIG. 29 is a diagram for describing switching control (double failure) based upon K1/K2 bytes;

FIG. 30 is a diagram for describing switching control (double failure) based upon K1/K2 bytes;

FIG. 31 is a diagram for describing switching control (double failure) based upon K1/K2 bytes;

FIG. 32 is a diagram for describing switching control (double failure) based upon K1/K2 bytes;

FIG. 33 is a diagram for describing switching control (operation at occurrence of failure during switch-back standby) based upon K1/K2 bytes;

FIG. 45 is a chart for describing a K1 byte according to the prior art;

FIG. 46 is a chart for describing a K2 byte according to the prior art; and

Figure 1:
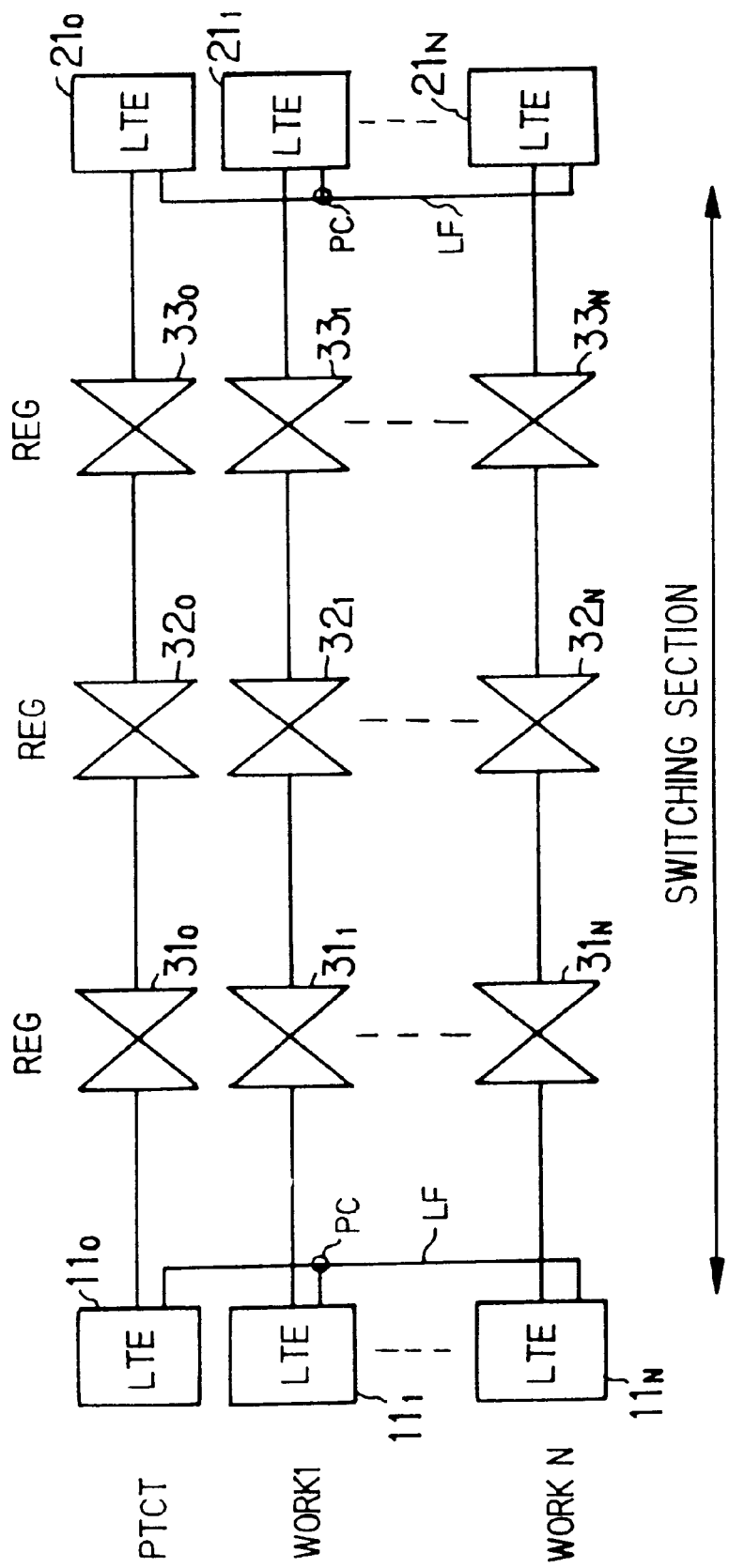
FIG. 1 is a diagram showing the construction of a 1:N line switching point-to-point system.

DESCRIPTION OF THE PREFERRED EMBODIMENTS (A) Overview of the invention (a) Overview of first aspect In a 1:N point-to-point optical transmission system for transmitting data via an optical transmission line in accordance with a frame format having overhead, working and protection terminal stations are each provided with an overhead processor to perform 1:N line switching control by executing processing in accordance with a protocol which uses K1, K2 bytes contained in the overhead.

The overhead processor of the working terminal station which has detected the occurrence of a failure in an optical transmission line sends K1 byte to and receives K2 byte from the overhead processor of an opposing working terminal station via the overhead processor of the protection terminal station. Upon receiving the K1 byte, the overhead processor of the opposing working terminal station performs bridge control and transmits the K2 byte and the overhead processor of the protection terminal station makes a connection to the protection transmission line. The overhead processor of the working terminal station that has transmitted the K1 byte performs switch control in response to reception of the K2 byte and performs a changeover from the faulty transmission line to the protection transmission line. If this arrangement is adopted, it is possible to switch lines using the K1/K2 bytes in a 1:N line switching point-to-point optical transmission system.

(b) Overview of second aspect

In a 1:N point-to-point optical transmission system for transmitting data via an optical transmission line in accordance with a frame format having overhead, first and second line switching controllers are respectively provided to correspond to a first terminal station group of N+1 sets of terminal stations and to a second terminal station group of the N+1 sets of the terminal stations for performing control to switch a faulty transmission line to a protection transmission line by executing processing in accordance with a protocol which uses K1, K2 bytes contained in the overhead.

The working terminal station which has detected the occurrence of a failure in an optical transmission line issues a switching request to the first line switching controller. As a result, the first line switching controller sends the K1 byte to the second line switching controller. Upon receiving the K1 byte, the second line switching controller instructs the opposing station of the above-mentioned working terminal station to perform bridge control, in response to which this working terminal station performs bridge control. Next, the second line switching controller sends the K2 byte to the first line switching controller. Thereafter, the first and second line switching controllers instruct the protection terminal station to make a connection, in response to which the protection terminal station effects a connection to the protection transmission line. The first line switching controller thenceforth instructs the working station terminal that sent the K1 byte to perform switch control, in response to which this working station terminal carries out switch control to switch the faulty transmission line to the protection transmission line. If this arrangement is adopted, it is possible to switch lines using the K1/K2 bytes in a 1:N line switching point-to-point optical transmission system.

(c) Overview of third aspect

In a 1:N nested optical transmission system for transmitting data via an optical transmission line in accordance with a frame format having overhead, a repeater station is provided on a transmission line to demultiplex and output data extracted from the transmission line or to multiplex data and insert the data in the transmission line, and a protection transmission line connecting unit (protection repeater station) is provided at a position on a protection transmission line corresponding to a position at which each repeater station is disposed. The protection transmission line connecting unit switches a faulty transmission line to the protection transmission line every section demarcated by the repeater station.

A repeater station (or working terminal station) which has detected the occurrence of a failure in a prescribed section of an optical transmission line sends K1 byte to and receives K2 byte from the opposing repeater station (or working terminal station) of this section via the protection transmission line connecting unit (or protection terminal station). Upon receiving the K1 byte, the opposing repeater station (or working terminal station) performs bridge control and transmits the K2 byte and the protection repeater station (or protection terminal station) makes a connection to the protection transmission line. The repeater station (or working terminal station) that has transmitted the K1 byte performs switch control in response to reception of the K2 byte and performs a changeover from the faulty transmission line to the protection transmission line. If this arrangement is adopted, it is possible to switch lines in every section in a 1:N line switching LNR ADM system or 1:N line switching nested system.

(d) Overview of fourth aspect

In a 1:N nested optical transmission system for transmitting data via an optical transmission line in accordance with a frame format having overhead, a repeater station is provided on a transmission line to demultiplex and output data extracted from the transmission line or to multiplex data and insert the data in the transmission line, a protection transmission line connecting unit (protection repeater station) is provided at a position on a protection transmission line corresponding to a position at which each repeater station is disposed to switch a faulty transmission line to the protection transmission line every section demarcated by the repeater station, and line switching controllers are provided to correspond to respective ones of a protection terminal station and the protection transmission line connecting unit to execute processing in accordance with a protocol which uses K1, K2 bytes contained in the overhead.

The repeater station (or working terminal station) which has detected the occurrence of a failure in a prescribed section of an optical transmission line issues a switching request to the first line switching controller. As a result, the first line switching controller sends the K1 byte to the second line switching controller of this section. Upon receiving the K1 byte, the second line switching controller instructs the opposing station of the above-mentioned repeater station to perform bridge control, in response to which this station performs bridge control. Next, the second line switching controller sends the K2 byte to the first line switching controller. Thereafter, the first and second line switching controllers instruct the protection transmission line connecting unit to make a connection, in response to which the transmission line connecting unit effects a connection to the protection transmission line. If this arrangement is adopted, it is possible to switch lines in every section in a 1:N line switching LNR ADM system or 1:N line switching nested system.

(e) Overview of fifth aspect

A time (WTR time) over which the switched state will be maintained following the issuance of a switching cancellation instruction issued in response to restoration of a transmission line is set as desired. When a failure develops in the transmission line, the faulty transmission line is switched over to a protection transmission line. After the switching cancellation instruction is issued in response to restoration of the faulty transmission line, the switched state is maintained until the set time elapses. The protection transmission line is switched back to the restored transmission line upon elapse of the set time. If this arrangement is adopted, WTS time can be set as desired.

(f) Overview of sixth aspect

A repeater station is provided in a working transmission line, and a protection transmission line connecting unit (protection repeater station) is provided at a position in a protection transmission line corresponding to a position at which each repeater station is disposed. The protection transmission line connecting unit switches a faulty transmission line to the protection transmission line every section demarcated by the repeater station. Each protection transmission line connecting unit retains the numbers of transmission lines that it itself must manage in the event of transmission line failure. When a K1 byte (transmission-line switching request) having a switching request level and a transmission line number has been received, the protection transmission line connecting unit compares the transmission line number with the numbers of the transmission lines it must manage. If the numbers agree, the protection transmission line connecting unit accepts the K1 byte and performs control for switching between the faulty transmission line and the protection transmission line. If the numbers do not agree, the protection transmission line connecting unit does not terminate the K1 byte and sends it to the next stage. When a K1/K2 byte has entered, therefore, it is possible to make an accurate judgment as to whether the byte should be terminated or passed through to the next stage without being accepted. As a result, it is possible to prevent a situation in which a K1/K2 byte is sent to the next stage erroneously to cause a line changeover in the wrong section.

When the K1 byte has been received, the protection transmission line connecting unit compares the transmission line number of the K1 byte with the numbers of transmission lines it must manage. If the two numbers do not agree, the protection transmission line connecting unit checks to see whether the protection transmission line is being used and sends the K1 byte to the next stage if the protection transmission line is not in use. If the protection transmission line is being used, the protection transmission line connecting unit compares the switching request level of the transmission-line switching K1 byte in accordance with which switching has been executed thus far with that of the current K1 byte. If the switching request level of the current K1 byte is lower, the protection transmission line connecting unit uses a K2 byte to notify the source of issuance of this K1 byte of the fact that the switching request is to be rejected. If the switching request level of the current K1 byte is higher, the protection transmission line connecting unit uses a K2 byte to notify the source of issuance of the preceding K1 byte of the fact that the switching request is to be rejected. Further, a priority level is added on for each transmission line. In a case where the switching request levels of K1 bytes are identical, the priority levels of the transmission lines are compared to determine whether or not a rejection should be made. If this arrangement is adopted, the more important transmission lines can be rescued based upon the switching request level and the priority level of each line.

An external setting is made in such a manner that the priority level of a transmission line is made higher than the switching request level. In a case where the above-mentioned numbers do not agree, it is determined whether the protection transmission line is being used. If it is not being used, the K1 byte is sent to the next stage. If the protection transmission line is in use, first the priority levels of the transmission lines and then the switching request levels of the K1 bytes are compared to decide whether the switching request should be rejected. If this arrangement is adopted, switching control can be carried out while the priority levels are set at will in conformity with user preference.

Along with a transmission-line designating bit in the K1 byte, an unused overhead byte is employed to designate the number of a transmission line. As a result, it is possible to simply construct a 1:N system having 15 or more working lines.

In a case where self-diagnosis (exercise) of a transmission-line switching function is performed periodically using K1, K2 bytes, the protection transmission line connecting unit does not perform switching between the working transmission line designated by the K1 byte and the protection transmission line and each terminal station or each repeater station performs self-diagnosis by monitoring whether or not the K1, K2 bytes are correctly sent and received. Alternatively, when start of self-diagnosis is externally requested, the protection transmission line connecting unit does not perform switching between the working transmission line and the protection transmission line and performs self-diagnosis by monitoring optical signals of a higher-order group sent to the protection transmission line connecting unit from a terminal station or repeater station at the time of self-diagnosis. If this arrangement is adopted, a signal (PCA) passed utilizing a protection line is not interrupted at execution of an exercise in a working line.

(B) Systems to which the invention is applicable

The present invention is applicable to an optical transmission system having N-number of working lines and one protection line, wherein a working line in which a failure has occurred is switched over to the protection line using K1/K2 bytes.

Figure 2:
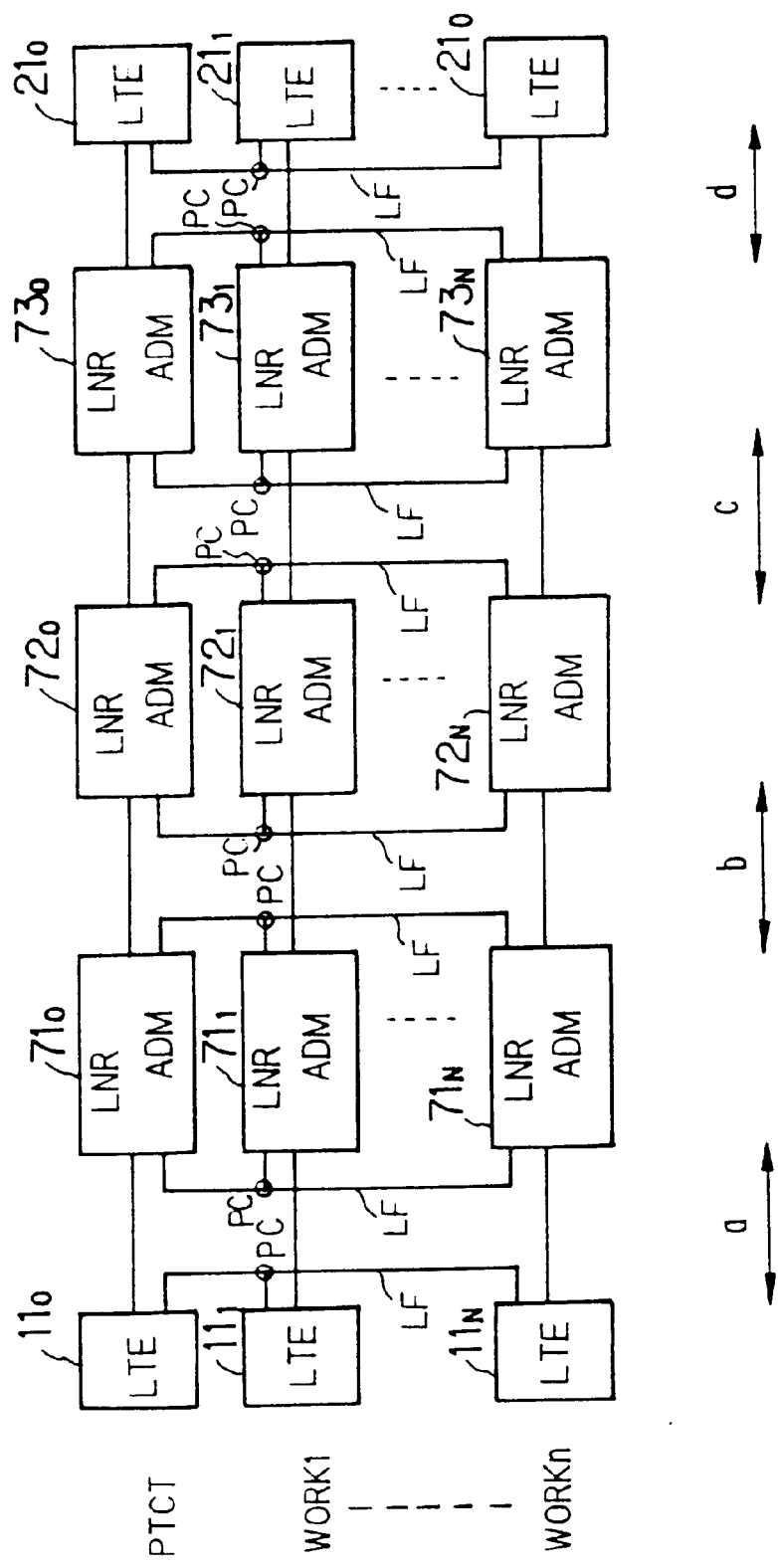
FIG. 2 is a diagram showing the construction of a 1:N line switching linear ADM system.
Figure 3:
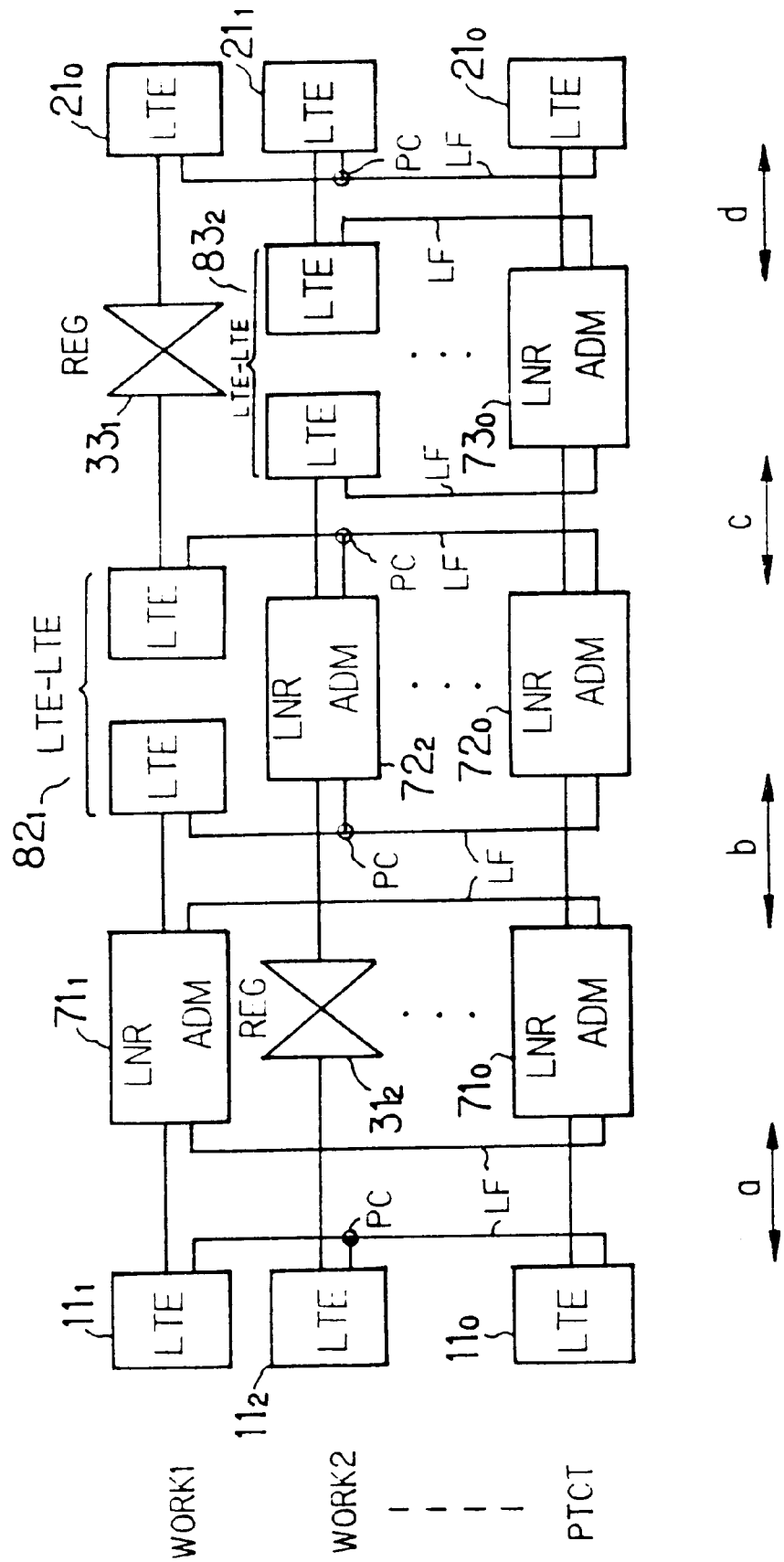
FIG. 3 is a diagram showing the construction of a 1:N line switching nested system.

FIGS. 1 through 3 illustrate an optical transmission system to which the present invention can be applied. FIG. 1 is a diagram showing a 1:N line switching point-to-point system, FIG. 2 is a diagram showing a 1:N line switching LNR ADM (linear add/drop) multiplexer), and FIG. 3 is a diagram showing a 1:N line switching nested system.

Shown in each of FIGS. 1 through 3 are first working terminal stations $11_1 \sim 11_N$, a first protection terminal station 110, second working terminal stations $21_1 \sim 21_N$ and a second protection terminal station $21_0$, each of these terminals stations being constituted by LTE (line terminal equipment). Numerals $31_0 \sim 31_N$, $32_0 \sim 32_N$, $33_0 \sim 33_N$ denote signal regenerators (REG), and $71_0 \sim 71_N$, $72_0 \sim 72_N$, $73_0 \sim 73_N$ (FIG. 2) denote repeater stations each which is constituted by an LNR ADM. These are provided in the protection line PTCT and in each of the working lines WORK1~WORKN. Numerals $82_1$, $83_2$ (FIG. 3) denote repeater stations (LTE-LTE) in which two LTEs are connected back to back and provided with a function identical with that of an LNR ADM. Further, PC represents a photocoupler and LF an optical fiber.

In the 1:N line-switching point-to-point system of FIG. 1, N-number of the working lines (optical transmission lines) WORK1~WORKN and one protection line (optical transmission line) PTCT are provided. The working terminal stations $11_1 \sim 11_N$, $21_1 \sim 21_N$ of LTE construction are connected to the ends of the N-number of working lines WORK1~WORKN, and the protection terminal stations $11_0$, $21_0$ of LTE construction are connected to both ends of the single protection line PTCT. The signal regenerators (REG) $31_0 \sim 31_N$, $32_0 \sim 32_N$, $33_0 \sim 33_N$ are disposed in respective ones of the transmission lines at appropriate locations to elongate the transmission distance, the terminal stations are interconnected by the optical fibers LF via the photocouplers PC and it is so arranged that when a failure occurs in a certain working line, a changeover is made to the protection line. It should be noted that the switching section in the 1:N line-switching point-to-point system is the section between the terminal stations.

In the 1:N line-switching LNR ADM system of FIG. 2, N-number of the working lines (optical transmission lines) WORK1~WORKN and one protection line (optical transmission line) PTCT are provided. The working terminal stations $11_1 \sim 11_N$, $21_1 \sim 21_N$ of LTE construction are connected to the ends of the N-number of working lines WORK1~WORKN, and the protection terminal stations $11_0$, $21_0$ of LTE construction are connected to both ends of the single protection line PTCT. The repeater stations (D/I) $71_1 \sim 71_N$, $72_1 \sim 72_N$, $73_1 \sim 73_N$ of LNR ADM construction are disposed in respective ones of the working lines WORK1~WORKN over identical spans. Further, repeater stations $71_0 \sim 73_0$ of LNR ADM construction are provided at positions in the protection line PTCT that are identical with the positions at which the LNR ADMs are disposed in the working lines. Furthermore, the terminal stations are interconnected by optical fibers LF via photocouplers PC, and the repeater stations are interconnected by optical fibers LF via photocouplers PC. The arrangement of the 1:N linear ADM system of FIG. 2 is such that when a failure occurs in any of the four sections a, b, c, d of any of the working lines WORK1~WORKN, a changeover is made, by section, to the protection line of the section.

In the 1:N line-switching nested system of FIG. 3, N-number of the working lines (optical transmission lines) WORK1~WORKN and one protection line (optical transmission line) PTCT are provided. The working terminal stations $11_1 \sim 11_N$, $21_1 \sim 21_N$ of LTE construction are connected to the ends of the N-number of working lines WORK1~WORKN, and the protection terminal stations $11_0$, $21_0$ of LTE construction are connected to both ends of the single protection line PTCT. Repeater stations (D/I) $71_1$, $72_2$ and signal regenerators (REG) $31_2$, $33_1$ are provided in each of the working lines WORK~WORKN. Repeater stations (LTE-LTE) $82_1$, $83_2$ obtained by connecting two LTEs back to back are also provided in each of the working lines. Repeater stations $71_0 \sim 73_0$ of LNR ADM construction are provided at positions on the protection line PTCT that correspond to the positions at which the repeater stations (LNR ADM, LTE-LTE) are placed in the working lines WORK~WORKN. Furthermore, the terminal stations are interconnected by optical fibers LF via photocouplers PC, and the repeater stations are interconnected by optical fibers LF via photocouplers PC. With regard to the working line WORK1 in FIG. 3, it is so arranged that a faulty transmission line is switched over to the protection transmission line in any of three sections a, b and c~d demarcated by the repeater stations. With regard to the working line WORK2, it is so arranged that a faulty transmission line is switched over to the protection transmission line in any of three sections a~b, c and d demarcated by the repeater stations.

Thus, each system has a maximum of N-number of working lines WORK~WORKN and one protection line PTCT and comprises three types of equipment, namely LTEs (line terminal equipment), LNR ADMs (linear add/drop multiplexers) and REGs (regenerators).

There is a case in which an LTE device is used in a working line and a case in which an LTE device is used in the protection line, and the operation [mode, especially operation at the time of switching, and processing of K1, K2 bytes) of each device differs from the others. These device operations (modes) are set by performing mode setting, with respect to an OHB processor (described later), from an OS interface. Further, lower-order group signals are capable of being supported by the LTE devices of the working lines as a matter of course and also by the LTE device of the protection line. This function in which the LTE device of a protection line supports a lower-order group signal is referred to as PCA (protection channel access) and makes it possible to utilize the optical fibers efficiently.

An LTE device multiplexes lower-order group signals (DS 3, STS-1, OS-3, OC-12) to a higher-order group signal (OC-48) and performs an operation which is the converse of this operation and transmits an OC-48 optical signal. It is also possible to construct a D/I station by a back-to-back connection using LTE devices.

An LNR ADM device is used in the working lines and protection line of the repeater stations (D/I stations) in the system and can also be used as a terminal station. In a case where the protection line in a station is constituted by an LNR ADM device, it is possible for LNR ADM devices and back-to-back connected LTEs to be mixed together in the working lines. The LNR ADM device receives the OC-48 optical signal, adds/drops or passes through the required lower-order group signal in the course of converting the optical signal to an electric signal and demultiplexing the signal, performs multiplexing again, effects a conversion to an optical signal and transmits the optical signal.

A REG device is used in the working lines and protection line of the repeater stations. However, in a case where all working stations are REG devices, the protection line also can be constituted by a REG device to construct the system inexpensively. The REG device converts an optical signal to an electric signal, converts the electric signal to an optical signal again and then corrects, amplifies and transmits the optical signal. The REG device makes it possible to extend the transmission distance.

Each of these devices is constituted by an HS shelf and tributary shelves (HD TRIB shelf and LS TRIB shelf). The HS shelf supports the higher-order group signal side (OC-48), and the HB TRIB and LS TRIB support the lower-order group signal side (DS 3, STS-1, OC-3, OC-12).

(C) HS shelf, TRIB shelf (a) HS shelf

Figure 4:
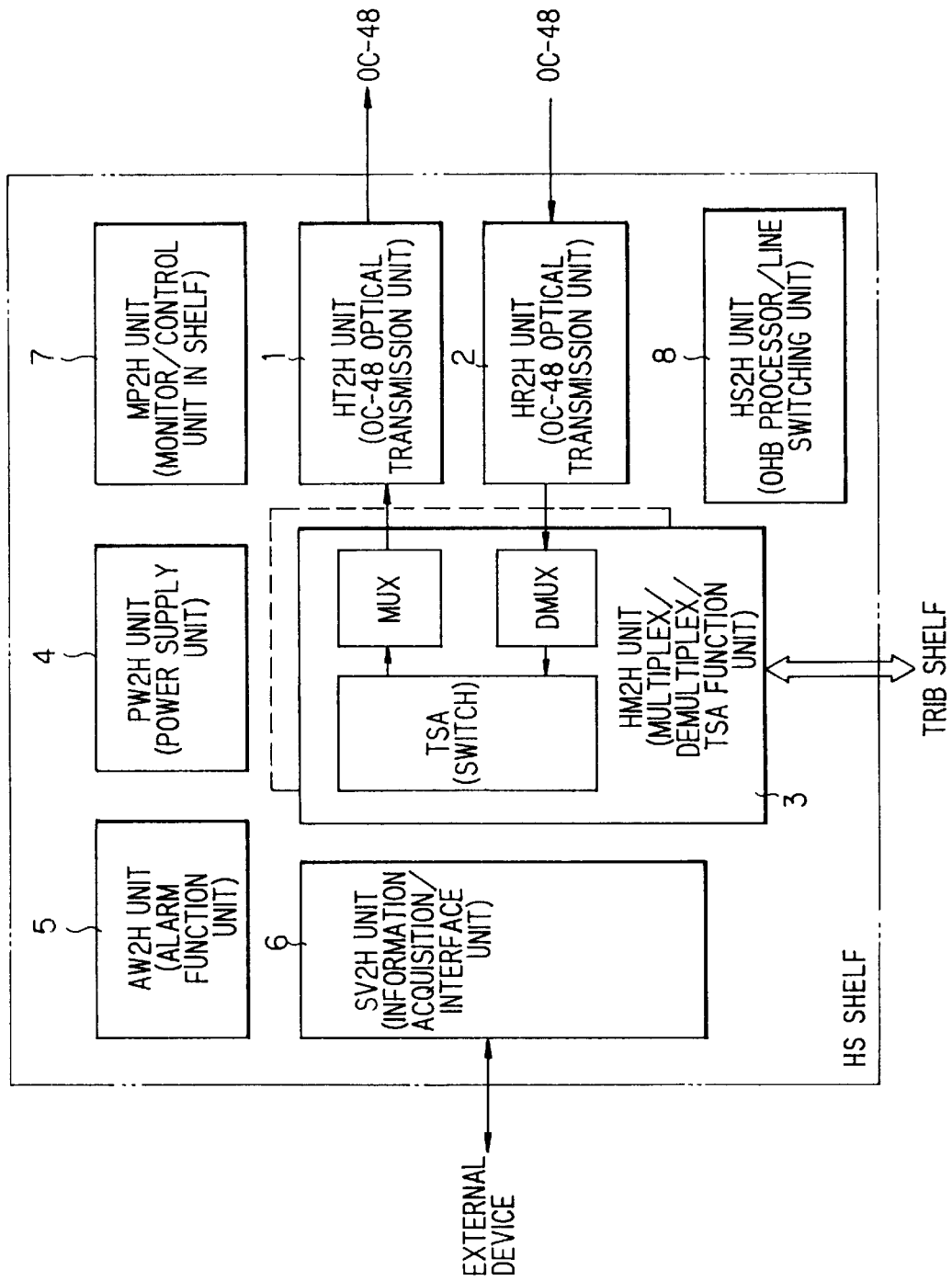
FIG. 4 is a diagram showing the construction of an HS shelf.

FIG. 4 is a diagram showing the construction of the HS shelf. The HS shelf has an HT2H unit (OC-48 optical transmission unit) and an HR2H unit (OC-48 optical reception unit) 2 as OC-48 optical signal interfaces. The HT2H unit 1 has a function for converting an STS-48 electric signal to an OC-48 optical signal and transmitting the latter signal, and the HR2H unit 2 has a function for converting the OS-48 optical signal to the STS-48 electric signal. An HM2H unit 3 is used to multiplex and demultiplex the STS-48 electric signal. In a case where the HS shelf is used for an LTE device and an LNR ADM device, the unit 3 has a function for multiplexing a 78M×8 electric signal from a lower-order group shelf to the STS-48 electric signal and demultiplexing the STS-48 electric signal to the 78M×8 electric signal. Further, the unit 3 also has an STS-1×48 TSA (time slot assignment access) function for when multiplexing/demultiplexing is performed. Two of these units are used per HS shelf, and the unit thus has a redundancy feature. In a case where the HS shelf is used for a REG device, this unit has a function for passing the STS-48 electric signal through. Two of the units are used per HS shelf. Since each is used in a separate line, there is no redundancy.

In addition to the above-mentioned units, the HS shelf includes a PW2H unit 4 serving as a power-supply unit, an AW2H unit 5 having an alarm function and the like order wire function, an SV2H unit 6 having a function for collecting information inside the shelf and a function for interfacing an external monitoring device, an MP2H unit 7 which administers monitoring and control functions inside the shelf, and an HS2H unit [overhead byte processor (OHB processor)] 8 for controlling line switching of the OC-48 signal and for processing the OHB of the OC-48 signal.

Figure 34A:
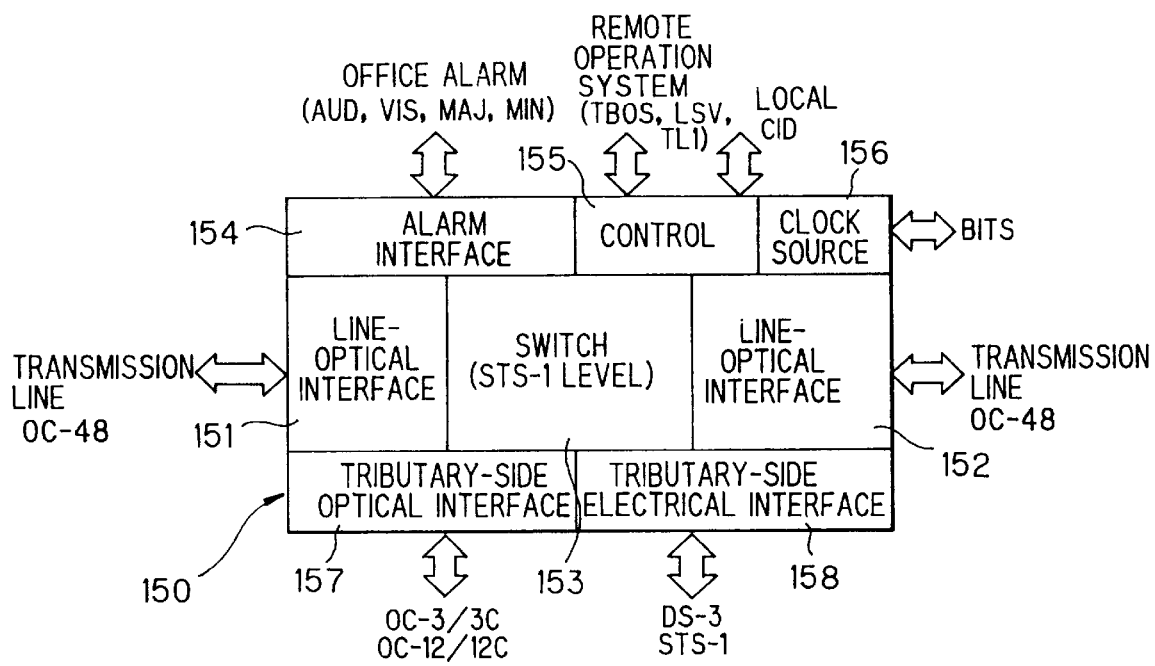
FIGS. 34A, 34B are diagrams showing the construction of an HS shelf according to the prior art.
Figure 34B:
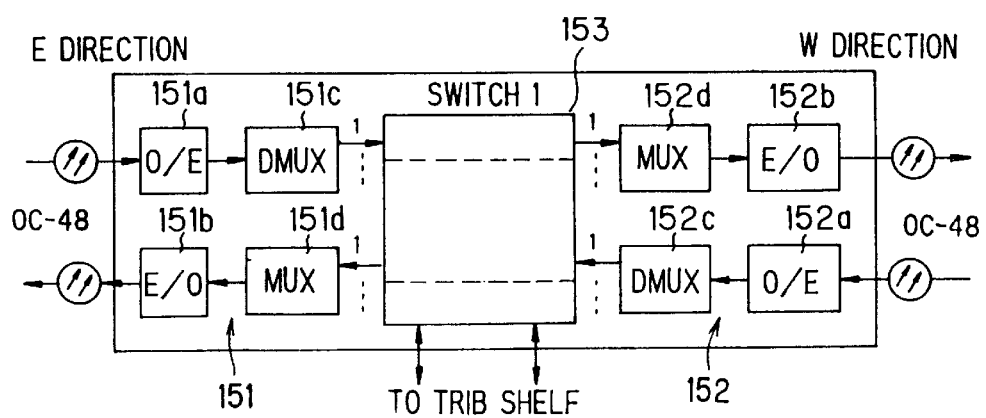

If the OHB processor 8 is deleted, the HS shelf will have a construction and function substantially equivalent to those of the HS shelf of FIG. 34.

(b) TRIB shelf

The HD TRIB shelf has interface functions for each of the lower-order group signals of DS 3, STS-1, OC-3 and OC-12, a capacity of 2×STD-12 signals per shelf at the time of the DS 3, STS-1 and OC-12 signals and a capacity of 1×STD-12 signal per shelf at the time of the OC-3 signal.

With regard to the DS 3, STS-1 signals, the HD TRIB shelf is composed of three channels per unit and has 1:4 unit redundancy since it comprises four working units and one protection unit. With regard to the OC-3, OC-12 signals, the HD TRIB shelf is composed of one channel per unit and has 1+1 line redundancy. The signals processed by each of the interface units are multiplexed to the STS-12 electric signal and sent to the HM2H unit 3 of the HS shelf as the 78M×8 electric signal. Further, the STS-12 electric signal from the HM2H unit 3 is demultiplexed and converted and then sent to each of the interface units.

The LS TRIB shelf has interface functions for each of the lower-order group signals of DS 3, STS-1, OC-3 and OC-12 and a capacity of 1×STD-12 signals per shelf. The LS TRIB shelf has 1+1 unit redundancy with regard to the DS 3, STS-1 signals and 1+1 line redundancy with regard to the OC-3, OC-12 signals.

Figure 35A:
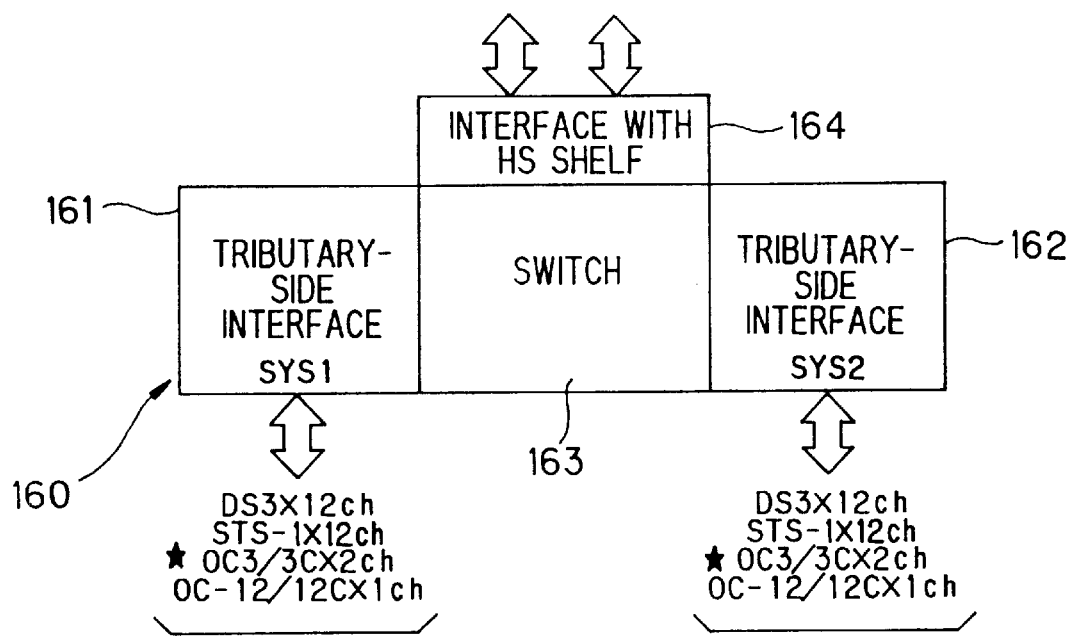
FIGS. 35A, 35B are diagrams showing the construction of an TRIB shelf according to the prior art.
Figure 35B:
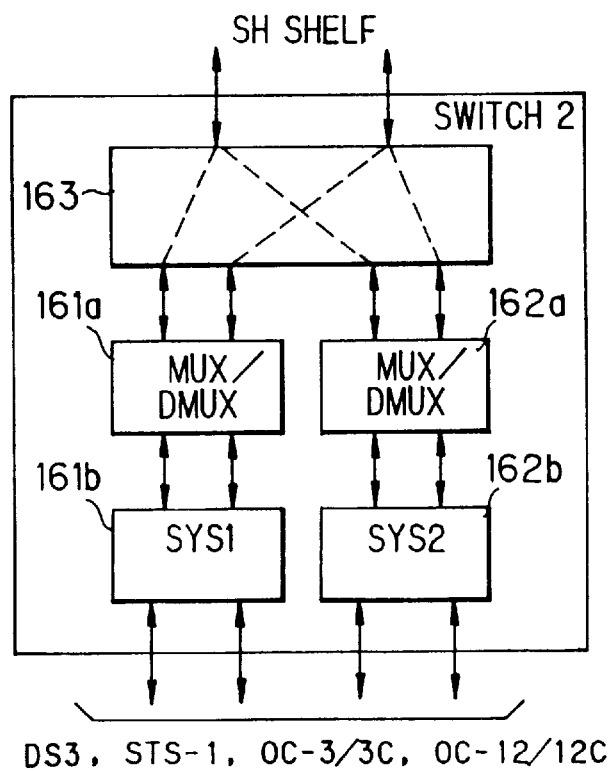
Figure 36A:
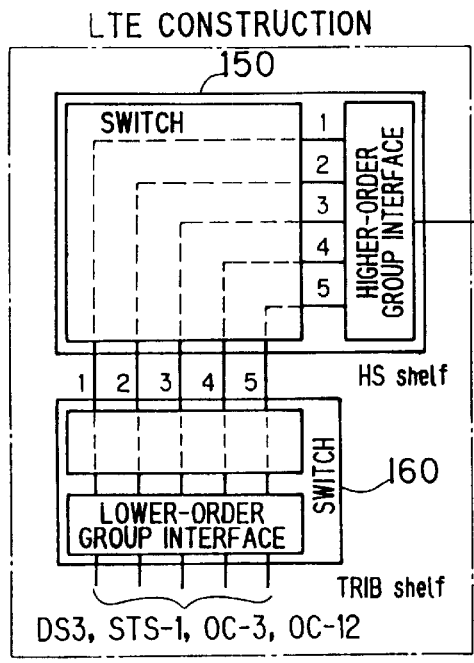
FIGS. 36A, 36B and 36C are diagrams showing the constructions of an LTE and LNR ADM according to the prior art.
Figure 36B:
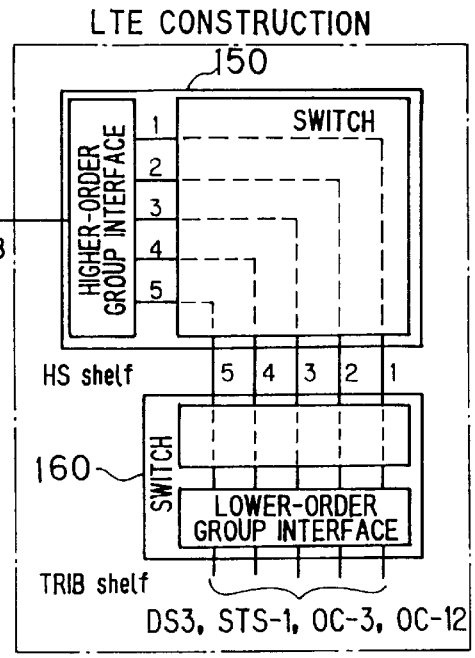
Figure 36C:
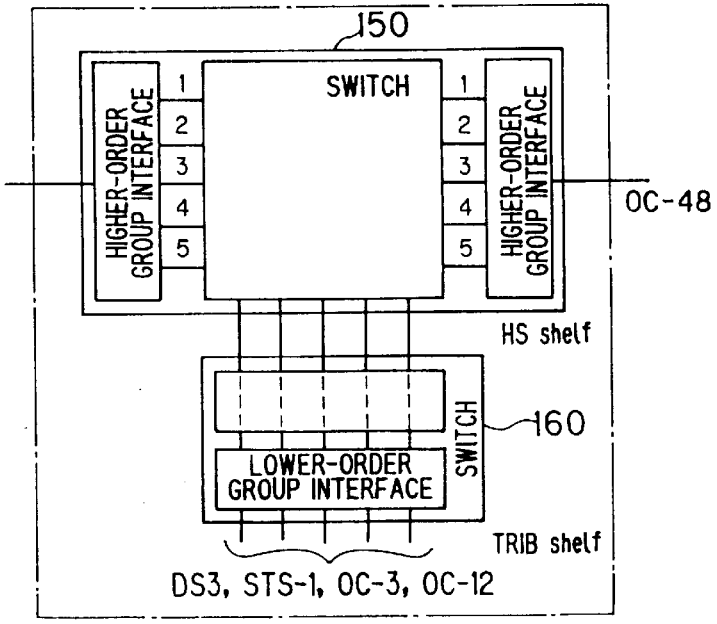
Figure 37:
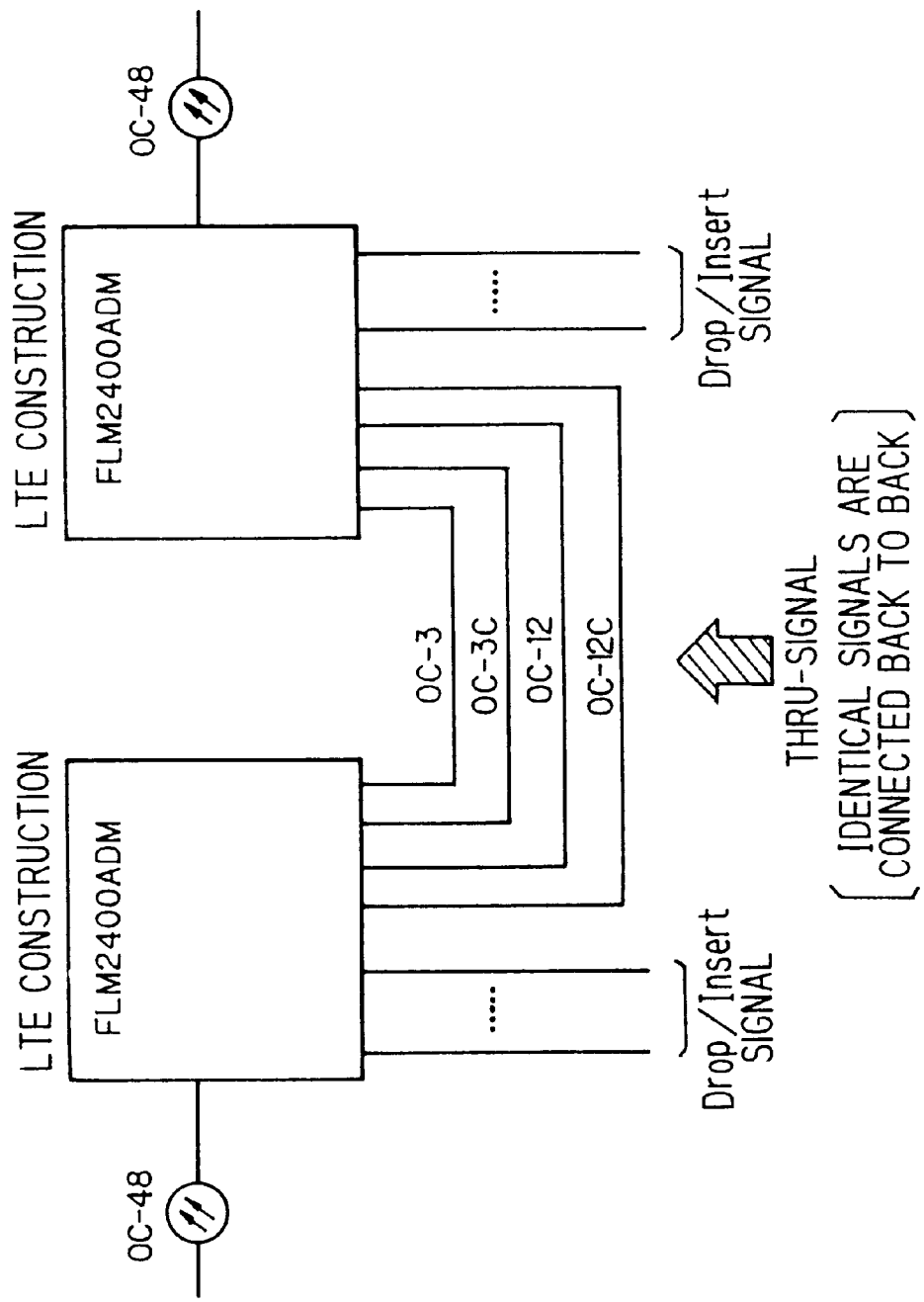
FIG. 37 is a diagram showing the arrangement of an LTE back-to-back connection according to the prior art.
Figure 38:
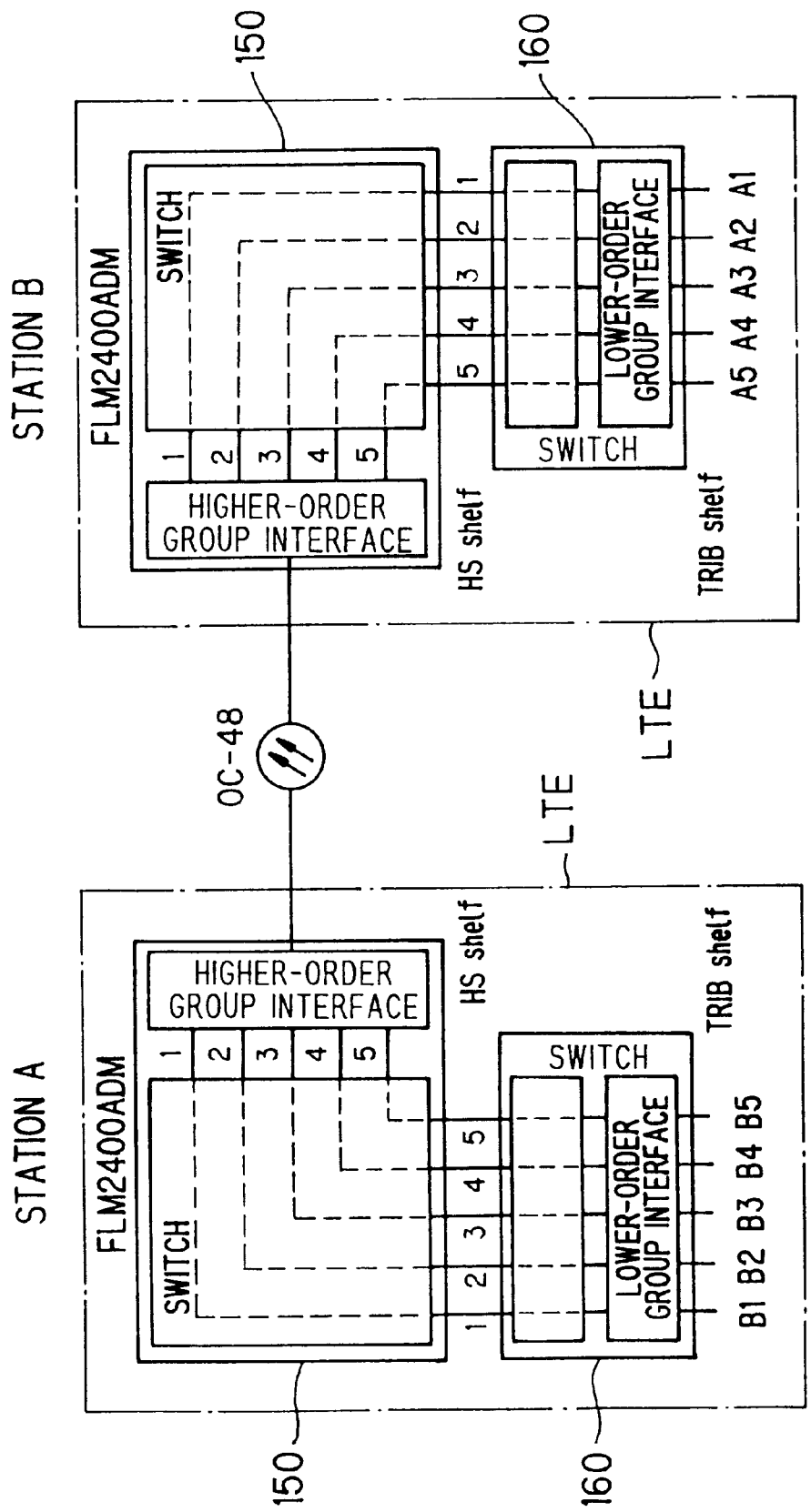
FIG. 38 is a diagram showing the construction of a point-to-point system according to the prior art
Figure 39:
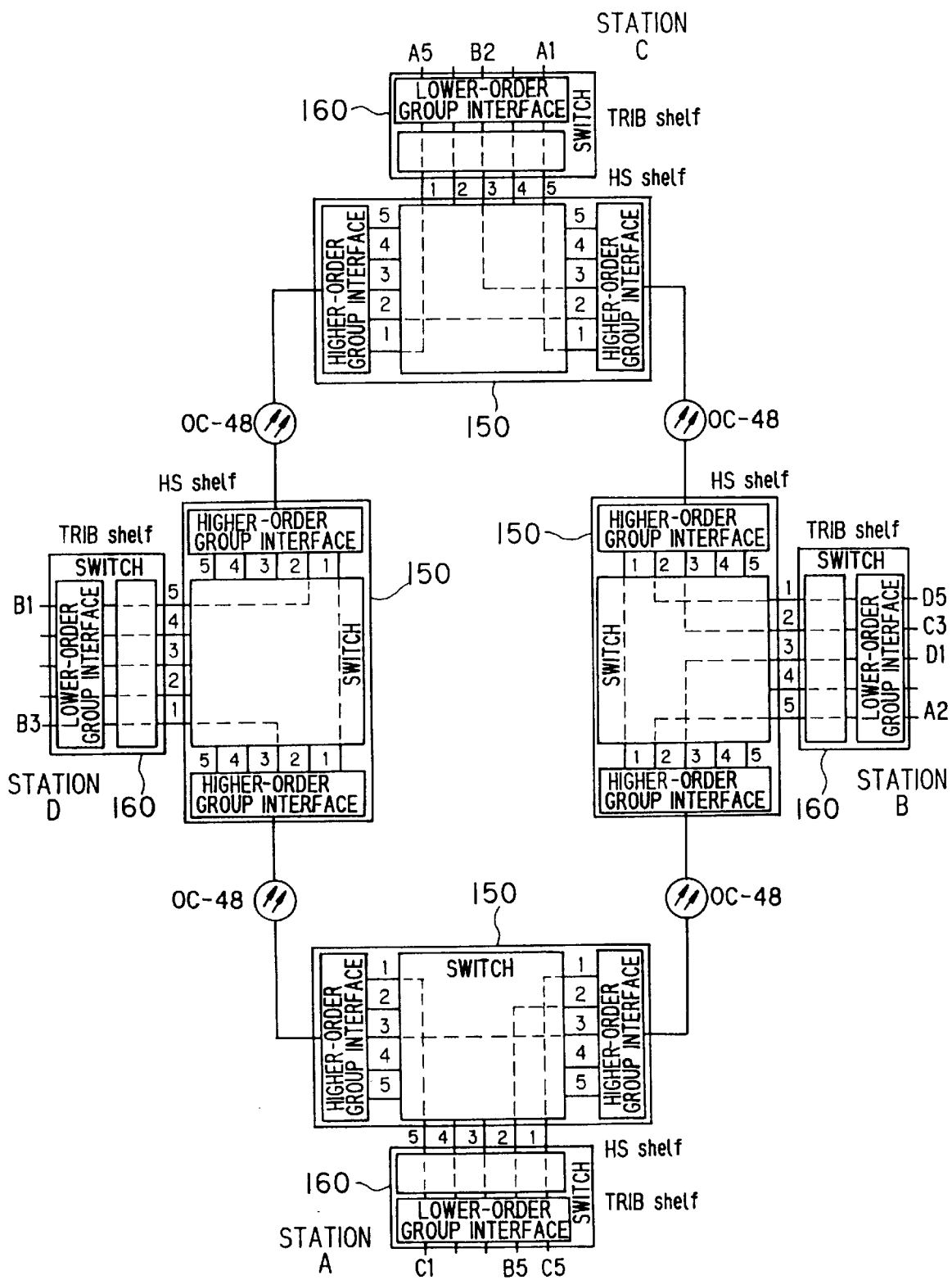
FIG. 39 is a diagram showing the construction of a ring system according to the prior art.
Figure 40:
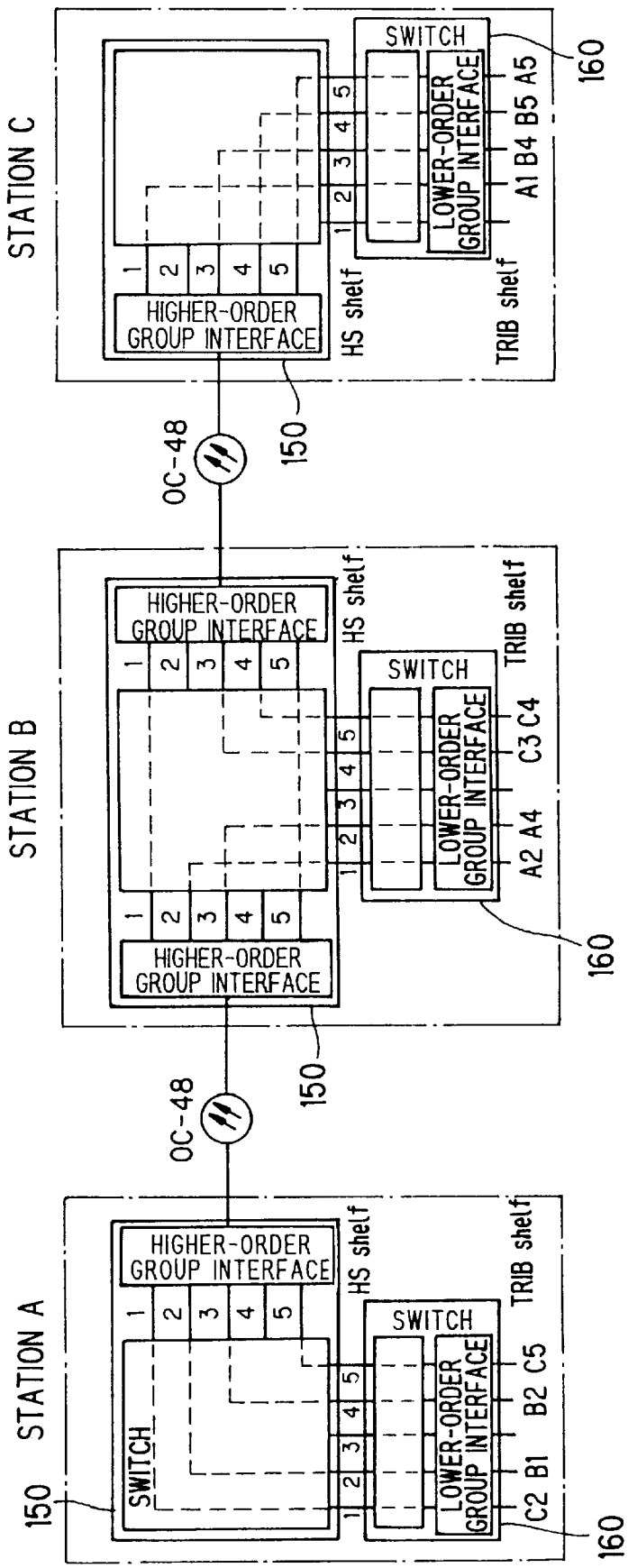
FIG. 40 is a diagram showing the construction of a linear ADM system according to the prior art.
Figure 41:
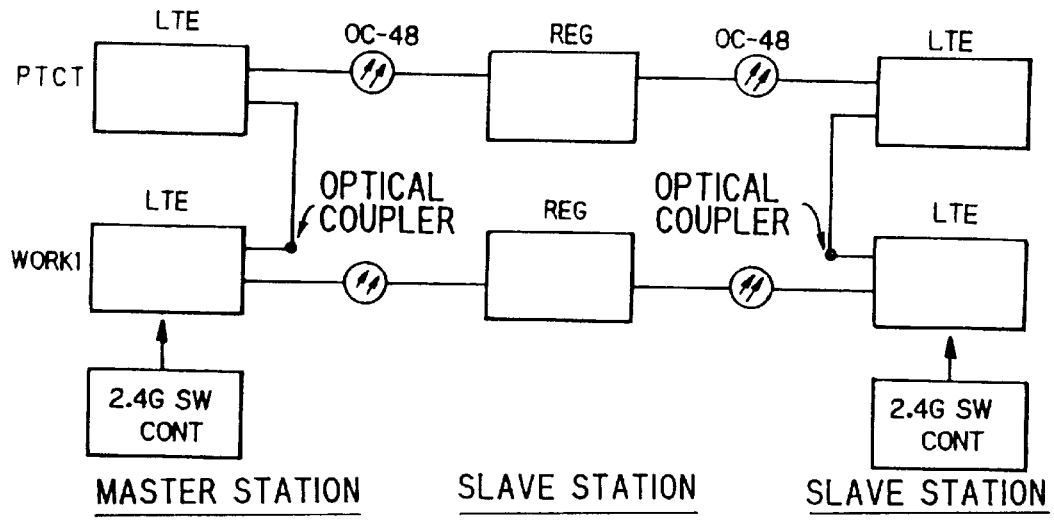
FIG. 41 is a diagram showing the construction of a 1+1 line switching point-to-point system according to the prior art.
Figure 42:
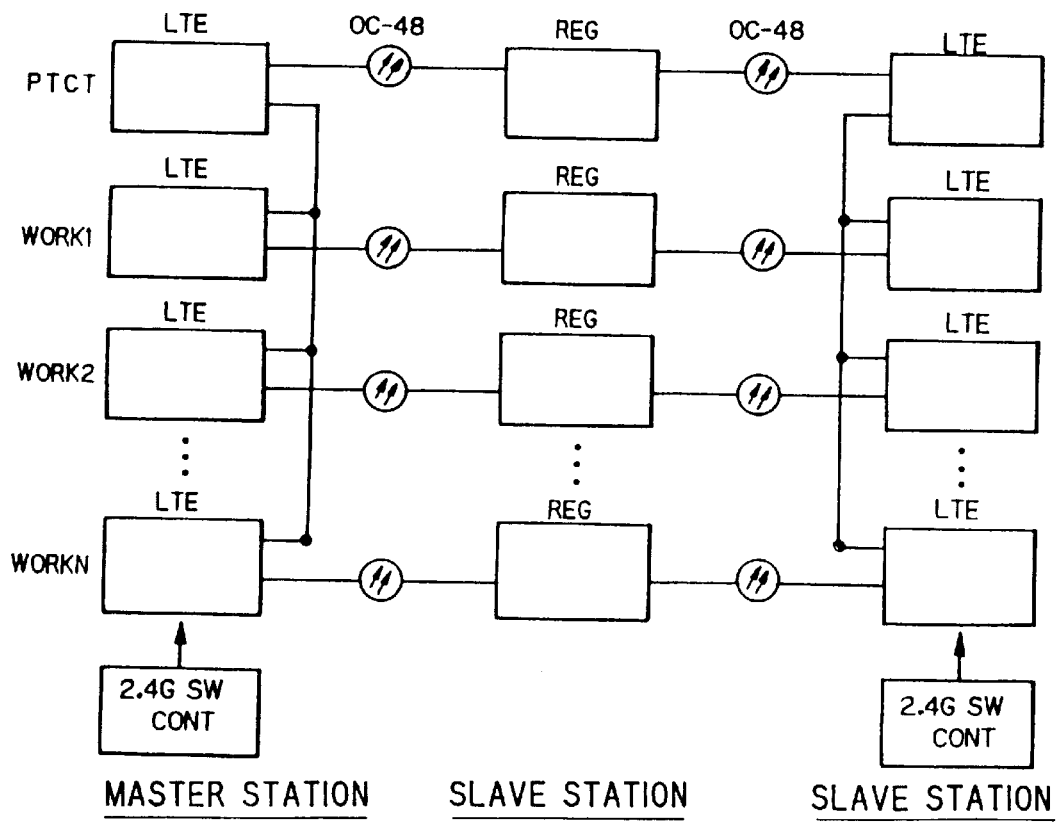
FIG. 42 is a diagram showing the construction of a 1:N line switching point-to-point system according to the prior art.
Figure 43A:
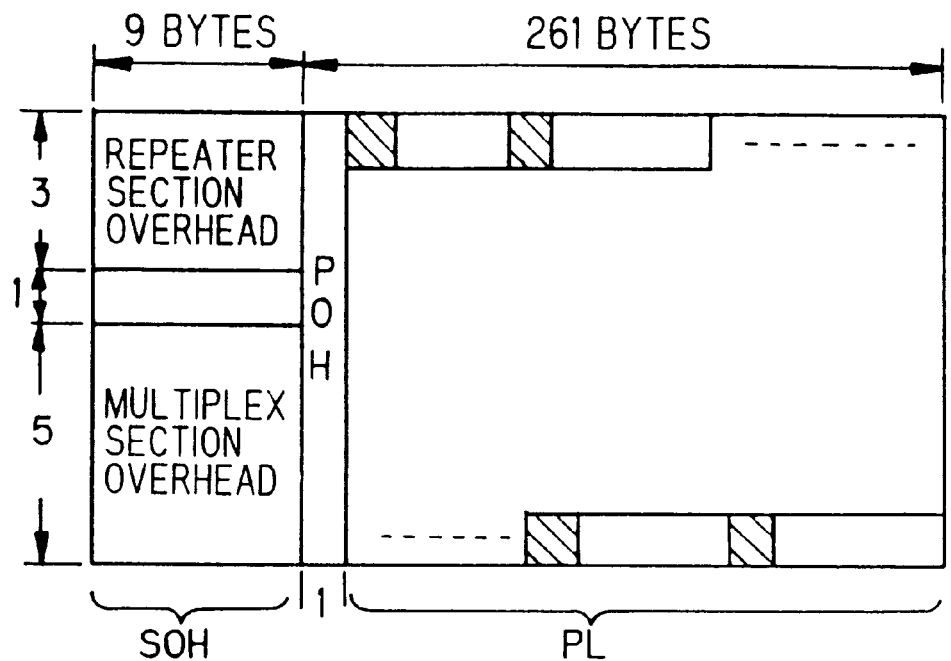
FIGS. 43A, 43B are diagrams for describing a SONET OC-3 frame format according to the prior art.
Figure 43B:
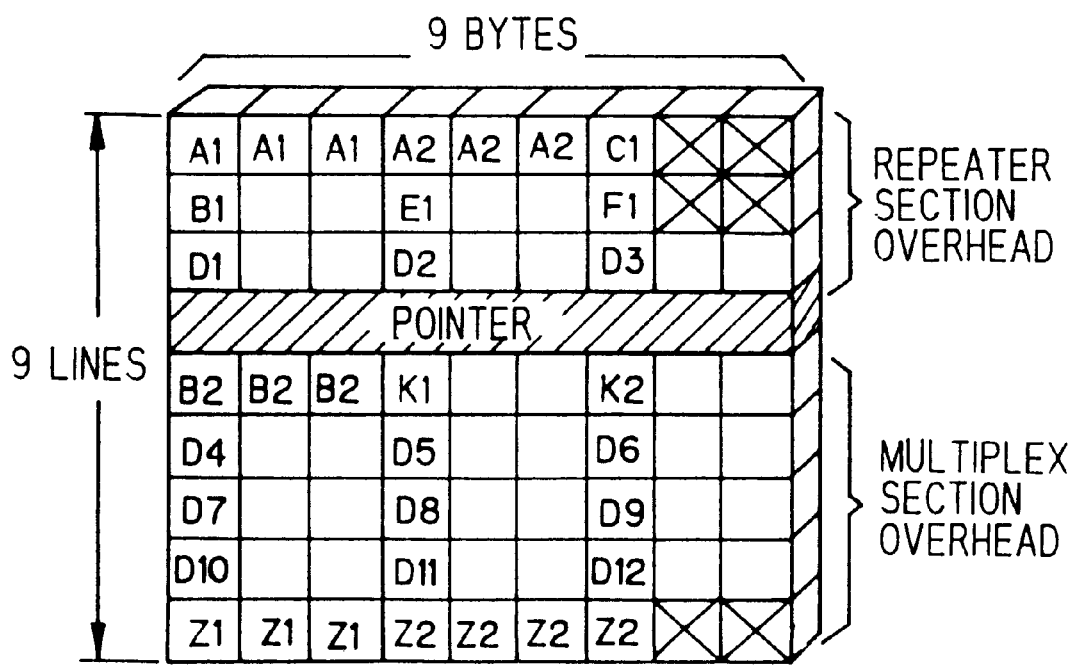
Figure 44:
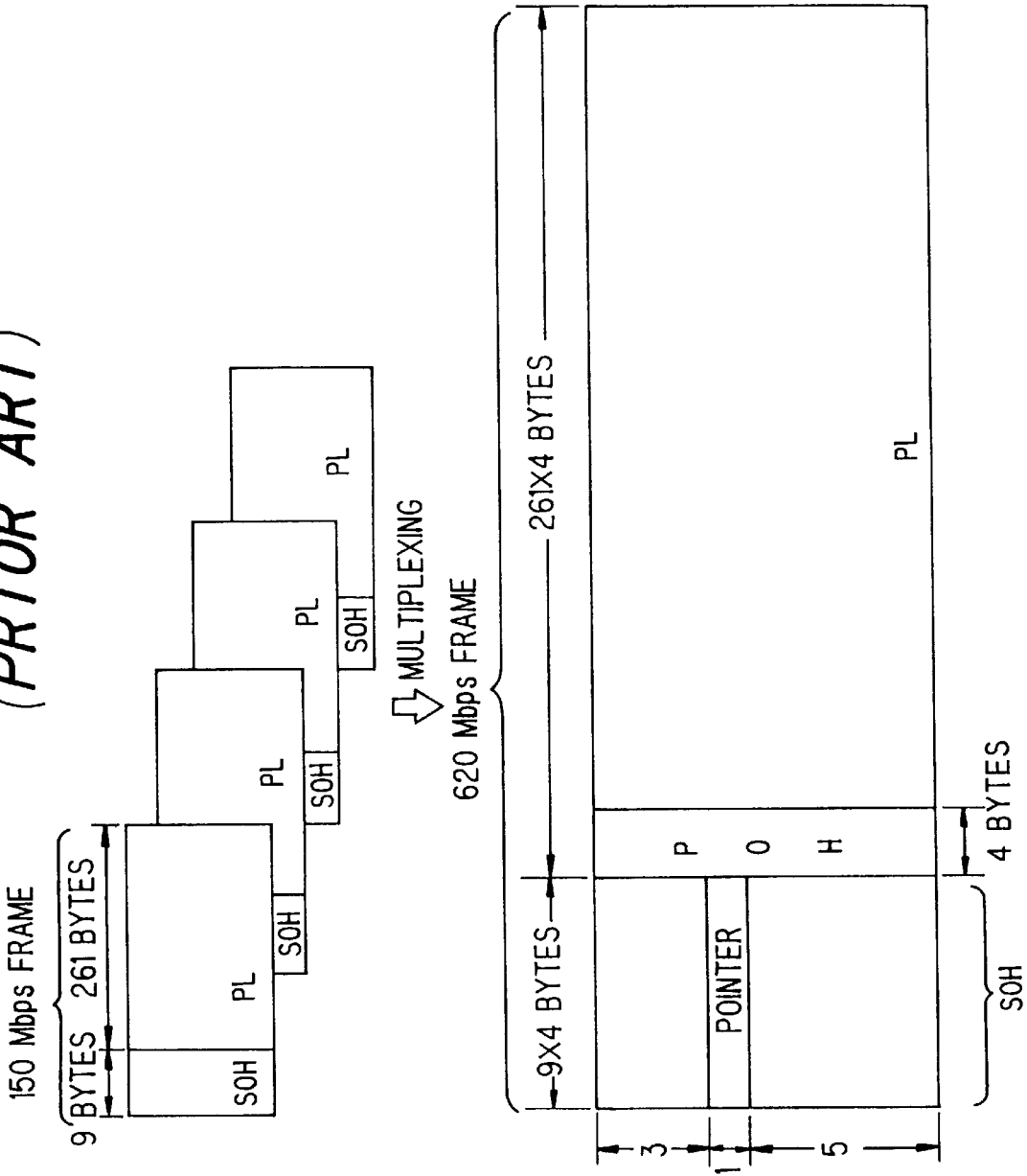
FIG. 44 is a diagram for describing a SONET OC-12 frame format according to the prior art.
Figure 47A:
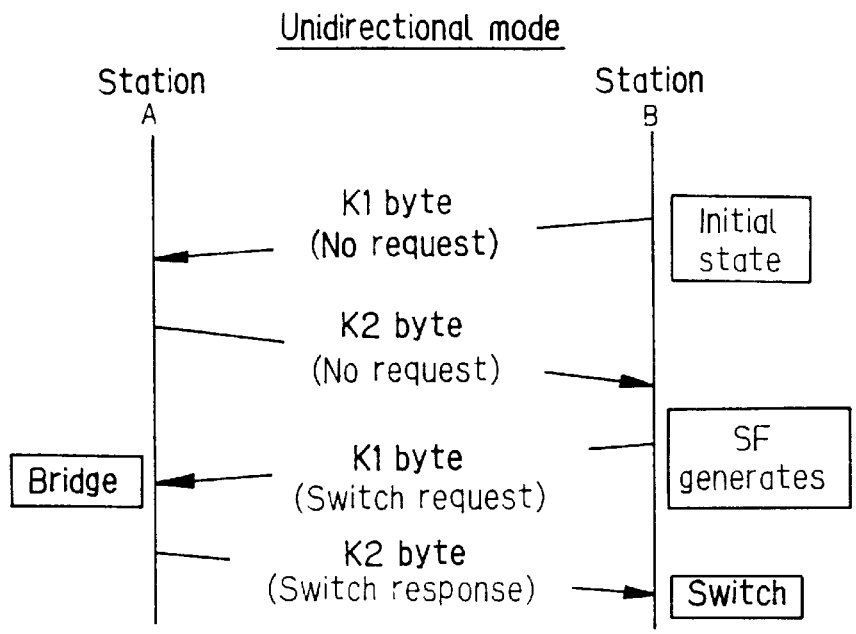
FIGS. 47A, 47B are diagrams for describing the sending/ receiving sequence of K1/K2 bytes in a unidirectional mode and a bidirectional mode according to the prior art.
Figure 47B:
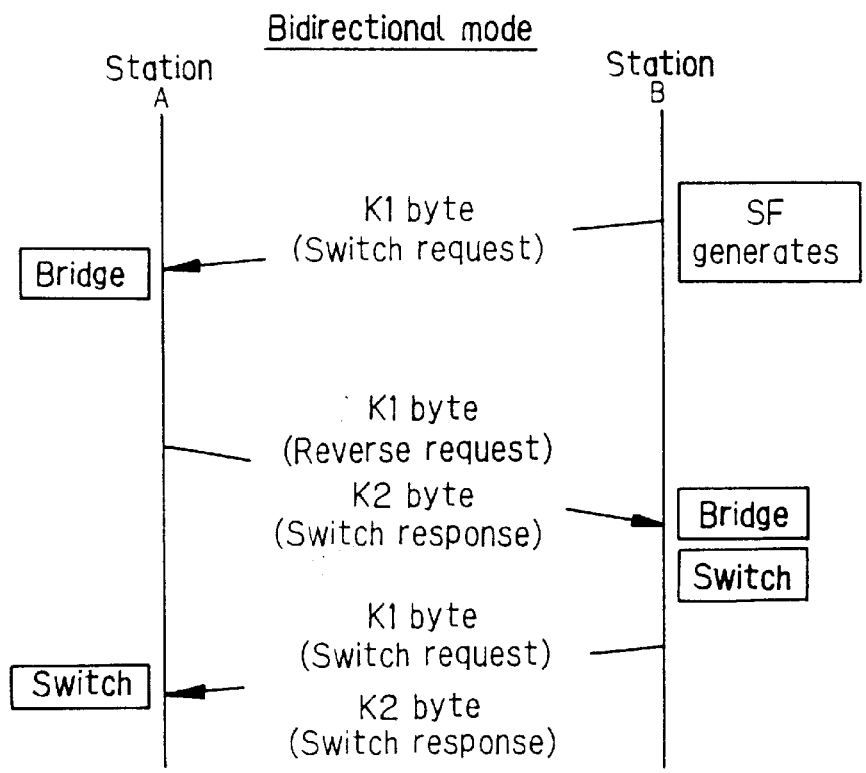

The TRIB shelf HAS a construction and function substantially equivalent to those of the TRIB shelf of FIG. 35.

(c) Processing by OHB processor

The OHB processor 8 of the HS shelf executes line switching processing based upon the K1/K2 bytes. In addition to executing (1) basic processing for line switching, the OHB processor 8 executes (2) switch-back processing based upon WTR time and (3) control of exercise (self-diagnosis) processing, etc. Further, the OHB processor of a protection repeater station or protection terminal station in a protection line additionally executes (4) contention processing for a case where two or more switching requests are issued simultaneously, and (5) processing for terminating, passing through or rejecting K1/K2 bytes.

(c-1) Switch-back processing

The revertive mode has the WTR (wait to restore) function. Specifically, after the cause of switching is eliminated, switch-back is performed not immediately but upon elapse of a specific period of time. This is a function which prevents noisy switching and is stipulated as being between 5 and 12 minutes according to the SONET standard. The WTR time is fixed. However, it is better if the WTR time is capable of being altered in flexible fashion to conform to the particular system. Accordingly, in the present invention, it is so arranged that the WTR time can be changed freely to any time between 5 and 12 min from an OS interface or terminal device CID, and the OHB processor executes switch-back processing based upon the set time.

(c-2) Self-diagnosis processing

An exercise regarding a K1 byte is for performing self-diagnosis, by actually switching the transmission line, to determine whether a switching operation is being performed normally. There are instances where self-diagnosis (exercise) of a transmission-line switching function is performed periodically using K1, K2 bytes, and instances where start of self-diagnosis is requested externally.

Figure 5:
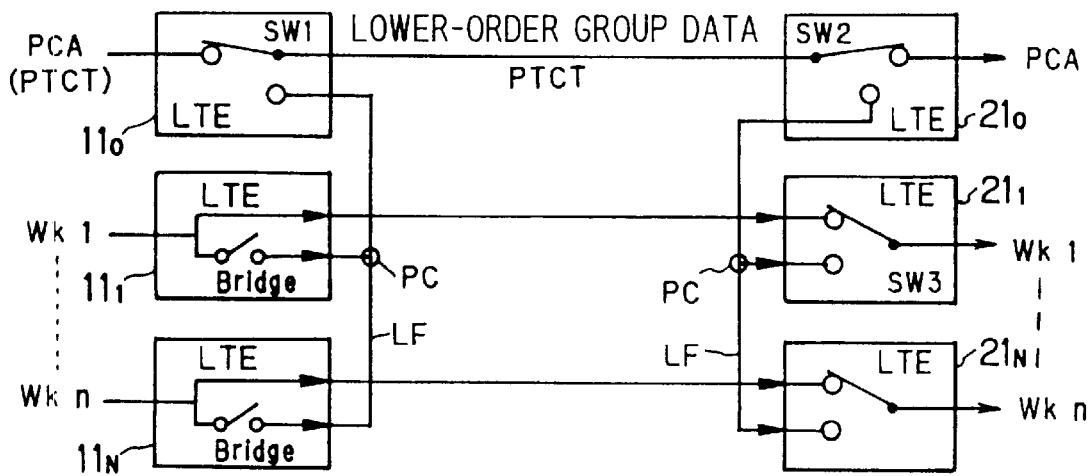
FIG. 5 is a diagram for describing self-diagnosis (at normal operation)
Figure 6:
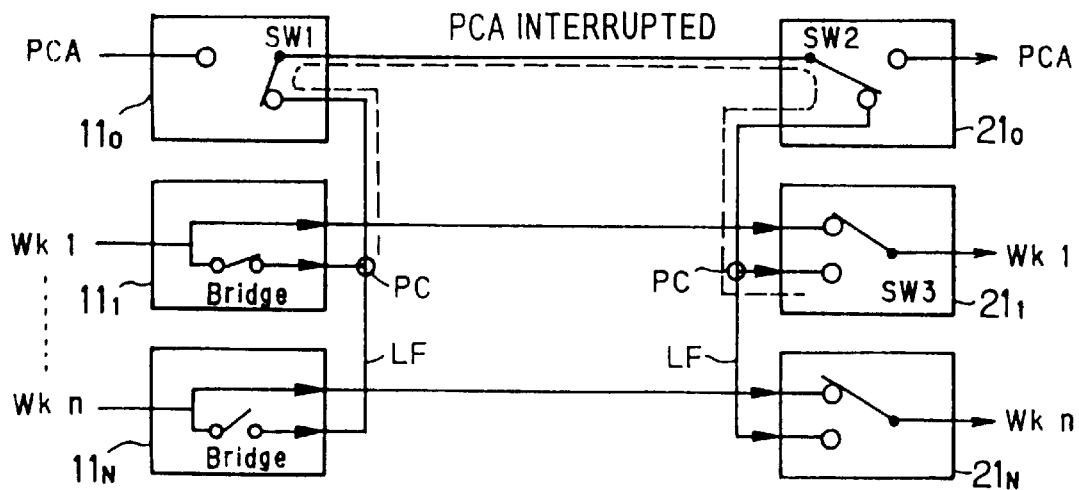
FIG. 6 is a diagram for describing self-diagnosis (an exercise based upon the SONET standard)
Figure 7:
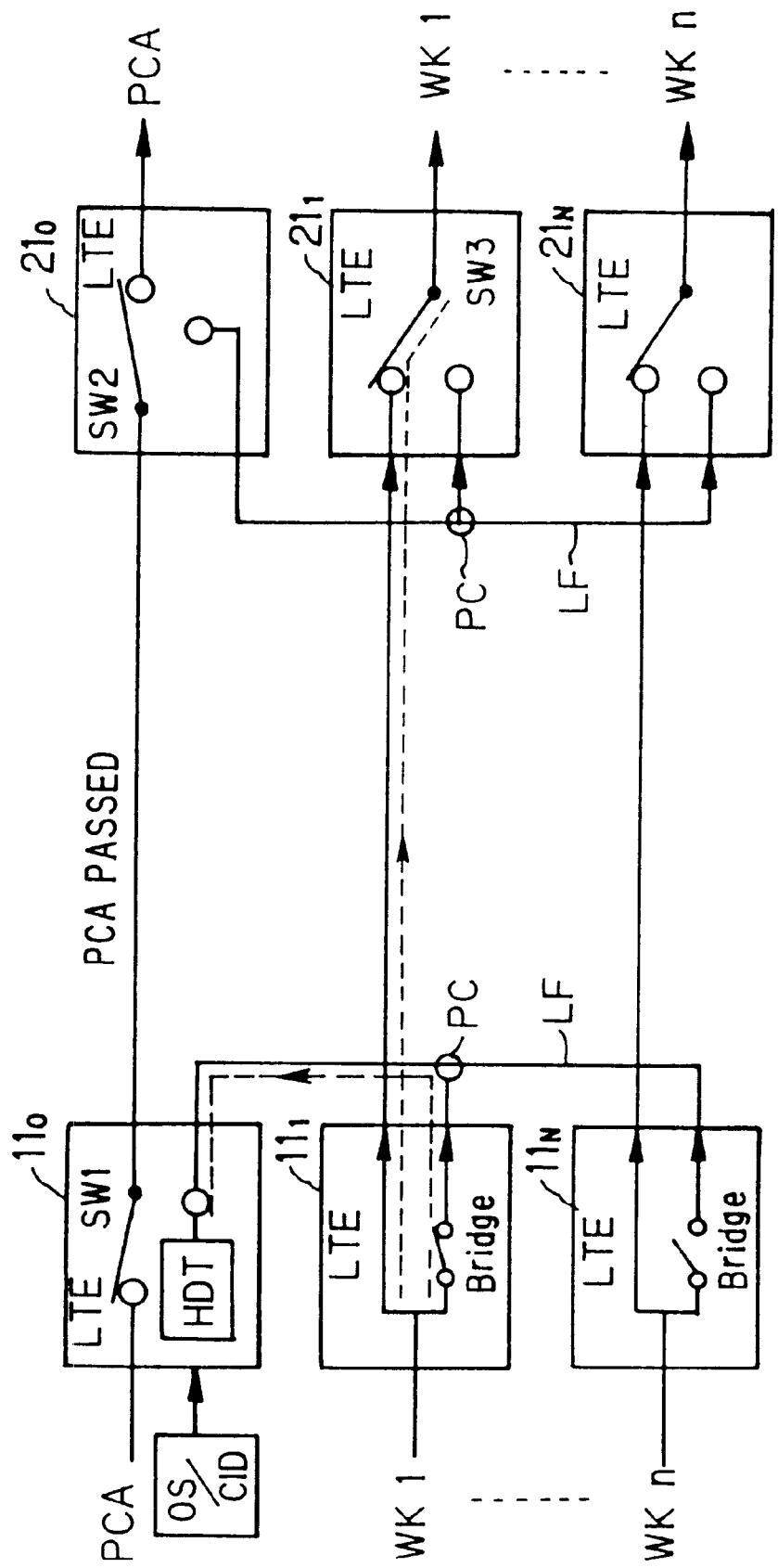
FIG. 7 is a diagram for describing self-diagnosis according to the present invention.

FIGS. 5 through 7 are diagrams for describing such self-diagnostic control in a 1:N point-to-point system. During normal operation, working lines WK1~WKn are normal and a protection line PTCT is being used to transmit a lower-order group signal (PCA signal). When a working station (LTE) $21_1$ of working line WK1, for example, sends a switching request based upon an exercise to an opposing terminal station $11_1$ in the form of a K1 byte under such conditions, the terminal station $11_1$ executes bridge control. Further, two terminal stations $11_0$, $21_0$ of a protection line perform a protection-line connecting operation by controlling switches SW1, SW2. In a case where the switching operation is being carried out normally, a higher-order group signal from the terminal station $11_1$ is transmitted to the terminal station $21_1$ along the dashed line. As a result, whether the switching operation is normal or abnormal can be determined by monitoring reception of the higher-order group signal. In such self-diagnosis, however, the lower-order group signal (the PCA signal) is interrupted because the protection line is switched over.

Accordingly, in the present invention, it is so arranged that the two terminal stations of the protection line will not perform the protection line-connecting operation at the time of self-diagnosis. FIG. 7 is a diagram for describing such self-diagnosis according to the present invention. For example, when the working station (LTE) $21_1$ of working line WK1 periodically sends a switching request based upon an exercise to the opposing terminal station $11_1$ in the form of a K1 byte, the terminal station $11_1$ executes bridge control and sends a K2 byte to the terminal station $21_1$ via the optical transmission line. However, the two terminal stations $11_0$, $21_0$ of the protection line do not switch the switches SW1, SW2 and, hence, do not perform the operation that connects the protection line. Consequently, though a higher-order group signal does not arrive at the terminal station $21_1$ via the protection line, the terminal station $21_1$ is capable of implementing self-diagnosis by performing monitoring to determine the K1, K2 bytes are being received correctly. If this arrangement is adopted, the PCA signal will not be interrupted and, hence, self-diagnosis can be executed while transmission of the PCA signal is maintained.

Further, when start of self-diagnosis has been requested externally, the working terminal station (LTE) $11_1$ of the working line WK1 performs bridge control but the two terminal stations $11_0$, $21_0$ of the protection line do not switch the switches SW1, SW2 and, hence, do not perform the operation that connects the protection line. In this case, the higher-order group signal (optical signal) from the terminal station $11_1$ arrives at the protection terminal station $11_0$ by the bridge. As a result, self-diagnosis is carried out by monitoring this optical signal using an optical detector HDT provided in the protection terminal station. In this case also self-diagnosis can be executed while transmission of the PCA signal is continued.

(c-3) Contention processing

When there is contention for a protection line at the time of switching, precedence is given to the switching request having the higher level. Further, two degrees of priority (LOW/HIGH) can be set for each line. In a case where switching requests (SF high/low, SD high/low) have the same level, the line having the higher degree of priority is switched. In a case where switching requests have the same level and the degrees of priority of the lines are also the same, the line that issued the switching request first is switched. In a case where the levels of the switching requests, the degrees of priority of the lines and the timings at which the switching requests were issued are the same, the line having the youngest line number is given precedence in changeover. This is the order of priority stipulated by the SONET standard. However, there are cases where other orders of priority are requested depending upon the customer. In such cases the degree of priority of the transmission line is set to be higher than the degree of priority of the switching request via terminal equipment or an OS interface.

(c-4) Switching span

In a case where there is no repeater station (LNR ADM or back-to-back connected LTEs) in a system, as in a point-to-point system (FIG. 1), switching is performed between terminal stations. However, in a case where a repeater station (D/I station) such as an LNR ADM or back-to-back connected LTEs exists in the system, switching is performed section by section. This is referred to as a nested switching system, namely a system in which failures that have occurred in a plurality of sections are capable of being rescued simultaneously without contention for the protection line.

(c-5) Processing for terminating/passing/rejecting K1/K2 bytes

Figure 8:
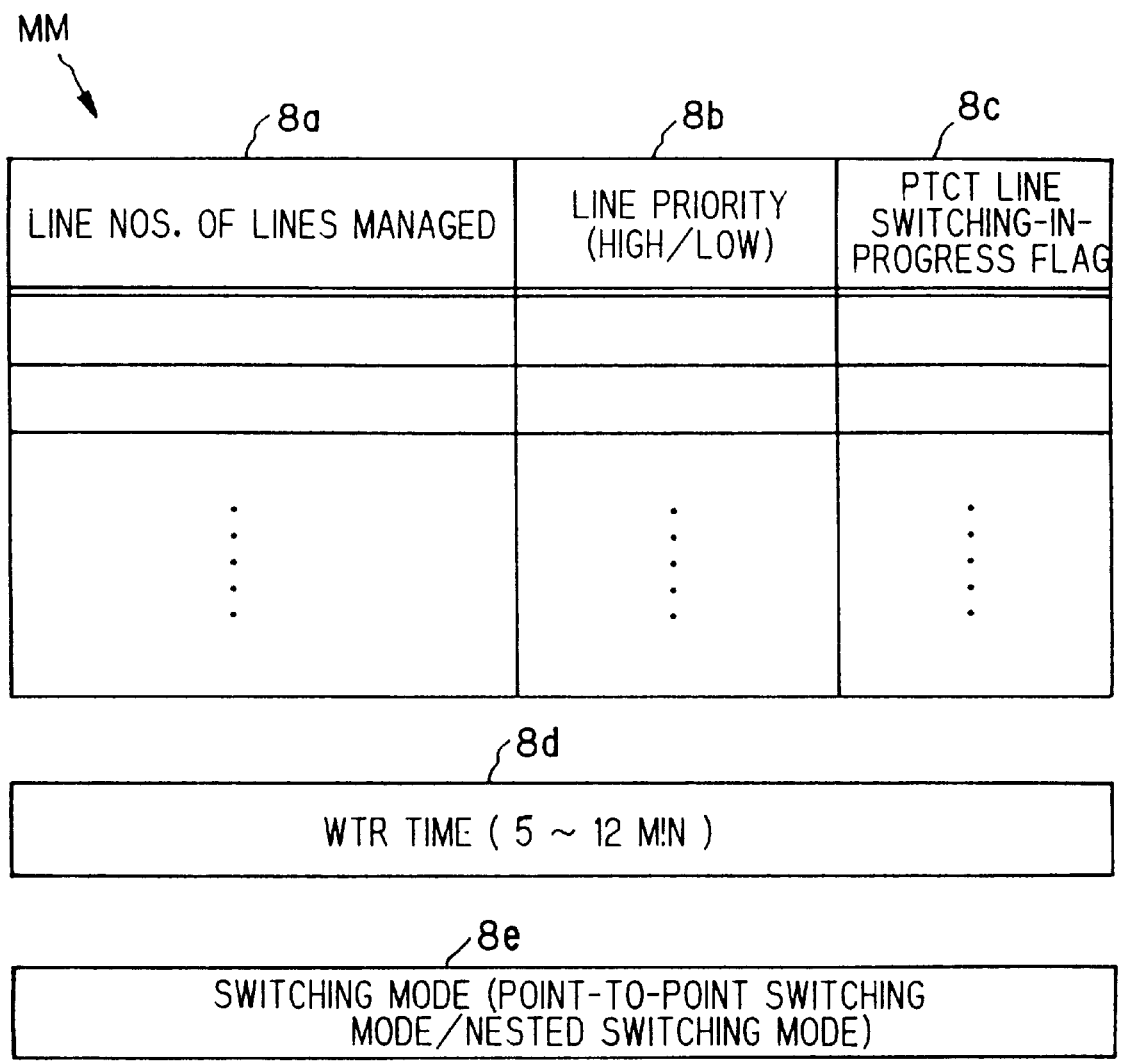
FIG. 8 is a diagram for describing information held by an OHB processor.

Each of the protection repeater stations and protection terminal stations on a protection line in a nested switching system recognizes the number of the line which the particular station terminates. In other words, as shown in FIG. 8, the OHB processor of each of the protection repeater stations and protection terminal stations on a protection line stores, in a memory MM, the line numbers of the transmission lines which it itself must manage when failures occur in the transmission lines. When a K1 byte (inclusive of switching request content, switching request level and switched line number) has been received, the processor compares the line number with the line numbers of the transmission lines it manages. If the line numbers agree, the processor accepts the K1 byte and performs control (termination) for switching between the faulty transmission line and the protection transmission line. If the line numbers do not agree, the processor does not terminate the K1 byte and sends it to the next stage (i.e., passes the K1 byte). In addition to (1) the line number $8a$ of a line to be managed, the following items are stored in the memory MM: (2) degree of priority (high/low) $8b$ of the line, (3) a switching-in-progress flag $8c$ which indicates whether switching has been performed using the protection line, (4) WTR time $8d$ and (5) switching mode $8e$.

In a case where a station has received a current K1 byte designating a line which the station itself does not manage and, moreover, the protection line is being used by switching from another source and the priority of this K1 byte (transmission-line switching request) is higher than that of the current K1 byte, notification is given, by using the K2 byte, to reject the current K1 byte (transmission-line switching request). Conversely, in a case where the priority of the transmission-line switching request issued later is higher, the K2 byte is transmitted to the source of issuance of the transmission-line switching request in accordance with which switching has been performed thus far.

More specifically, in a case where a station has received a K1 byte designating a line which the station itself does not manage, the station determines whether the protection line is being used. If the protection line is not being used, the station sends the K1 byte to the next station. If the protection line is being used, then the station compares the priority level (switching request level) of this K1 byte with that of the K1 byte according to which switching has been performed thus far. In a case where the priority level of the current K1 byte issued later is lower, the station uses the K2 byte to notify the source of issuance of the current K1 byte of the fact that the switching request is to be rejected. If the degree of priority of the current K1 byte issued later is higher, the station uses the K2 byte to notify the source of issuance of the preceding K1 byte of the fact that the switching request is to be rejected. The protocol in such a nested system has not yet been established by the SONET standard and is a feature of the present invention.

Figure 9A:
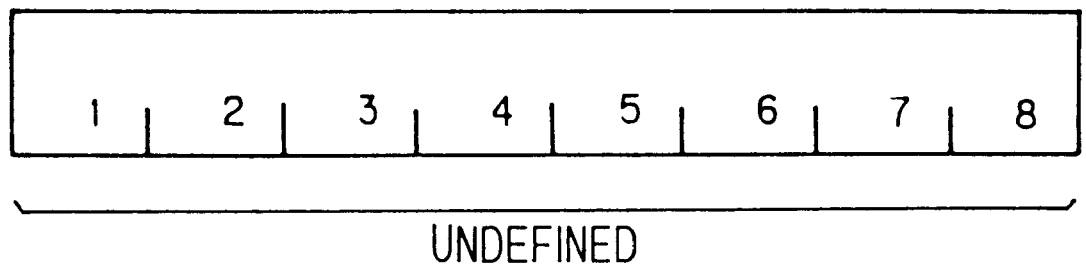
FIGS. 9A, 9B are diagrams for describing Z1, Z2 bytes.
Figure 9B:
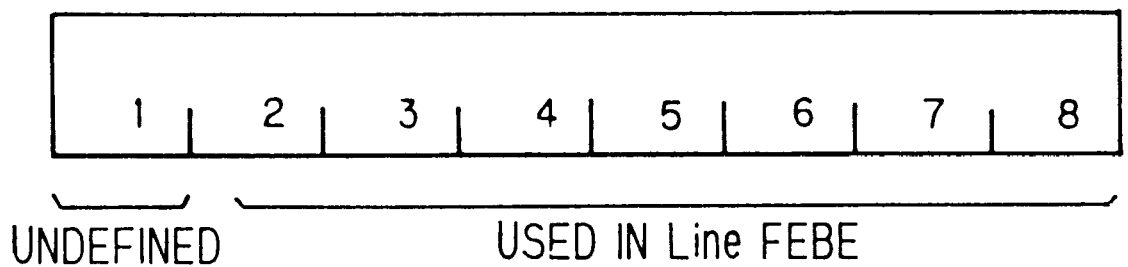

(c-6) Processing for maximizing number of lines capable of being designated by switching request The number of lines that can be designated by a K1 byte is a maximum of 14 according to the SONET standard, and therefore an optical transmission system of 15 or more lines cannot be constructed. Accordingly, the OHE processor in this invention employs an unused byte (e.g., a Z1 byte in FIG. 9A) in the overhead or an unused bit (e.g., a b1 bit of a Z2 byte in FIG. 9B) in the overhead, along with the bits b5~b8 of the K1 byte that for designating a transmission line, to designate the number of a transmission line. If such joint use is made of the b1 bit of the Z2 byte, a maximum of 28 lines (transmission lines) can be designated.

Figure 10:
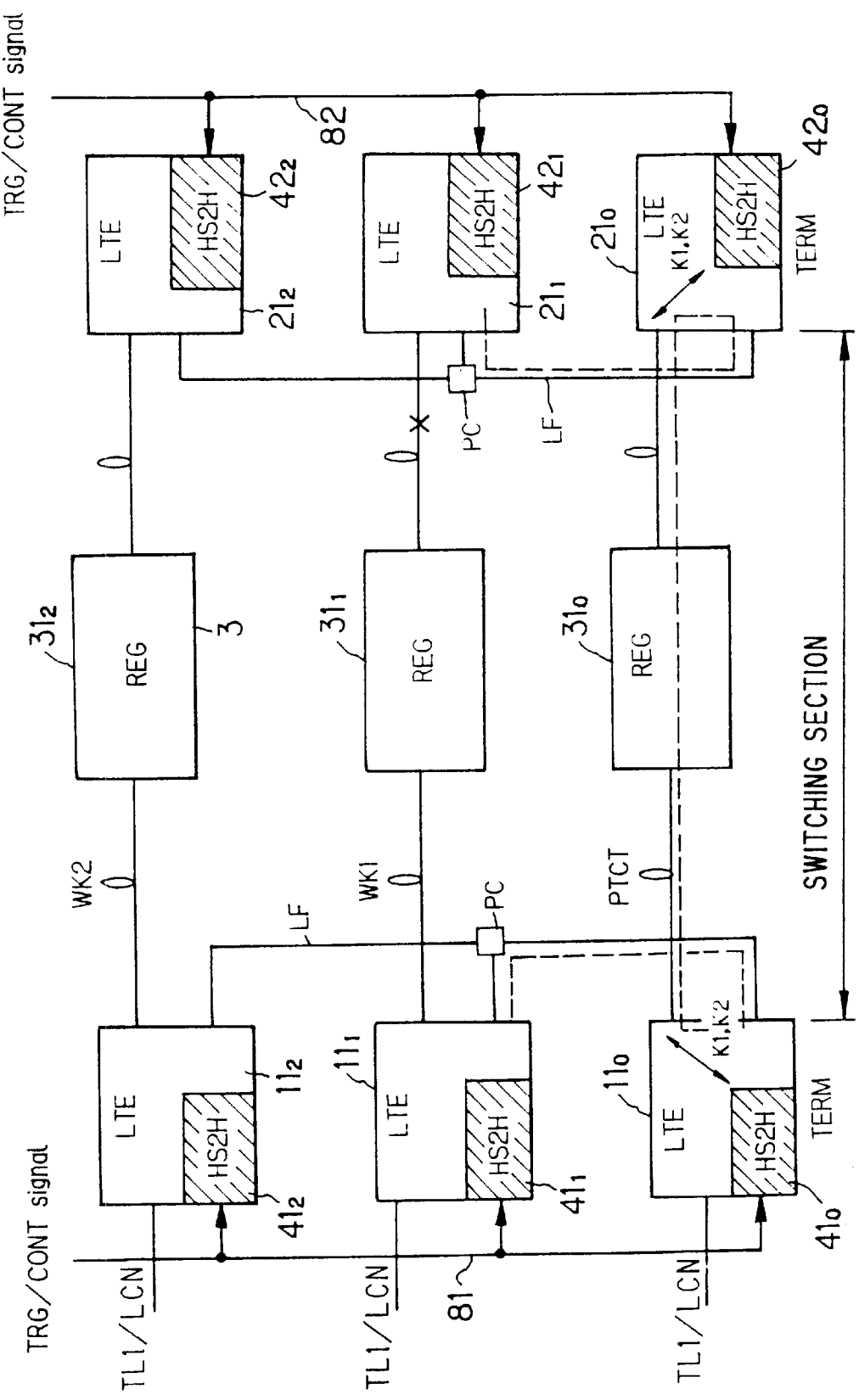
FIG. 10 is a diagram for describing line switching control (first method) in a 1:N point-to-point system.

(D) Line switching control according to the present invention (a) Switching in 1:N point-to-point system (a-1) First method FIG. 10 is a diagram for describing line switching control (first method) in a 1:N point-to-point system according to the present invention. Shown in FIG. 10 are the first working terminal stations $11_1$~$11_N$, the first protection terminal station $11_0$, the second working terminal stations $21_1$~$21_N$, the second protection terminal station $21_0$, the signal regenerators (REG) $31_0$~$31_N$, overhead processors $41_0$~$41_N$, $42_0$~$42_N$, control signal lines 81~82, photocouplers PC, optical fibers LF, the protection optical transmission line (protection line) PTCT and the N-number of working optical signal lines (working lines) WK1~WKN. In FIG. 10, N=2 holds.

The overhead processor $42_1$ of the working terminal station $21_1$ that has detected the occurrence of a failure (the "x" mark) in the optical transmission line WK1 sends the K1 byte (Switch Reqeust) to the overhead processor $42_0$ of the protection terminal station $21_0$ via the control line 82. The overhead processor $42_0$ sends the K1 byte to the overhead processor $41_0$ of the protection terminal station $11_0$ via the protection line PTCT. As a result, the overhead processor 410 enters the K1 byte into the opposing working terminal station $11_1$ via the control line 81.

Upon receiving the K1 byte, the overhead processor $41_1$ of the opposing working terminal station $11_1$ performs bridge control, and the overhead processors $41_0$, $42_0$ of the protection terminal stations $11_0$, $21_0$ change over switches (not shown) to connect the protection transmission line PTCT. The overhead processor $41_1$ of the working terminal station $11_1$ thenceforth sends the K2 byte (Switch Response) to the working terminal station $21_1$ through a path which is the reverse of the foregoing. In response to the K2 byte, the overhead processor $42_1$ of the working terminal station $21_1$ performs switch control to switch the failed transmission line WK1 over to the protection transmission line PTCT, after which the overhead processor $42_1$ receives the OC-48 optical signal through the path indicated by the dashed line. If this arrangement is adopted, it is possible to switch lines using the K1/K2 bytes in a 1:N line switching point-to-point optical transmission system.

(a-2) Second method

Figure 11:
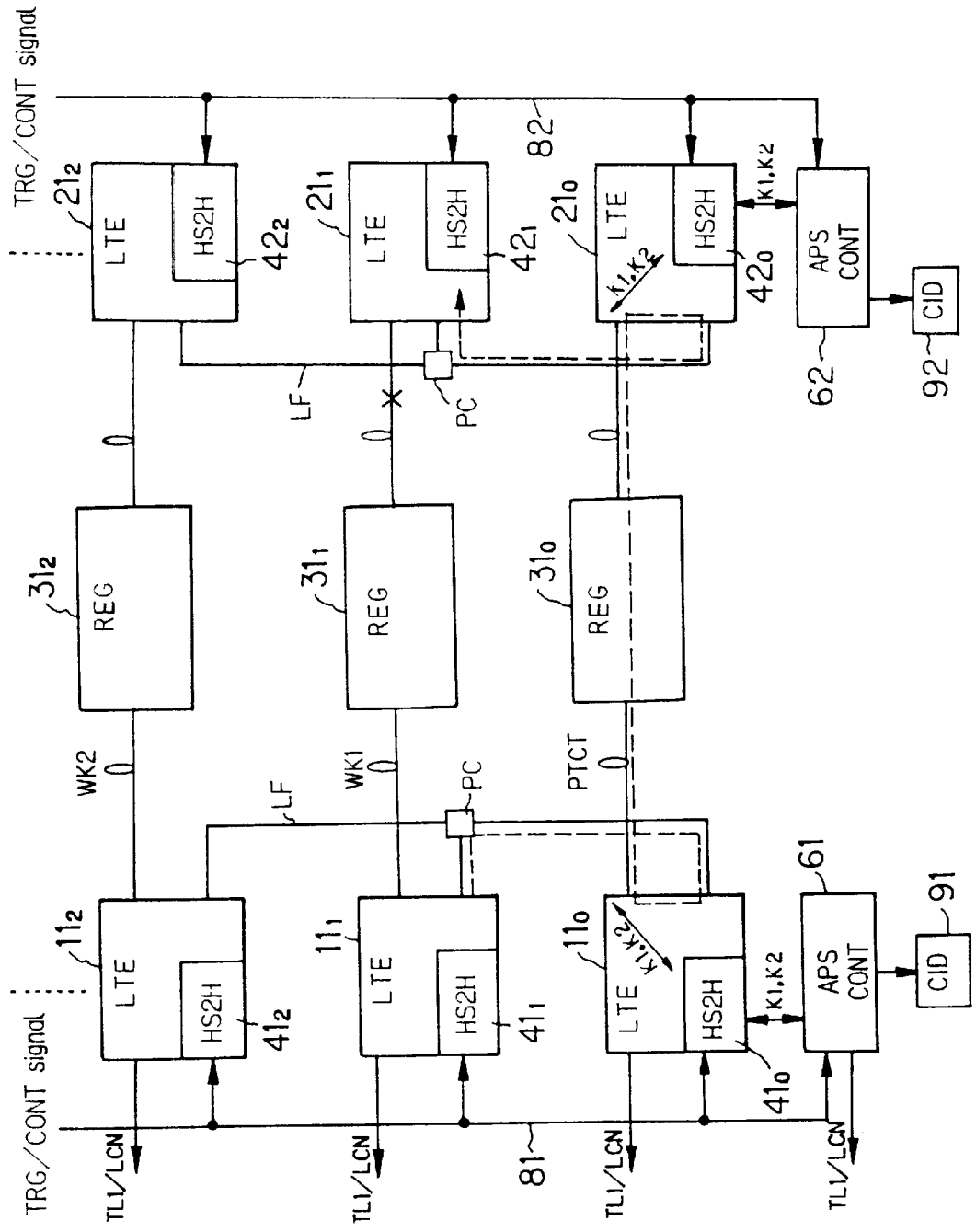
FIG. 11 is a diagram for describing line switching control (second method) in a 1:N point-to-point system.

FIG. 11 is a diagram for describing line switching control (second method) in a 1:N point-to-point system according to the present invention. Components identical with those shown in FIG. 10 are designated by like reference characters. FIG. 11 differs from FIG. 10 in that (1) an automatic protection switching controller (APS CONT) 61 having line switching function is provided to correspond to a terminal station group $11_0 \sim 11_n$ of (n+1)-number of sets of terminal stations, (2) an automatic protection switching controller (APS CONT) 62 is provided to correspond to a terminal station group $21_0 \sim 21_n$ of (n+1)-number of sets of terminal stations, and (3) terminal devices (CID) 91, 92 are connected to the automatic protection switching controllers 61, 62, respectively.

The automatic protection switching controllers (APT CONT) 61, 62 perform control to switch a faulty transmission line to the protection transmission line by executing processing in accordance with a protocol which uses K1, K2 bytes contained in the overhead. The terminal devices (CID) 91, 92 are for entering and designating various data.

The overhead processor $42_1$ of the working terminal station $21_1$ that has detected the occurrence of a failure (the "x" mark) in the optical transmission line WK1 notifies the automatic protection switching controller (APS CONT) 62 of the content of the failure and the line number via the control line 82. As a result, the automatic protection switching controller 62 instructs the OHB processor $42_0$ of the protection terminal station $21_0$ to send the K1 byte (Switch Request) to the protection terminal station $11_0$. The OHB processor $42_0$ creates the K1 byte and sends it to the protection terminal station $11_0$. Upon receiving the K1 byte, the OHB processor $41_0$ of the protection terminal station $11_0$ so notifies the automatic protection switching controller 61. When the K1 byte has been received, the automatic protection switching controller 61 instructs the opposing station $11_1$ of the working terminal station $21_1$, via the control line 81, to perform bridge control, in response to which the working terminal station $11_1$ performs bridge control. Further, the automatic protection switching controllers 61, 62 instruct the OHB processors $41_0$, $42_0$ of the protection terminal stations $11_0$, $21_0$ to perform switching, in response to which the OHB processors $41_0$, $42_0$ effect the connection of the protection transmission line PTCT.

The overhead processor $41_1$ of the working terminal station $11_1$ thenceforth sends the K2 byte (Switch Response) to the working terminal station $21_1$ through a path which is the reverse of the foregoing. In response to the K2 byte, the overhead processor $42_1$ of the working terminal station $21_1$ performs switch control to switch the failed transmission line WK1 over to the protection transmission line PTCT, after which the overhead processor $42_1$ receives the OC-48 optical signal through the path indicated by the dashed line. If this arrangement is adopted, it is possible to switch lines using the K1/K2 bytes in a 1:N line switching point-to-point optical transmission system.

(b) Switching in 1:N LNR ADM system
(b-1) First method

Figure 12:
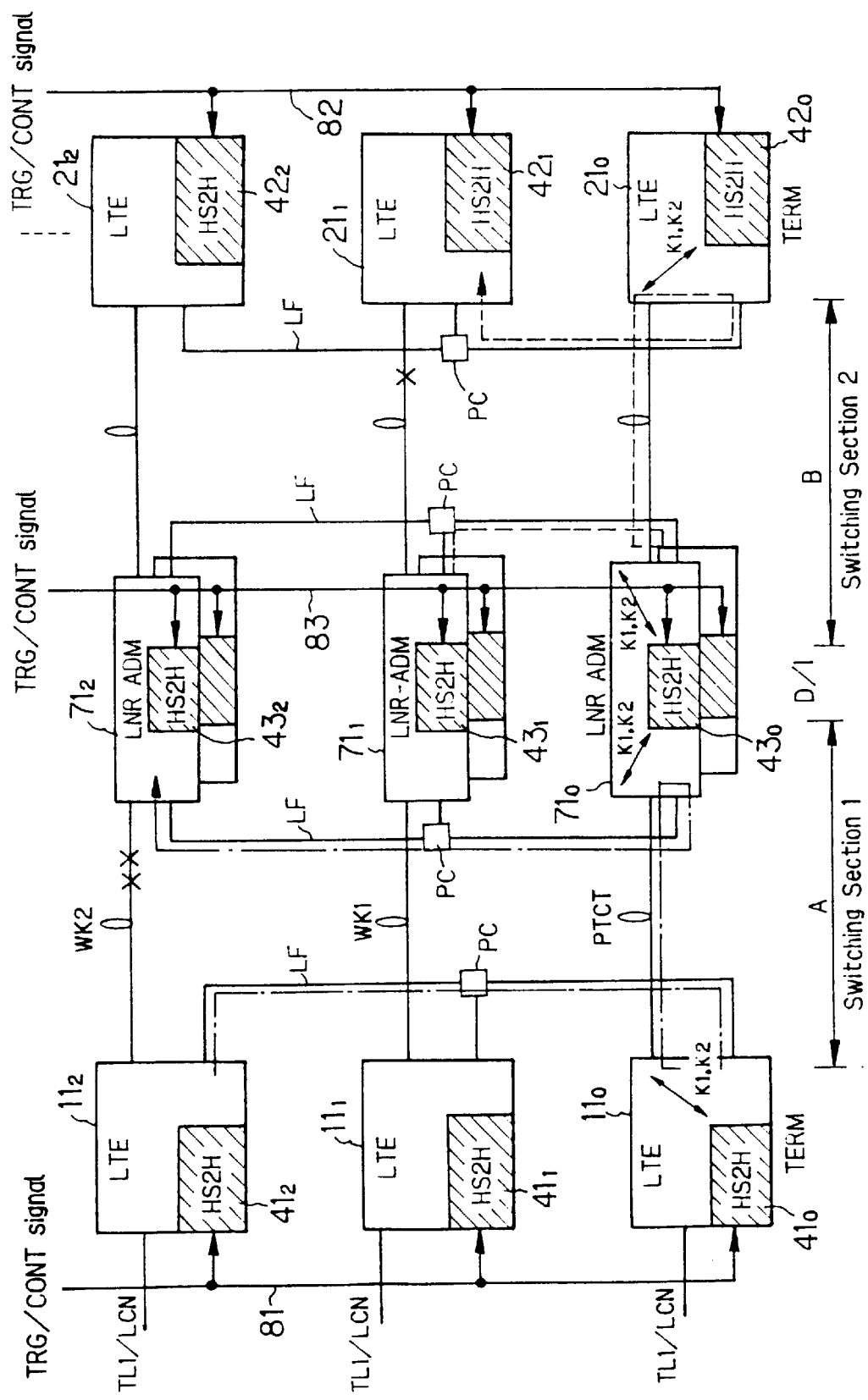
FIG. 12 is a diagram for describing line switching control (first method) in a 1:N linear ADM optical transmission system.

FIG. 12 is a diagram for describing line switching control (first method) in a 1:N LNR ADM system according to the present invention. Components identical with those shown in FIG. 10 are designated by like reference characters. Repeater stations $71_1 \sim 71_n$ constituted by LNR ADMs are arranged in respective ones of the working lines WK1~WKn over identical spans (though the spans need not necessarily be identical). Further, a repeater $71_0$ constituted by an LNR ADM is provided in the protection line PTCT at a position identical with the positions of the LNR ADMs in the working lines. Furthermore, the terminal stations are interconnected by optical fibers LF via a photocoupler PC, and the repeater stations are interconnected by optical fibers LF via photocouplers PC. In this 1:N linear ADM system, it is so arranged that when failures occur in two sections of each of the working lines WK1~WKn, a changeover is made, by section, to the protection line.

The overhead processor $42_1$ of the working terminal station $21_1$ that has detected the occurrence of a failure (the "x" mark) in the optical transmission line WK1 of section B sends the K1 byte (Switch Request) to the overhead processor $42_0$ of the protection terminal station $21_0$ via the control line 82. The overhead processor $42_0$ sends the K1 byte to the overhead processor $43_0$ of the protection repeater station $71_0$ via the protection line PTCT. As a result, the overhead processor $43_0$ enters the K1 byte into the opposing repeater station $71_1$ via the control line 83.

Upon receiving the K1 byte, the overhead processor $43_1$ of the opposing repeater station $71_1$ performs bridge control, and the overhead processors $43_0$, $42_0$ of the protection repeater station $71_0$ and protection terminal station $21_0$ change over switches (not shown) to connect the protection transmission line PTCT of the B section. The overhead processor $43_1$ of the repeater station $71_1$ thenceforth sends the K2 byte (Switch Response) to the working terminal station $21_1$ through a path which is the reverse of the foregoing.

In response to the K2 byte, the overhead processor $42_1$ of the working terminal station $21_1$ performs switch control to switch the failed transmission line WK1 over to the protection transmission line PTCT, after which the overhead processor $42_1$ receives the OC-48 optical signal through the path indicated by the dashed line.

The foregoing is for a case in which a failure has occurred in the section B. However, switching control is performed in a similar manner also in a case where a failure develops in the section A. For example, when a failure (indicated by xx) occurs in the transmission line WK2 of the A section, the overhead processor $43_2$ of the repeater station $71_2$ sends the K1 byte (Switch Request) to the overhead processor $43_0$ of the protection terminal station $21_0$ via the control line 83. The overhead processor $43_0$ sends the K1 byte to the overhead processor $41_0$ of the protection repeater station $11_0$ via the protection line PTCT. As a result, the overhead processor $41_0$ enters the K1 byte into the opposing terminal station $11_2$ via the control line 81.

Upon receiving the K1 byte, the overhead processor $41_2$ of the opposing terminal station $11_2$ performs bridge control, and the overhead processors $41_0$, $43_0$ of the protection terminal station $11_0$ and protection repeater station $71_0$ change over switches (not shown) to connect the protection transmission line PTCT of the A section. The overhead processor $41_2$ of the working terminal station $11_2$ thenceforth sends the K2 byte (Switch Response) to the working terminal station $71_2$ through a path which is the reverse of the foregoing.

In response to the K2 byte, the overhead processor $43_2$ of the working repeater station $71_2$ performs switch control to switch the failed transmission line WK2 over to the protection transmission line PTCT, after which the overhead processor $43_2$ receives the OC-48 optical signal through the path indicated by the one-dot chain line.

In this 1:N linear ADM optical transmission system, a failed transmission line can be switched over to the protection transmission line in each of the sections A, B.

(b-2) Second method

Figure 13:
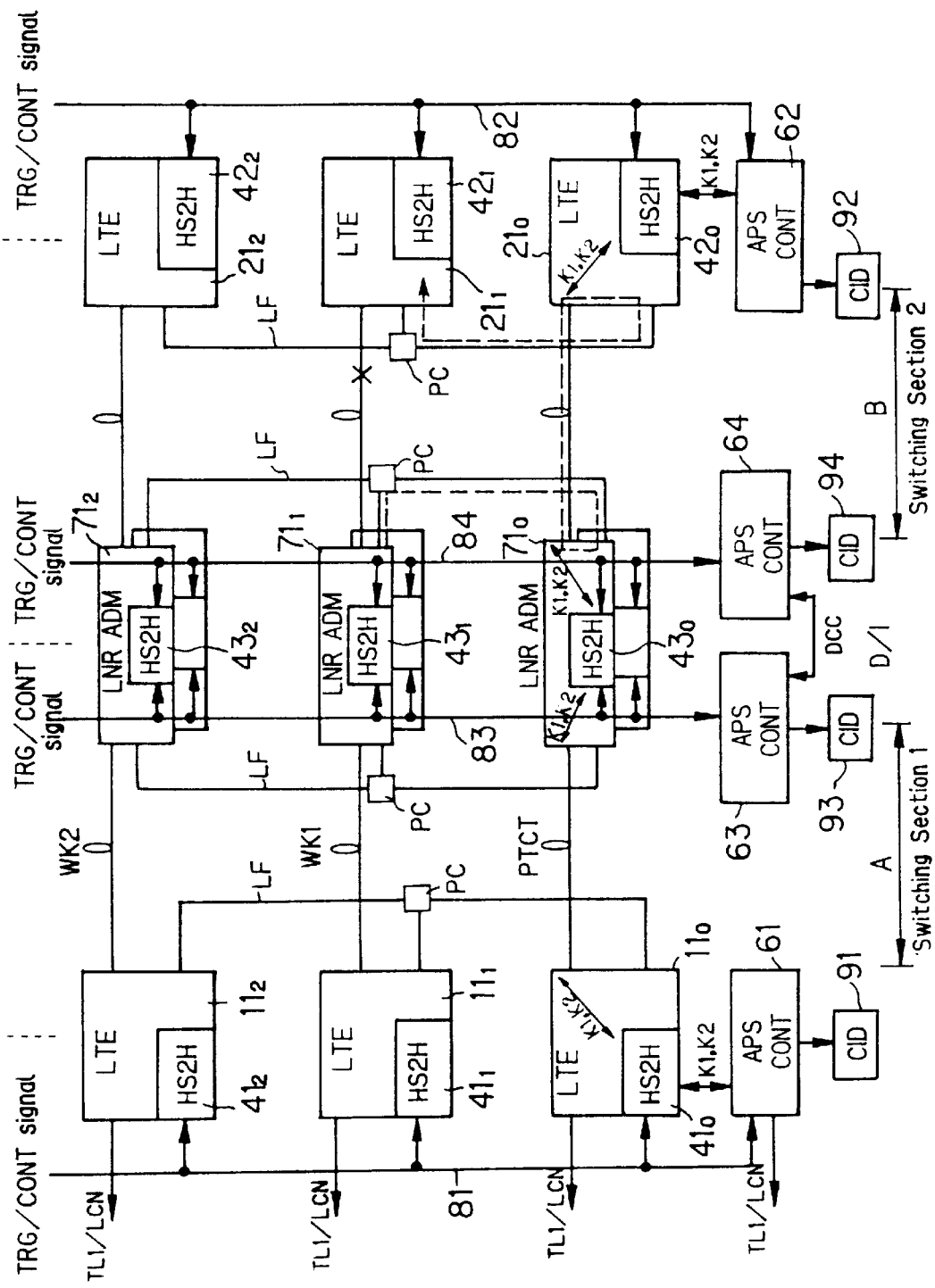
FIG. 13 is a diagram for describing line switching control (second method) in a 1:N linear ADM optical transmission system.

FIG. 13 is a diagram for describing line switching control (second method) in a 1:N LNR ADM system according to the present invention. Components identical with those shown in FIG. 12 are designated by like reference characters. FIG. 13 differs from FIG. 12 in that (1) the automatic protection switching controller (APS CONT) 61 is provided to correspond to the terminal station group $11_0 \sim 11_n$ of (n+1)-number of sets of terminal stations, (2) the automatic protection switching controller (APS CONT) 62 is provided to correspond to the terminal station group $21_0 \sim 21_n$ of (n+1)-number of sets of terminal stations, (3) automatic protection switching controllers (APS CONT) 63, 64 are provided to correspond to a repeater station group $71_0 \sim 71_n$ of (n+1)-number of sets of repeater stations, and (4) terminal devices (CID) 91, 92, 93 and 94 are connected to the automatic protection switching controllers 61, 62, 63 and 64, respectively.

The automatic protection switching controllers (APT CONT) 61~64 perform control to switch a faulty transmission line to the protection transmission line in each of sections A, B by executing processing in accordance with a protocol which uses K1, K2 bytes contained in the overhead. The terminal devices (CID) 91~94 are for entering and designating various data.

The overhead processor $42_1$ of the working terminal station $21_1$ that has detected the occurrence of a failure (the "x" mark) in the optical transmission line WK1 of section B notifies the automatic protection switching controller (APS CONT) 62 of the content of the failure and the line number via the control line 82. As a result, the automatic protection switching controller 62 instructs the OHB processor $42_0$ of the protection terminal station $21_0$ to send the K1 byte (Switch Request) to the protection repeater station $71_0$. The OHB processor $42_0$ creates the K1 byte and sends it to the protection repeater station $71_0$. Upon receiving the K1 byte, the OHB processor $43_0$ of the protection repeater station $71_0$ so notifies the automatic protection switching controller 64. When the K1 byte has been accepted, the automatic protection switching controller 64 instructs the opposing station $71_1$ of the working terminal station $21_1$, via the control line 84, to perform bridge control, in response to which the working terminal station $21_1$ performs bridge control. Further, the automatic protection switching controllers 64, 62 instruct the OHB processors $43_0$, $42_0$ of the protection repeater station $71_0$ and protection terminal station $21_0$ to perform switching, in response to which the OHB processors $43_0$, $42_0$ effect the connection of the protection transmission line PTCT.

The overhead processor $43_1$ of the repeater station $71_1$ thenceforth sends the K2 byte (Switch Response) to the working terminal station $21_1$ through a path which is the reverse of the foregoing. In response to the K2 byte, the overhead processor $42_1$ of the working terminal station $21_1$ performs switch control to switch the failed transmission line WK1 over to the protection transmission line PTCT, after which the overhead processor $42_1$ receives the OC-48 optical signal through the path indicated by the dashed line.

The foregoing is for a case in which a failure has occurred in the section B. However, switching control is performed in a similar manner also in a case where a failure develops in the section A. As a result, in this 1:N linear ADM optical transmission system, a failed transmission line can be switched over to the protection transmission line in each of the sections A, B.

(c) Switching in 1:N nested optical transmission system (c-1) First method

Figure 14:
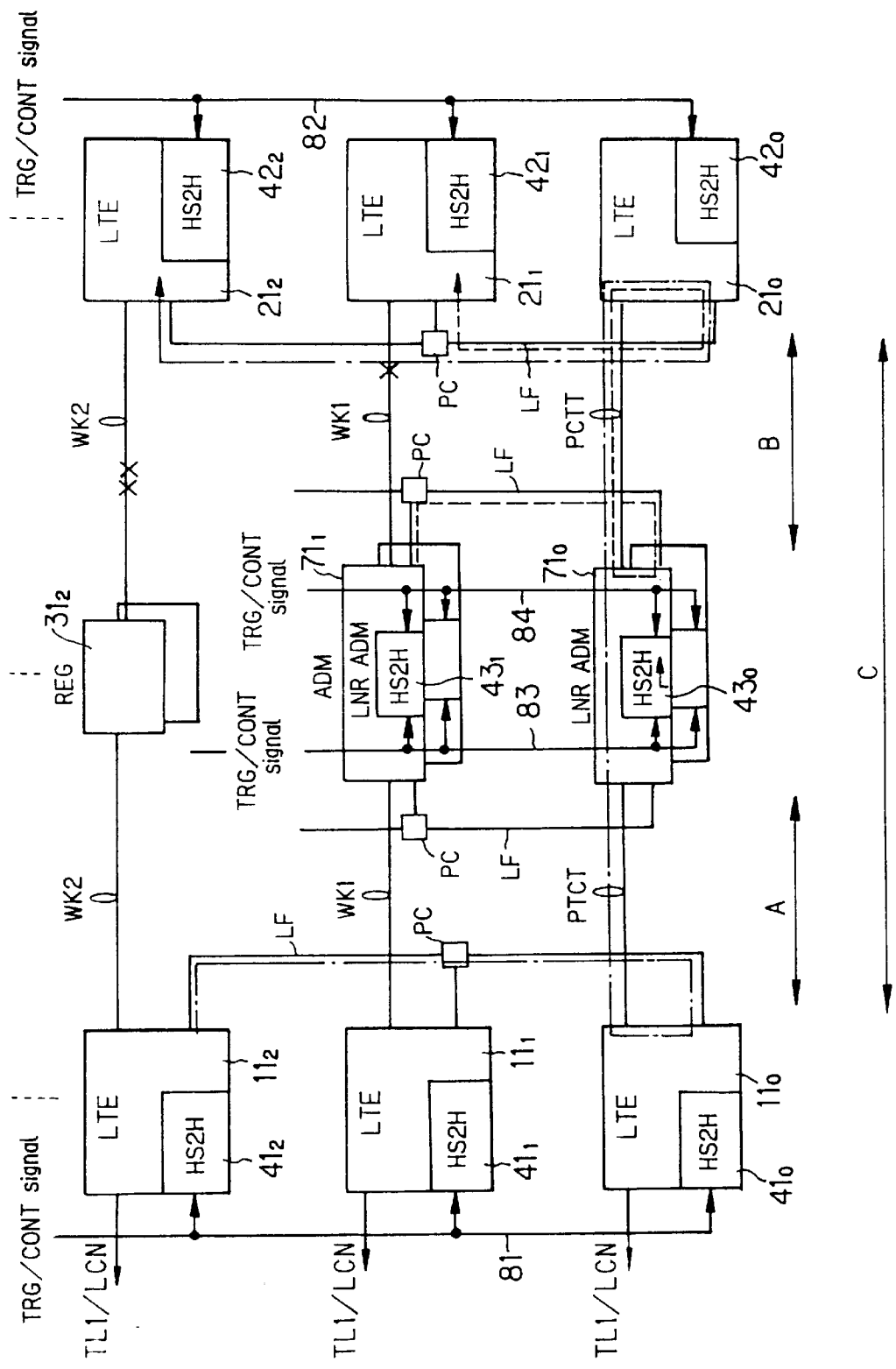
FIG. 14 is a diagram for describing line switching control (first method) in a 1:N nested optical transmission system.

FIG. 14 is a diagram for describing line switching control (first method) in a 1:N nested optical transmission system according to the present invention. Components identical with those shown in FIG. 10 are designated by like reference characters. The repeater station (D/I) $71_1$ constituted by an LNR ADM and a signal regenerator (REG) $31_2$ are suitably provided in the working lines WK1~WKn. Further, the repeater $71_0$ constituted by an LNR ADM is provided in the protection line PTCT at a position identical with the positions of the LNR ADMs in the working lines. Furthermore, the terminal stations are interconnected by optical fibers LF via a photocoupler PC, and the repeater stations are interconnected by optical fibers LF via photocouplers PC. In this 1:N nested system, it is so arranged that when failures occur in two sections A, B of the working line WK1, a changeover is made to the protection line of these sections. Further, it is so arranged that when a failure occurs in one section C of the working line WK2, a changeover is made to the protection line of this section.

The overhead processor $42_1$ of the working terminal station $21_1$ that has detected the occurrence of a failure (the "x" mark) in the optical transmission line WK1 of section B sends the K1 byte (Switch Request) to the overhead processor $42_0$ of the protection terminal station $21_0$ via the control line 82. The overhead processor $42_0$ sends the K1 byte to the overhead processor $43_0$ of the protection repeater station $71_0$ via the protection line PTCT. As a result, the overhead processor $43_0$ enters the K1 byte into the opposing repeater station $71_1$ via the control line 84.

Upon receiving the K1 byte, the overhead processor $43_1$ of the opposing repeater station $71_1$ performs bridge control, and the overhead processors $43_0$, $42_0$ of the protection repeater station $71_0$ and protection terminal station $21_0$ change over switches (not shown) to connect the protection transmission line PTCT of the B section. The overhead processor $43_1$ of the repeater station $71_1$ thenceforth sends the K2 byte (Switch Response) to the working terminal station $21_1$ through a path which is the reverse of the foregoing.

In response to the K2 byte, the overhead processor $42_1$ of the working terminal station $21_1$ performs switch control to switch the failed transmission line WK1 over to the protection transmission line PTCT, after which the overhead processor $42_1$ receives the OC-48 optical signal through the path indicated by the dashed line.

The foregoing is for a case in which a failure has occurred in the section B. However, switching control is performed in a similar manner also in a case where a failure develops in the section A.

When a failure (indicated by xx) occurs in the transmission line WK2 of the C section, the overhead processor $42_2$ of the working terminal station $21_2$ sends the K1 byte (Switch Request) to the overhead processor $42_0$ of the protection terminal station $21_0$ via the control line 82. The overhead processor $42_0$ passes the K1 byte through the repeater station $71_0$ via the protection line PTCT and sends it to the overhead processor $41_0$ of the protection repeater station $11_0$. It should be noted that even though the repeater station $71_0$ receives the K1 byte, the line number (WK2) designated by the K1 byte differs from the line number (WK1) of the line which the repeater station $71_0$ manages. As a result, the K1 byte is passed through the repeater station $71_0$.

Upon receiving the K1 byte, the overhead processor $41_0$ enters the K1 byte into the opposing working terminal station $11_2$ via the control line 81. Upon receiving the K1 byte, the overhead processor $41_2$ of the opposing working terminal station $11_2$ performs bridge control, and the overhead processors $41_0$, $42_0$ of the protection terminal stations $11_0$, $21_0$ change over switches (not shown) to connect the protection transmission line PTCT. The overhead processor $41_2$ of the working terminal station $11_2$ thenceforth sends the K2 byte (Switch Response) to the working terminal station $21_2$ through a path which is the reverse of the foregoing. In response to the K2 byte, the overhead processor $42_2$ of the working terminal station $21_2$ performs switch control to switch the failed transmission line WK2 over to the protection transmission line PTCT, after which the overhead processor $42_2$ receives the OC-48 optical signal through the path indicated by the one-dot chain line.

(c-2) Second method

Figure 15:
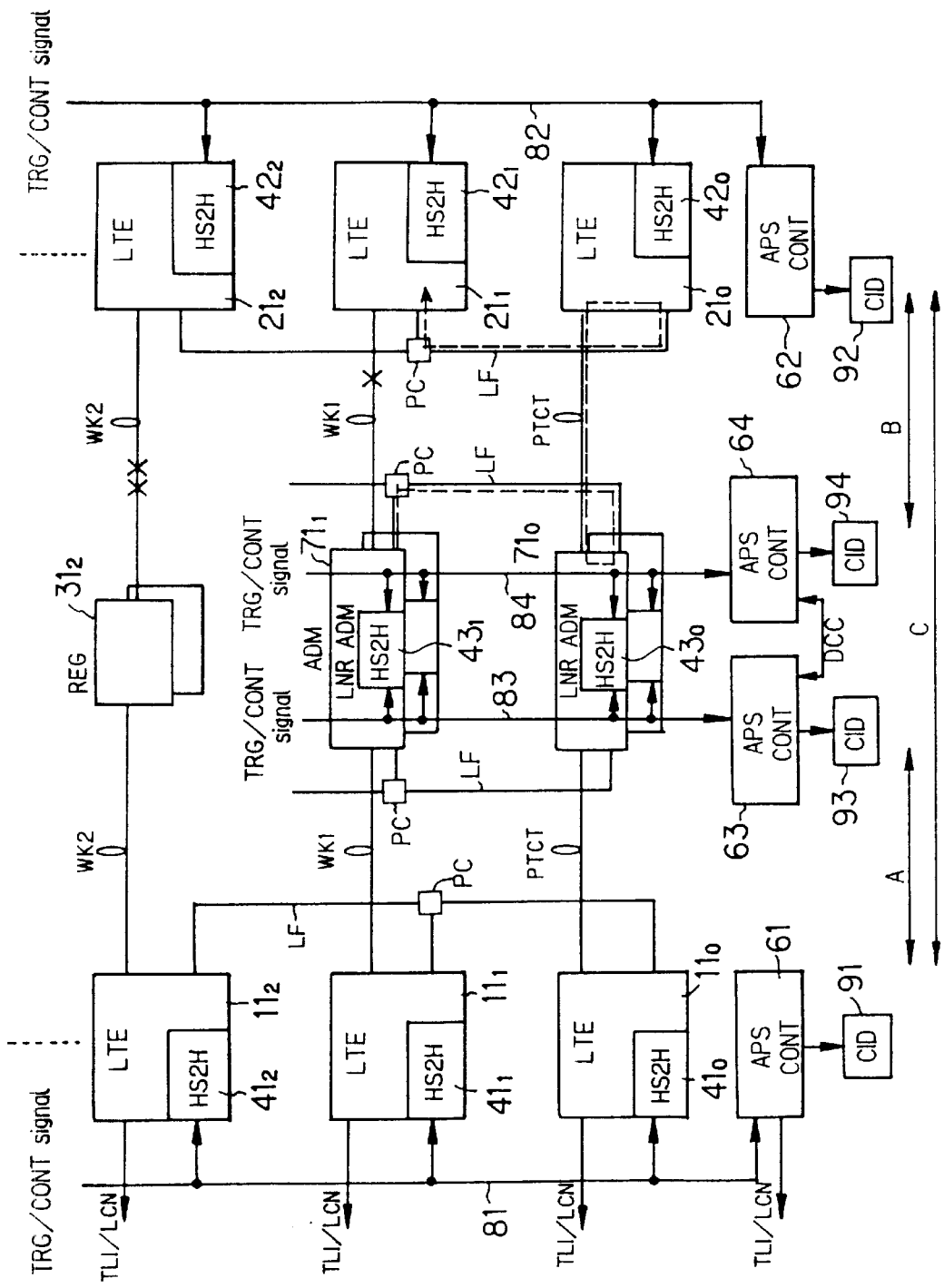
FIG. 15 is a diagram for describing line switching control (second method) in a 1:N nested optical transmission system.

FIG. 15 is a diagram for describing line switching control (second method) in a 1:N nested optical transmission system according to the present invention. Components identical with those shown in FIG. 14 are designated by like reference characters. FIG. 15 differs from FIG. 14 in that (1) the automatic protection switching controllers (APS CONT) 61~64 are provided to correspond to the protection terminal stations $11_0$, $21_0$ and protection repeater station $71_0$, and (2) the terminal devices (CID) 91, 92, 93 and 94 are connected to the automatic protection switching controllers 61, 62, 63 and 64, respectively. The automatic protection switching controllers (APT CONT) 61~64 perform control to switch a faulty transmission line to the protection transmission line in each of sections A, B and C by executing processing in accordance with a protocol which uses K1, K2 bytes contained in the overhead. The terminal devices (CID) 91~94 are for entering and designating various data.

The overhead processor $42_1$ of the working terminal station $21_1$ that has detected the occurrence of a failure (the "x" mark) in the optical transmission line WK1 of section B notifies the automatic protection switching controller (APS CONT) 62 of the content of the failure and the line number via the control line 82. As a result, the automatic protection switching controller 62 instructs the OHB processor $42_0$ of the protection terminal station $21_0$ to send the K1 byte (Switch Request) to the protection repeater station $71_0$. The OHB processor $42_0$ creates the K1 byte and sends it to the protection repeater station $71_0$. Upon receiving the K1 byte, the OHB processor $43_0$ of the protection repeater station $71_0$ so notifies the automatic protection switching controller 64. When the K1 byte has been accepted, the automatic protection switching controller 64 instructs the opposing station $71_1$ of the working terminal station $21_1$, via the control line 84, to perform bridge control, in response to which the OHB processor $43_1$ of the working repeater station $71_1$ performs bridge control. Further, the automatic protection switching controllers 64, 62 instruct the OHB processors $43_0$, $42_0$ of the protection repeater station $71_0$ and protection terminal station $21_0$ to perform switching, in response to which the OHB processors $43_0$, $42_0$ effect the connection of the protection transmission line PTCT.

The overhead processor $43_1$ of the repeater station $71_1$ thenceforth sends the K2 byte (Switch Response) to the working terminal station $21_1$ through a path which is the reverse of the foregoing. In response to the K2 byte, the overhead processor $42_1$ of the working terminal station $21_1$ performs switch control to switch the failed transmission line WK1 over to the protection transmission line PTCT, after which the overhead processor $42_1$ receives the OC-48 optical signal through the path indicated by the dashed line.

The foregoing is for a case in which a failure has occurred in the section B. However, switching control is performed in a similar manner also in a case where a failure develops in the section A.

When a failure (indicated by xx) occurs in the transmission line WK2 of the C section, the overhead processor $42_2$ of the working terminal station $21_2$ notifies the automatic protection switching controller (APS CONT) 62 of the content of the failure and the line number via the control line 82. As a result, the automatic protection switching controller 62 instructs the OHB processor $42_0$ of the protection terminal station $21_0$ to send the K1 byte (switching request) to the protection repeater station $71_0$. The OHB processor $42_0$ creates the K1 byte and sends it to the protection repeater station $71_0$. Upon receiving the K1 byte, the OHB processor $43_0$ of the protection repeater station $71_0$ so notifies the automatic protection switching controller 64. When the K1 byte has been accepted, the automatic protection switching controller 64 determines whether the line number (WK2) of the K1 byte agrees with the line number (WK1) which the controller 64 manages. If the two line numbers do not agree, the controller 64 instructs the OHB processor $43_0$ of the protection repeater station $71_0$ to send the received K1 byte to the overhead processor $41_0$ of the protection terminal station $11_0$.

Upon receiving the K1 byte, the overhead processor $41_0$ so notifies the automatic protection switching controller 61. The latter instructs the OHB processor $41_2$ of opposing station $11_2$ of the working terminal station $21_1$, via the control line 81, to perform bridge control, in response to which the working terminal station $11_2$ performs bridge control. The automatic protection switching controllers 61, 62 instruct the OHB processors $41_0$, $42_0$ of the protection terminal stations 110, 210 to perform switching, in response to which the OHB processors $41_0$, $42_0$ effect the connection of the protection transmission line PTCT. The overhead processor $41_2$ of the working terminal station $11_2$ thenceforth sends the K2 byte (Switch Response) to the working terminal station $21_2$ through a path which is the reverse of the foregoing. In response to the K2 byte, the overhead processor $42_2$ of the working terminal station $21_2$ performs switch control to switch the failed transmission line WK2 over to the protection transmission line PTCT, after which the overhead processor $42_2$ receives the OC-48 optical signal via the protection line.

(E) Processing for terminating/passing/rejecting switching request

Figure 16:
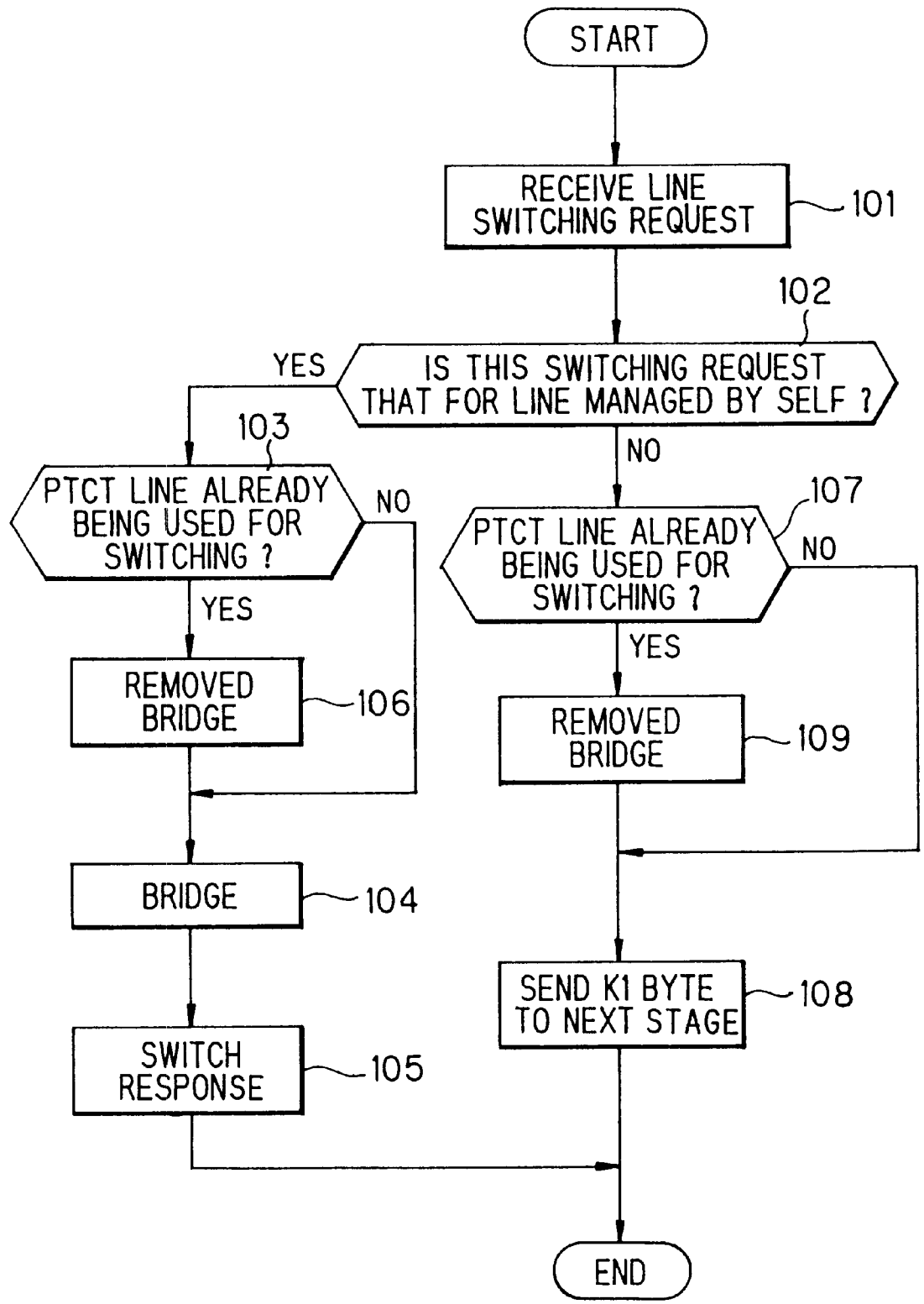
FIG. 16 is a flowchart of processing, which is executed by APS controllers on the left side of a section, when a switching request is received.
Figure 17:
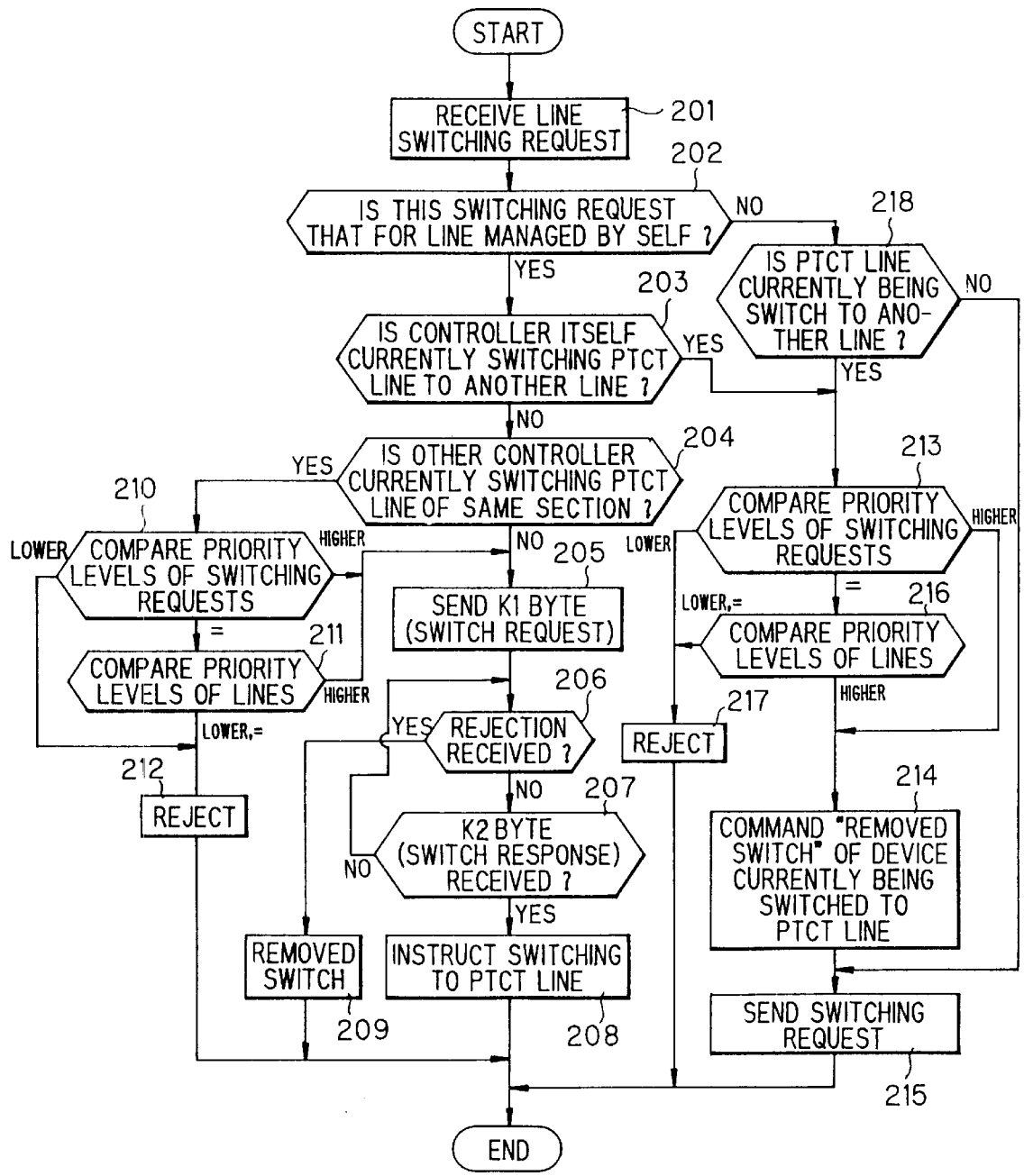
FIG. 17 is a flowchart of processing, which is executed by APS controllers on the left side of a section, when a switching request is received.

FIGS. 16 and 17 are flowcharts of processing for terminating/passing/rejecting a transmission-line switching request, which processing is executed by the automatic protection switching controller in the 1:N nested optical transmission system (FIG. 15). FIG. 16 is a flowchart of processing executed by the automatic protection switching controllers 61, 64 on the left side of a section, and FIG. 17 is a flowchart of processing executed by the automatic protection switching controllers 62, 63 on the right side of a section (a) Processing by automatic protection switching controller on left side When the K1 byte (switching request) serving as the line switching request is received (step 101), the automatic protection switching controller on the left side of a section (e.g., the automatic protection switching controller 64 of FIG. 15) determines whether the switching request is that for a line which it itself manages (step 102). It should be noted that the determination as to whether a line is one managed by the controller 64 itself is performed by comparing the line number of the K1 byte with line numbers stored in the controller's own memory.

If the switching request is that for a line managed by the controller 64 itself, the controller determines whether the protection line PTCT is already being used for switching (step 103). If the protection line PTCT is not already being used for switching, the station opposing the station that issued the K1 byte is instructed to perform bridging (step 104), after which the K2 byte (Switch Response) sent from the opposing station is sent to the station that issued the K1 byte (step 105).

If it is found that at step 103 that the protection line PTCT is already being used for switching, the station used in switching thus far is instructed to perform bridge removal (Removed Bridge) (step 106) and then the station opposing the station that issued the K1 byte is instructed to perform bridging (step 104). Thereafter, the K2 byte (Switch Response) sent from the opposing station is sent to the station that issued the K1 byte (step 105). The reason for removing the bridge (step 106) of the station used for switching thus far is as follows: The automatic protection switching controller 62 on the right side of a section judges the degree of priority of the switching request. If the degree of priority of a switching request generated subsequently is higher than that of the prevailing switching request, the automatic protection switching controller 62 on the right side of the section sends the first-mentioned switching request to the automatic protection switching controller 64 on the left side of the section. If the degree of priority of the switching request generated subsequently is lower than that of the prevailing switching request, the automatic protection switching controller 62 on the right side of the section rejects the first-mentioned switching request. Accordingly, since the degree of priority of the switching request which the automatic protection switching controller 64 receives is higher, the bridge of the station used for switching thus far is removed.

If it is found at step 102 that the switching request is not that of a line which it itself manages, the controller 64 determines whether the protection line PTCT is being used for switching (step 107). If the protection line PTCT is not already being used for switching, then the controller 64 sends the K1 byte (switching request) to the next stage, namely the automatic protection switching controller 63 (step 108). However, if the protection line PTCT is already being used for switching, the station used in switching thus far is instructed to perform bridge removal (Removed Bridge) (step 109) and then the received K1 byte (Switch Request) is sent to the next stage, namely the automatic protection switching controller 63 (step 108).

(b) Processing by automatic protection switching controller on right side

When the K1 byte (Switch Request) serving as the line switching request is received (step 201), the automatic protection switching controller on the right side of a section (e.g., the automatic protection switching controller 63 of FIG. 15) determines whether the switching request is that for a line which it itself manages (step 202). It should be noted that the determination as to whether a line is one managed by the controller 63 itself is performed by comparing the line number of the K1 byte with line numbers stored in the controller's own memory.

If the switching request is that for a line managed by the controller 63 itself, the controller 63 determines whether it itself is currently switching the protection line PTCT to another station (step 203) in the failed section. If such switching is not in progress, then the controller 63 determines whether the other automatic protection switching controller is currently switching the protection line PTCT of the above-mentioned section to another station (step 204).

If the other controller is not performing switching, i.e., if the protection line is free in the above-mentioned section, then the automatic protection switching controller 63 sends the received K1 byte (Switch Request) to the next stage, namely the automatic protection switching controller 61 (step 205).

Thereafter, monitoring is performed (steps 206, 207) to determine whether the switching request has been rejected because of contention for the protection line, namely whether the K2 byte (Reject)) has been received, or whether the K2 byte (Switch Response) has been received without being rejected. If the K2 byte (Switch Response) is received, then the controller 63 sends the K2 byte (Switch Response) to the station that issued the K1 byte and specifies changeover to the protection line PTCT (step 208).

After the changeover to the protection line PTCT is made, the automatic protection switching controller 63 periodically sends the K1 byte (Switch Request) to the next stage, namely the automatic protection switching controller 61. However, if a switching request having a high degree of priority is issued in the meantime, the controller 63 receives the K2 byte (Reject) as a response to the K1 byte (Switch Request) (step 206). In such case, the automatic protection switching controller 63 instructs the station of the protection line in use thus far to perform switch removal (Removed Switch) (step 209).

If it is found at step 204 that the other automatic protection switching controller is currently switching the protection line of the above-mentioned section, then the controller 63 compares the degree of priority of the prevailing switching request with that of the current switching request. More specifically, first the controller 63 (1) determines whether the switching request is due to SF (Signal Failure) or SD (Signal Degrade) and (2) judges the degree of priority (high/low) to compare the degrees of priority of the switching requests (step 210). In a case where the degree of priority of a switching request generated subsequently is higher, the processing from step 205 onward is repeated. In a case where the degrees of priority are found to be the same at step 210, a degree of priority set in advance is compared with that of the line switched (step 211). In a case where the degree of priority of a line for which a switching request is issued subsequently is higher, the processing from step 205 onward is repeated. However, in a case where the degree of priority of a line for which a switching request is issued subsequently is the same as or lower than that of a line having an earlier switching request, the controller 63 sends the K2 byte (Reject) to the station that issued the K1 byte (step 212).

If the controller 63 determines at step 203 that it itself is switching the protection line PTCT for the sake of another station in the above-mentioned section, then the controller 63 compares the degree of priority of the prevailing switching request with that of the current switching request. More specifically, first the controller 63 (1) determines whether the switching request is due to SF (Signal Failure) or SD (Signal Degrade) and (2) judges the degree of priority (high/low) to compare the degrees of priority of the switching requests (step 213).

In a case where the degree of priority of a switching request generated subsequently is higher, the automatic protection switching controller 63 instructs the station of the protection line in use thus far to perform switch removal (Removed Switch) (step 214) and sends the K1 byte (Switch Request) to the next stage, namely the automatic protection switching controller 61 (step 215). In a case where the degrees of priority are found to be the same at step 213, a priority level set in advance is compared with that of the line switched (step 216). In a case where the degree of priority of a line for which a switching request is issued subsequently is higher, the processing from step 214 onward is repeated. However, in a case where the degree of priority of a line for which a switching request is issued subsequently is the same as or lower than that of a line having an earlier switching request, the controller 63 sends the K2 byte (Reject) to the station that issued the K1 byte (step 217).

If the controller 63 determines at step 202 that the switching request is not that for a line which it itself manages, then the controller 63 checks to see whether the protection line PTCT in the failed section is currently being switched to another line (step 218). If the protection line PTCT is not currently being switched, then the controller 63 sends the K1 byte (Switch Request) to the next stage, namely the automatic protection switching controller 61 (step 215). If the protection line PTCT is currently being switched, however, the controller 63 executes processing from step 213 onward.

Figure 18:
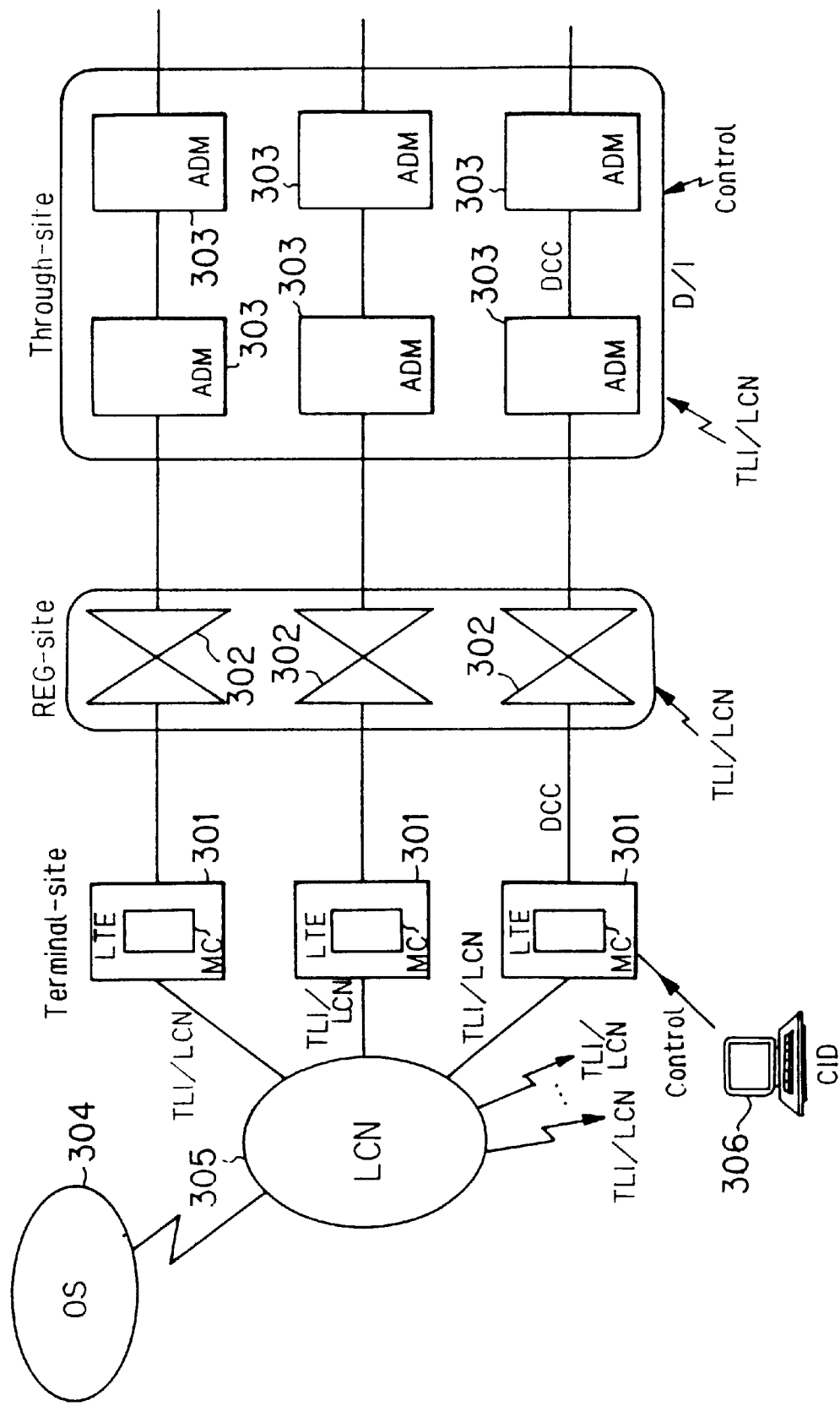
FIG. 18 is a diagram showing the construction of an input system of software and data, etc.

(F) Setting of data in terminal stations, repeater stations and signal regenerators, and various designations FIG. 18 is a diagram of system configuration for a case where data and software are downloaded to terminal stations, repeater stations, and signal regenerators and various designations are made with regard to these stations. Shown in FIG. 18 are terminal stations 301, regenerators 302, repeater stations 303, an operating system (OS) 304, a local communication network (LCN) 305 and a terminal device (CID) 306, such as a personal computer. MC represents a memory card for storing various software and data. Though the memory cards MC are illustrated only in the terminal stations, they are provided in all stations. Further, though the local communication network 305 and terminal device 306 are shown to be connected only to the terminal stations, they are connected to the other stations as well.

The software for switching control, the device modes of the stations, various data such as the WTR time and other software are set in each station from the OS 304 via the local communication network or from the terminal device 306. Each station executes switching control and other types of control in accordance with the set software and data.

(G) Examples of switching control by K1/K2 bytes

FIGS. 19~33 are diagrams for describing switching control by the K1/K2 bytes. The top part of each diagram shows the arrangement of a 1:N nested optical transmission system, and the bottom part of each diagram illustrates the procedure. The 1:N nested optical transmission system in each diagram includes first terminal stations $11_0$~$11_4$ of LTE construction, of which $11_0$ is a protection terminal station and $11_1$~$11_4$ are working terminal stations, and second terminal stations $21_0$~$21_4$, of which $21_0$ is a protection terminal station and $21_1$~$21_4$ are working terminal stations. The system further includes regenerators (REG) $31_2$, $31_4$, $32_3$, $32_4$, working repeater stations $71_1$, $71_3$, $72_1$ placed in the working lines and comprising LNR ADMs or back-to-back connected LTEs, protection repeater stations $71_0$, $72_0$ of LNR ADM construction placed at positions identical with those at which the working repeater stations are located, a protection optical transmission line (protection line) PTCT, and four working optical transmission lines (working lines) WK1~WK4.

The protection terminal station $11_0$ of station A manages all of the working lines WK1~WK4, the protection repeater station $71_0$ of stations B, C manages the working lines WK1, WK3, the protection repeater station $72_0$ of station D manages the working lines WK1, WK2, the protection repeater station $72_0$ of station E manages the working line WK1, and the protection terminal station $21_0$ of station F manages the working lines WK1, WK3, WK4.

(a) During normal operation

Figure 19:
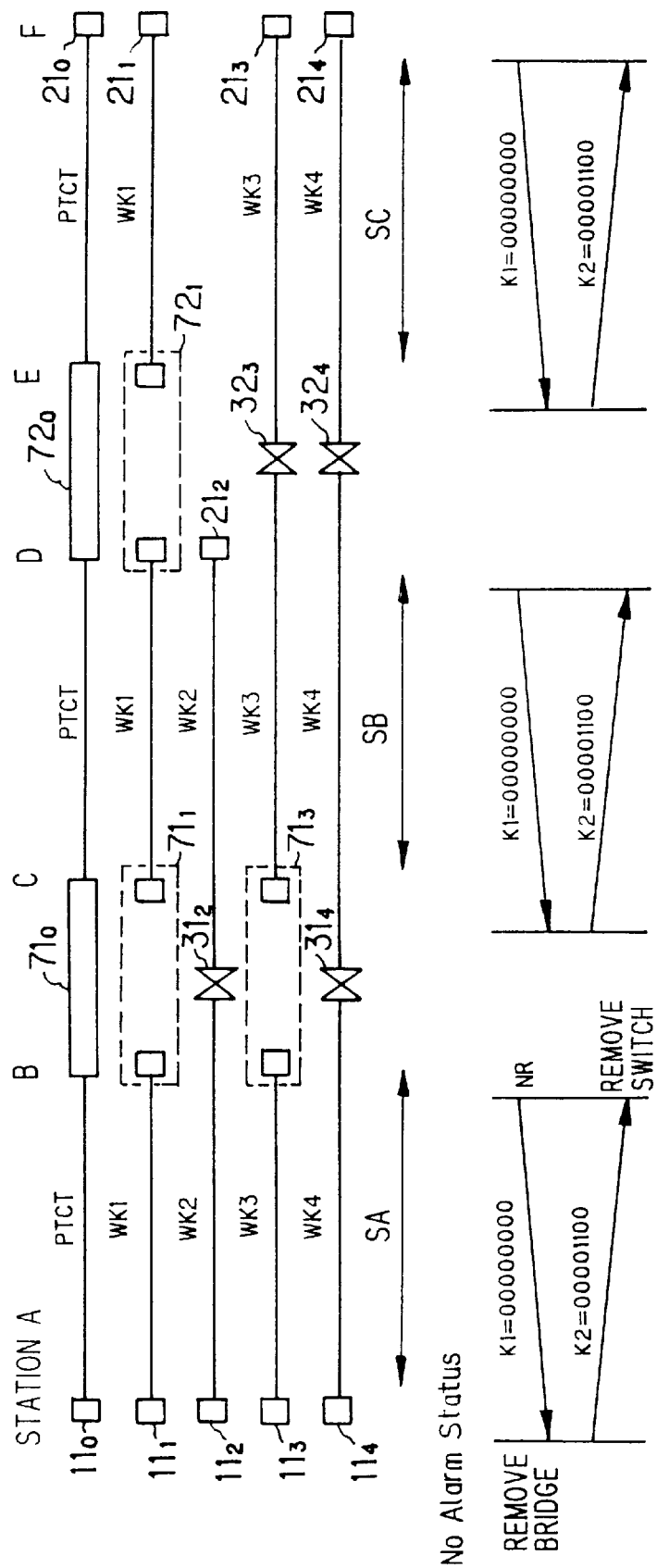
FIG. 19 is a diagram for describing switching control (under normal conditions) based upon K1/K2 bytes.

FIG. 19 is a diagram for describing a procedure for transferring the K1/K2 bytes during normal operation. The K1 byte (No Request: K1=00000000) is sent from the stations on the right side of sections SA, SB, SC to the stations on the left side via the repeater stations of the sections. Upon receiving the K1 byte (No Request), the stations on the left side remove the bridge (Removed Bridge) and send back the K2 byte (=00001100) via the repeater stations.

(b) Self-diagnosis

FIG. 20 is a diagram for describing a procedure for transferring the K1/K2 bytes during self-diagnosis (an exercise). This is a case in which Exercise is outputted from the B station of the working line WK1. In order that self-diagnosis may be performed, the repeater station $71_1$ of the working line WK1 generates the K1 byte (=01000001) and sends the K1 byte to the working terminal station $11_1$, which is the opposing station on the side of the A station, via the protection repeater station $71_0$ and the protection terminal station $11_0$. On the side of the A station, bridge control is not carried out and the K2 byte (=00011100) is simply sent from the working terminal station $11_1$ to the repeater station $71_1$ of the B station. The repeater station $71_1$ performs self-diagnosis in response to acceptance of the K1/K2 bytes.

(c) Manual switching

FIG. 21 is a diagram for describing a procedure for the manual switching of a line. This is a case in which the working terminal station $21_2$ of working line WK2 requests manual changeover. In response to a command from a terminal device or the like to start manual switching, the working terminal station $21_2$ generates the K1 byte (=10000010) and sends the K1 byte to the working terminal station $11_2$, which is the opposing station on the side of the A station, via the protection repeater stations $72_0$, $71_0$ and protection terminal station $11_0$. It should be noted that the B station of the protection repeater station $71_0$ allows the K1 byte to pass through since the working line WK2 is not a line which the B station itself manages. In response to the K1 byte for manual switching, the working terminal station $11_2$ and the protection A, D stations change over internal switches to bridge the working line WK2. Thereafter, the working terminal station $11_2$ sends the K2 byte (switching response) to the working terminal station $21_2$. Upon receiving the K2 byte (switching response), the working terminal station $21_2$ is switched over to the protection line by the working line WK2.

In a case where manual switching is removed, the working terminal station $21_2$ removes the changeover to the protection line and thenceforth sends the K1 byte (=00000000), receives the K2 byte, which is the response to this K1 byte, and ends the manual removal procedure. Concurrently, the protection B station does not receive manual-switching continuation data, as a result of which this station sends the K1 byte (=00000000) to the working terminal station $11_2$. In response to reception of the K1 byte, the working terminal station $11_2$ removes the bridge to the protection line and sends the K2 byte, which is the response to this K2 byte.

(d) Forced switching

FIG. 22 is a diagram for describing a procedure for switching a line by forced switching. This is for a case in which the terminal station $21_2$ of the working line WK2 requests line switching by "Forced Switch". In forced switching, priority level in a case where a switching request has been generated elsewhere is different from that of manual switching; the switching procedure is the same as that for manual switching.

(e) Lockout

Lockout inhibits switching to a designated line. There are two cases, namely a case in which a protection line is locked out and a case in which a working line is locked out.

FIG. 23 is a procedure for a case in which the protection line between stations A and B is locked out. If the protection station B is currently switching, the station B removes switching (Removed Switch) and then sends the lockout K1 byte to the protection A station to remove the bridge on the side of the A station. The station B ends lockout upon receiving the K2 byte, which is the response to K1 byte (lockout), from the side of the A station. It should be noted that sending the K1 byte (No Request) is sufficient to cancel lockout.

FIG. 24 is a procedure for a case in which the working line WK1 between stations A and B is locked out. The repeater station $71_1$ sends the lockout K1 byte (=11110001) to the protection A station via the protection B station and ends lockout of the working line WK1 upon receiving the K2 byte (=00011100), which is the response to the K1 byte (lockout), from the side of the A station.

(f) WTR

FIG. 25 is a diagram for describing a procedure for K1/K2 byte switching control.

When signal status deteriorates in the working line WK2, the working terminal station $21_2$ sends the K1 byte (=10100010; switching request) to the working terminal station $11_2$, which is the opposing station, via the protection D station. Upon receiving the K1 byte of this switching request, the working terminal station $11_2$ bridges the working line WK2 and sends the working terminal station $21_2$ the K2 byte (Switch Response), which is the response to the K1 byte (Switch Request). In response to reception of the K2 byte (Switch Response), the working terminal station $21_2$ switches over from the working line WK2 to the protection line PTCT.

When the working line WK2 is restored, a command for switching back to this line is entered into the working terminal station $21_2$ from a terminal device or the like. In response to the switch-back command, the working terminal station $21_2$ sends the working terminal station $11_2$, which is the opposing station, the K1 byte (=01100010) for maintaining the switched state until elapse of WTR time set in advance. The currently prevailing switched state is thus maintained. After the K2 byte (Keep Switch) is received, the currently prevailing switched state continues.

If the WTR time elapses, the working terminal station $21_2$ removes switching to the protection line and thereafter sends the K1 byte (=00000000), receives the K2 byte, which is the response to this K1 byte, and ends switch-back control. On the other hand, the protection B station does not receive switching continuation data, as a result of which this station removes the bridge to the protection line and sends the K2 byte, which is the response to the above-mentioned K1 byte.

(g) Double failure

FIG. 26 is a diagram for describing a procedure for switching control based upon K1/K2 bytes at the time of double failure.

Assume that after switching is performed in response to occurrence of a failure (x) due to SD (Signal Degrade) in the working line WK1 between stations A and B, a failure (xx) due to SF (Signal Failure) occurs in the working line WK2 between the stations A and D.

When signal status deteriorates in the working line WK1, the working repeater station $71_1$ sends the K1 byte (=10100001; Switch Request) to the working terminal station $11_1$, which is the opposing station, via the protection B station. Upon receiving the K1 byte of this switching request, the working terminal station $11_1$ bridges the working line WK1 and sends the working repeater station $71_1$ the K2 byte (Switch Response), which is the response to the K1 byte (Switch Request). In response to reception of the K2 byte (Switch Response), the working repeater station $71_1$ switches over from the working line WK1 to the protection line PTCT. If the signal vanishes in the working line WK2 under these conditions, the working terminal station $21_2$ sends the K1 byte (=11000010; Switch Request) to the working terminal station $11_2$, which is the opposing station, via the protection D station.

The protection D station executes the processing of FIG. 17 (steps 201~204, 210, 205) and sends the above-mentioned K1 byte to the protection C station. Upon receiving the K1 byte, the protection C station executes the processing of FIG. 16 (steps 101, 102, 107, 108) and sends the K1 byte to the protection B station. The latter executes the processing of FIG. 17 (steps 201, 202, 218 onward). In this case, since the protection line PTCT is currently being switched to the line WK1, the protection B station compares the degree of priority of the switching request thus far with that of the current switching request. Since the degree of priority of the current K1 byte (Switch Request) is higher, the protection B station commands the repeater station $71_1$, which is currently effecting switching to the protection line, to remove switching (Removed Switch) and sends the received K1 byte to the protection A station.

Upon receiving the K1 byte, the protection A station performs the processing of FIG. 16 (steps 101→102→103→106→104→105), commands the working terminal station $11_1$ to perform switching removal (Removed Bridge) and commands the working terminal station $11_2$ to perform bridging. Upon executing bridging control, the working terminal station $11_2$ sends the K2 byte (Switch Response), which is the response to the K1 byte, to the working terminal station $21_2$. Upon receiving the K2 byte (Switch Response), the working terminal station $21_2$ effects changeover from the working line WK2 to the protection line PTCT.

As a result of the foregoing operation, when a switching request having a high degree of priority is subsequently issued, the failed line designated by this switching request is rescued.

(h) Double failure (second example)

FIG. 27 is a diagram for describing a procedure for switching control based upon K1/K2 bytes at the time of double failure in another example.

Assume that after switching is performed in response to occurrence of a failure (x) due to SD (Signal Degrade) in the working line WK2 between stations A and D, a failure (xx) due to SF (Signal Failure) occurs in the working line WK1 between the stations A and B.

When signal status deteriorates in the working line WK2, the working terminal station $21_2$ sends the K1 byte (=10100010; Switch Request) to the working terminal station $11_2$, which is the opposing station, via the protection D station, the protection C station, the protection B station and the protection A station. Upon receiving the K1 byte of this switching request, the working terminal station $11_2$ bridges the working line WK2 and sends the working terminal station $21_2$ the K2 byte (Switch Response), which is the response to the K1 byte (Switch Request). In response to reception of the K2 byte (Switch Response), the working terminal station $21_2$ switches over from the working line WK2 to the protection line PTCT. If the signal vanishes in the working line WK1 under these conditions, the working terminal repeater $71_1$ sends the K1 byte (=11000010; Switch Request) to the working terminal station $11_1$, which is the opposing station, via the protection B station. In this case, when the protection B station receives the K1 byte, the station performs the processing of FIG. 17 (steps 201→202→218→215) upon receiving the K1 byte and sends the K1 byte (=11000010; Switch Request) to the protection A station.

The protection A station performs the processing of FIG. 16 (steps 101→102→103→106→104→105), commands the working terminal station $11_2$ to perform switching removal (Removed Bridge) and commands the working terminal station $11_1$ to perform bridging. Upon executing bridging control, the working terminal station $11_1$ sends the K2 byte (=00011100; Switch Response), which is the response to the K1 byte, to the working repeater station $71_1$. Upon receiving the K2 byte (Switch Response), the working repeater station $71_1$ effects changeover from the working line WK1 to the protection line PTCT.

In parallel with the foregoing, the working terminal station 212 sends the K1 byte (=10100010; Switch Request) to the working terminal station 112 in order to maintain switching. The K1 byte arrives at the protection B station via the protection D station and the protection C station. Upon receiving the K1 byte, the protection B station performs the processing of FIG. 17 (steps 201→202→218 onward). In this case, since the protection line PTCT is currently being switched to the repeater station $71_1$, a "YES" decision is rendered at step 218 and the protection B station compares the degree of priority of the switching request thus far with that of the current switching request. Since the degree of priority of the current K1 byte (Switch Request) is lower, the protection B station creates the K2 byte (=00101011; Reject), which is for the purpose of rejecting acceptance of the K1 byte (=10100010; Switch Request), and sends the K2 byte to the protection D station via the protection C station. When the K2 byte (=00101011; Reject) is received, the protection D station instructs the working terminal station $21_2$ to remove switching (Removed Switch).

As a result of the foregoing operation, when a switching request having a high degree of priority is subsequently issued, the failed line designated by this switching request is rescued.

(i) Double failure (third example)

FIGS. 28 through 33 are diagrams for describing a procedure for switching control based upon K1/K2 bytes at the time of double failure in still another example.

Figure 28:
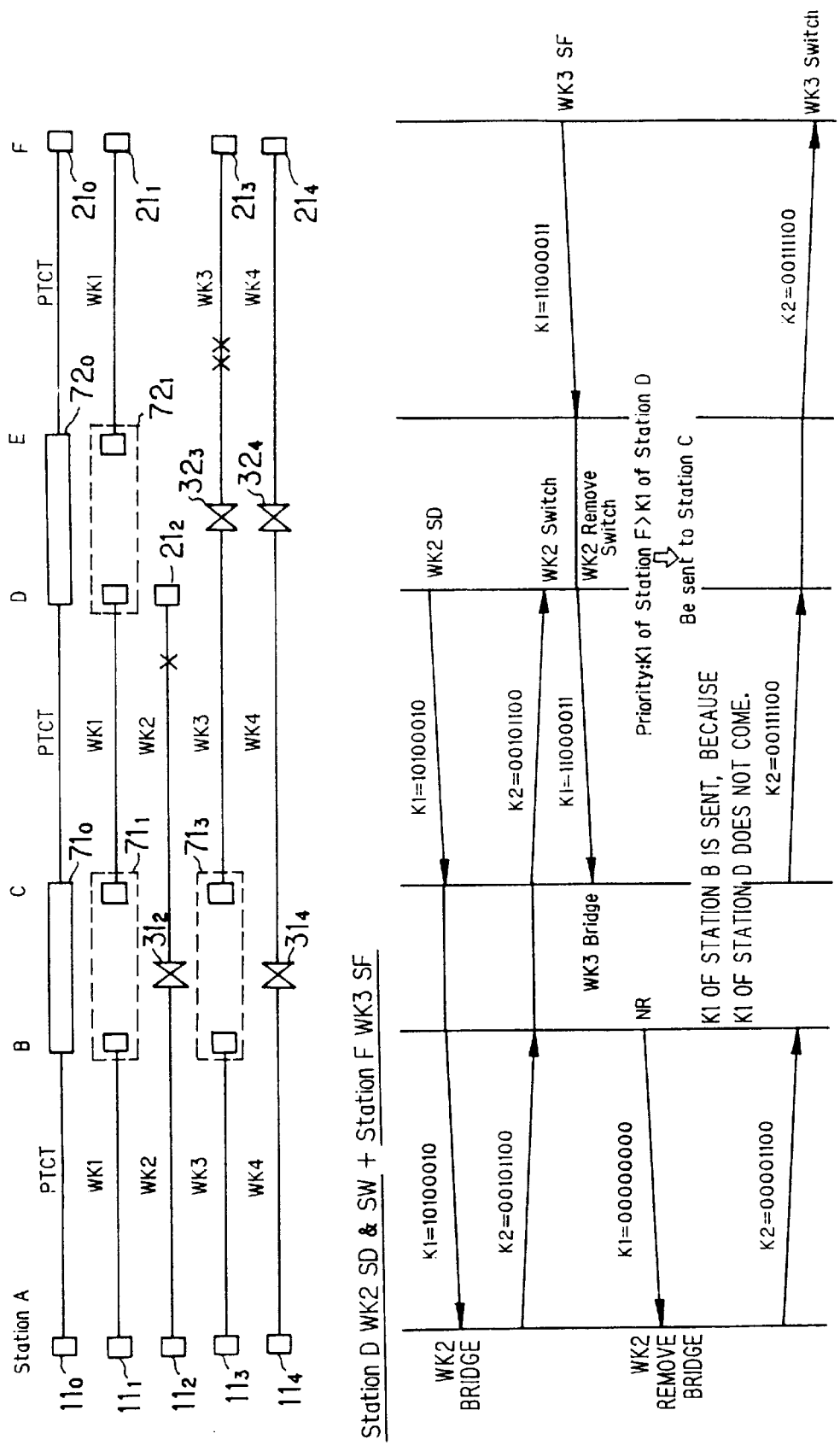
FIG. 28 is a diagram for describing switching control (double failure) based upon K1/K2 bytes.

FIG. 28 is for a case in which, after switching is performed in response to occurrence of a failure (x) due to SD (Signal Degrade) in the working line WK2 between stations A and D, a failure (xx) due to SF (Signal Failure) having a high degree of switching priority occurs in the working line WK3 between the stations C and F. In this case, the protection stations A~F execute the processing of FIGS. 16 and 17 to eventually rescue the working line WK3 designated by the subsequently generated K1 byte (=11000011; Switch Request) having a high degree of switching priority.

FIG. 29 is for a case in which, after switching is performed in response to occurrence of a failure (x) due to SD (Signal Degrade) in the working line WK3 between stations C and F, a failure (xx) due to SF (Signal Failure) having a high degree of switching priority occurs in the working line WK3 between the stations A and D. In this case, the protection stations A~F execute the processing of FIGS. 16 and 17 to eventually rescue the working line WK2 designated by the subsequently generated K1 byte (=11000010; Switch Request) having a high degree of switching priority.

FIG. 30 is for a case in which, after switching is performed in response to occurrence of a failure (x) due to SD (Signal Degrade) in the working line WK1 between stations C and D, a failure (xx) due to SF (Signal Failure) having a high degree of switching priority occurs in the working line WK4 between the stations A and F. In this case, the protection stations A~F execute the processing of FIGS. 16 and 17 to eventually rescue the working line WK4 designated by the subsequently generated K1 byte (=11000100; Switch Request) having a high degree of switching priority.

FIG. 31 is for a case in which, after switching is performed in response to occurrence of a failure (X) due to SD (Signal Degrade) in the working line WK4 between stations A and F, a failure (xx) due to SF (Signal Failure) having a high degree of switching priority occurs in the working line WK1 between the stations A and B. In this case, the protection stations A~F execute the processing of FIGS. 16 and 17 to eventually rescue the working line WK1 designated by the subsequently generated K1 byte (=11000001; Switch Request) having a high degree of switching priority.

FIG. 32 is for a case in which, after switching is performed in response to occurrence of a failure (x) due to SD (Signal Degrade) in the working line WK1 between stations A and B, a failure (xx) due to SD (Signal Degrade) having the same degree of switching priority occurs in the working line WK2 between the stations A and D. In this case, the protection stations A~F execute the processing of FIGS. 16 and 17 to eventually rescue the working line WK1 designated by the K1 byte (=0100001; Switch Request) relating to the initial switching request.

FIG. 33 is a procedure for controlling switching in a case where a failure has occurred during switch-back standby.

A failure (x) occurs in the working line WK4 between the A and F stations, a switch is made to the protection line PTCT and the failed line WK4 is subsequently restored. Though a switch-back request is generated in response to restoration, WTR (wait to restore) is issued and the system puts switch-back on standby for the duration of the WTR time set in advance. If a failure (xx) due to SF (Signal Failure) occurs in the working line WK1 between the A and B stations during such switch-back standby, then switch-back standby is canceled and the failed line is rescued.

(H) Addenda (a) Addendum 1

In the OHB (overhead bytes) stipulated by the SONET standard, the K1/K2 bytes are used to deliver and receive information relating to switching. The K1 byte is used mainly for a switching instruction and the K2 byte is used mainly for the response to the K1 byte.

A 1:N point-to-point system has one switching section, terminal stations are constituted solely by LTEs and repeater stations are constituted solely by REGs. In the SONET standard, only this 1:N point-to-point system is stipulated. The K1/K2 bytes are terminated at terminal stations. There are two types of switching modes, namely a unidirectional mode and a bidirectional mode.

A 1:N nested switching system has a plurality of switching sections between terminal stations at both ends and can have switching sections that differ from line to line. This system is constituted by LTEs, REGs and LNR ADMs. Though an LTE usually is used for a terminal station, it is also possible to use an LNR ADM. In such case the system can be set in such a manner that switching is performed only in the section on one side, with a TL-1 message being used for this setting. By thus using an LNR ADM, future expansion of the system can be performed with ease.

In a case where ADD/DROP of a lower-order group signal is performed by a repeater station, use is made of an LNR ADM or back-to-back connected LTEs to construct the repeater station. A REG is used to construct a repeater station that is not required to perform ADD/DROP. The K1/K2 bytes are terminated by terminal station and by repeater stations that use the LNR ADM. With regard to a repeater station using an LNR ADM, there is a case in which the repeater station terminates a received K1 byte and a case in which the repeater station allows the K1 byte to pass through to the next repeater station. A K1 byte is terminated at a station if it is a K1 byte for a line which this station is managing; otherwise the K1 byte is passed through to the next repeater station. In a case where the section has already been switched over by reason of the fact that the priority of another is higher, the K2 byte is used to notify the station that transmitted the K1 byte of the fact that the K1 byte is to be rejected. The switching mode is unidirectional only.

(b) Addendum 2

According to the WTR (wait to restore) function, switchback is not carried out immediately after issuance of an instruction calling for removal of switching. Rather, switchback is performed a fixed time after issuance of the instruction. This prevents switching noise due to signal instability or problems. The function can be implemented by providing an internal timer. The time can be set using a TL-1 message. It is possible to provide a timer that can be set to a time shorter than the range (5~12 min) stipulated by the SONET standard. This makes it possible to shorten the time needed for a system verification test.

(c) Addendum 3

Management information (the line number of each working line, the line numbers of lines managing switching) that must be stored in the memory of the device can be set from an OS/CID via a TL-1 message. Accordingly, centralized setting from other stations is possible.

(d) Addendum 4

When bridge control is actually carried out during an exercise regarding a line switching function, a PCA signal flowing through the protection line is interrupted. Accordingly, the system of the invention is such that only the operation of optical units within the stations is checked without performing bridging. If operation is normal, the exercise is given a passing grade. In case of abnormal operation, a "failed" decision is rendered.

Self-diagnosis is carried out by verifying, without performing switch control and bridge control and without emitting light from optical units, whether delivery of the K1/K2 bytes is being performed correctly. The exercise is passed if delivery is being performed normally and failed if delivered is being performed abnormally.

(e) Addendum 5

The K1/K2 byte processor (OHB processor) is simultaneously provided with both the function of a nested switching system and the function of a point-to-point switching system, and these modes can be changed at will from an OS/CID via a TL-1 message. If this arrangement is adopted, optimum use can be made of the OHB processor.

(f) Addendum 6

In a 1:N nested switching system, an LNR ADM used in a protection line recognizes the line number of a line which the station itself manages. If a received K1 byte is that for a line managed by the station itself, the K1 byte is terminated. If this is not the case, the K1 byte is allowed to pass through and is sent as is to the next repeater station or terminal station. In the case where the line is not one managed by the station itself, a reject instruction is sent back, via the K2 byte, to the station that transmitted the K1 byte if the section has been switched over and, moreover, the switching priority is high.

(g) Addendum 7

With a station of D/I construction using an LTE, a thru-signal is connected back to back. Consequently, lower-order group shelves are required for all of the lines. However, in a case where use is made of an LNR ADM device, lower-order group shelves for the thru-signal can be curtailed by using a TSA function within the device. Further, with regard also to a signal that is added or dropped, the lower-order group shelves can be halved in comparison with D/Is of LTE construction. By thus using an LNR ADM device, the lower-order group shelves required can be reduced by a wide margin.

(h) Addendum 8

The order of switching priority is stipulated by the SONET standard. However, an order of priority that differs from that stipulated is required depending upon the customer. Accordingly, a function is provided through which the order of priority can be changed from the OS/CID via a TL-1 message, and a change in degree of priority is made possible in response to customer needs so that a flexible order of priority is supported.

(i) Addendum 9

A multiplexer (MUX) of a protection line during ordinary operation executes processing in line with the composition (the absence or presence of concatenation) of a lower-order group signal such as a PCA signal. In a case where switching has occurred, the signal on the line to which the changeover has been made is processed by the MUX of the protection line. Therefore, if the arrangement of the working line and the arrangement of the protection line differ, processing that is not in conformity with the actual signal composition is executed and transmission of the signal is carried out incorrectly. Accordingly, the MUX is provided with a function through which a concatenation signal is checked automatically, thereby making it possible to a switch over automatically from a setting for PCA to a setting from the switched line, this being performed with the occurrence of switching. If this arrangement is adopted, processing can be executed in conformity with the constitution of a lower-order group signal that changes from signal to signal.

(j) Addendum 10

In a case where a modification is made from a 1+1 line switching system to a 1:N line switching system, lock-out control is performed in such a manner that switching will not occur during modification of the system. The construction of the system is changed after lock-out control. Further, when a device mode has been changed, all line information (cross-connections, etc.) is retained. These control operations can be performed from the OS/CID via a TL-1 message and system modification can be implemented without interrupting the main signals.

(k) Addendum 11

With the amount of information currently carried by the K1/K2 bytes, only a switching system having a maximum of 14 working lines can be managed. However, the OHB stipulated by the SONET standard contains undefined bytes (e.g., Z1/Z2 bytes). By using these bytes, the amount of information can be increased to make possible the management of a switching system having 15 or more working lines.

(l) Addendum 12

The switching function usually possessed by an LNR ADM can be changed from an OS/CID by a TL-1 message. Though the usual LNR ADM is capable of managing switching on both EAST and WEST sides, the LNR ADM is provided with a function for limiting this in such a manner that switching is managed on only one side. If this limitation is imposed, the LNR ADM will have a function identical with that of an LTE. As a result, the system can readily be expanded, without increasing the number of shelves, merely by changing the setting for one side, namely the EAST or WEST side, to that for both sides. There is no need to alter the type of system (i.e., to change the LTE device to the LNR ADM device).

Further, when a station having an LNR ADM is placed at the boundary between switching sections, it is possible to change to a setting in which the EAST/WEST changeover is performed independently. In this case, the function becomes the same as the functions possessed by two LTEs. However, future switching between switching sections can be carried out merely by changing the setting, without altering the type of system.

(m) Addendum 13

In a 1:N nested switching system, PCA can be used only in a case where the interval between endmost terminal stations is adopted as the switching section. Consequently, if switching occurs in a certain section, absolutely no use can be made of PCA. In this case, the MUX of the protection line of each repeater station is provided with a function for adding/dropping a lower-order group signal, thereby making it possible to use PCA between repeater stations. As long as switching does not actually occur in this section, PCA can be used. This arrangement makes it possible to use the protection line very efficiently.

(n) Addendum 14

(1) In a case where both a 1:N point-to-point system according to the SONET standard and the original 1:N nested switching system are not both installed on the same firmware, or (2) in a case where a modification is to be made to a nested protocol decided by the SONET standard, it is necessary to replace units in order to achieve system modification. By using a software downloading function, however, system modification can be accomplished without replacing units. Moreover, since settings can be made from an OS/CID using a TL-1 message, the labor involved in system modification can be greatly reduced.

(o) Addendum 15

A multiplexer (MUX) of a protection line during ordinary operation executes processing in line with the composition (the absence or presence of concatenation) of a lower-order group signal such as a PCA signal. In a case where switching has occurred, the signal on the line to which the changeover has been made is processed by the MUX of the protection line. Therefore, if the arrangement of the working line and the arrangement of the protection line differ, processing that is not in conformity with the actual signal composition is executed and transmission of the signal is carried out incorrectly. Accordingly, when switching has occurred, the MUX of the protection line converts a higher-order group signal to an electric signal without carrying out multiplexing or demultiplexing, and then sends the signal to the MUX of the working line as is (as an STS48 signal in this case). As a result, processing can be executed correctly without one's being aware of the type of tributary of each working line.

In an LTE device, REG device and LNR ADM device, it is required that OHB processing in line with the SONET standard, but which differs for each device, be executed. In order to change the device mode in the prior art, therefore, replacement of a unit, referred to as an HS2H, having each OHB processing function is required. Accordingly, if the OHB processing function is provided in the software within the HS2H unit, the device mode can be changed from the OS/CID using the TL-1 message. This means that modification of software is unnecessary.

(p) Addendum 16

The processing route of a K1/K2 command in a back-to-back connected LTE arrangement differs from that of an LNR ADM. In other words, in the back-to-back arrangement, shelf 1 is the east side and shelf 2 is the west side. In an LNR ADM, shelf 1 is east-to-west and shelf 2 is west-to-east. This means that the shelf 1 selves on each line are connected and the shelf 2 shelves on each line are connected to establish a flexible route between K1/K2 devices. It is so arranged that each device transmits a command upon recognizing its own device mode. Further, when shelf 1 of the LNR ADM has received a BRIDGE command, it is possible for shelf 1 to transmit the command to shelf 2 using a connection between devices. By adopting this arrangement, it is possible to mix the back-to-back connection and the LNR ADM in a D/I station.

(q) Addendum 17

The MUX of an LNR ADM device is provided with a thru-function similar to that of the MUX in a REG device, thereby making it possible to use the LNR ADM device as a REG device. Accordingly, by adopting a REG device having the construction of an LNR ADM as a repeater station, a change to a D/I station can be made in simple fashion.

(r) Addendum 18

In the description given above, the higher-order group signal is described as being the OC-48 optical signal. However, the present invention is not limited to the OC-48 signal and is applicable to other signals as well. For example, the invention is applicable to an OC-12 signal or to an OC-192, whose development is planned for the future. Further, in the description given above, lower-order group signals are described as being DS 3, STS-1, OC-3 and OC-12 signals. However, the present invention is not limited to these signals and is applicable to other cases as well.

(s) Addendum 19

By adopting a system configuration in which TL-1 messages (the message grammar of which has been stipulated) are utilized effectively in the manner described above, various settings by a user and switching instructions can be implemented easily and by a procedure in which man-machine systems are unified.

Further, items relating to the 1:N system are described in detail in relation to a point-to-point system in the SONET standard. However, a satisfactory description in relation to a nested switching system is not given in the SONET standard. In accordance with the present invention, line switching in a 1:N nested system can be carried out correctly.

Thus, in accordance with the present invention, it is possible to provide an optical transmission system and a method of controlling the switching of transmission lines which solve the problems encountered with the SONET standard. Specifically, line switching in a 1:N point-to-point system or 1:N nested system can be performed correctly.

In accordance with the present invention, it is possible to arrange it so that a signal (PCA signal) passed utilizing a protection line is not interrupted at execution of an exercise in a working line.

In accordance with the present invention, it is possible to change the priority level of switching priority based upon importance of a failure and the priority level of switching priority based upon importance of a line.

In accordance with the present invention, it is possible to provide 15 or more working lines per system.

In accordance with the present invention, it is possible to provide an optical transmission system and a method of controlling the switching of transmission lines wherein a transmission line is divided into a plurality of sections and the transmission line is changed over accurately in each section.

In accordance with the present invention, it is possible to arrange it that the time of WTR (wait to restore) can be changed at will.

In accordance with the present invention, it is possible to eliminate the problems possessed by the conventional optical transmission systems.

As many apparently widely different embodiments of the present invention can be made without departing from the spirit and scope thereof, it is to be understood that the invention is not limited to the specific embodiments thereof except as defined in the appended claims.

What is claimed is:

1. A 1:N transmission-line switching control method in an optical transmission system, which has N-number of working optical transmission lines and one protection optical transmission line, for sending and receiving data, in accordance with a frame format having overhead, between stations via said transmission lines, and, when a failure has developed in a transmission line, inserting a K1 byte or a K2 byte, which are for transmission-line switching, into the overhead, sending and receiving the K1, K2 bytes between stations via the protection transmission line and switching the failed transmission line to the protection transmission line, said method comprising the steps of:

providing repeater stations in the working transmission lines and providing protection transmission line connecting units, at positions in the protection transmission line corresponding to positions at which said repeater stations are disposed, for switching a failed transmission line to the protection transmission line in every section demarcated by said repeater stations;

providing an overhead processor in each working and protection terminal station, each repeater station, and each protection transmission line connecting unit; and causing the overhead processor of a working terminal station or repeater station that has detected occurrence of failure in an optical transmission line to send the K1 byte to and receive the K2 byte from the overhead processor of an opposing working terminal station or repeater station via the overhead processor of a protection terminal station or protection transmission line connecting unit and switch the failed transmission line section to the protection transmission line, wherein each of said protection transmission line connecting units:

retains numbers of transmission lines which it itself must manage at occurrence of failure of a transmission line;

when the K1 byte (transmission-line switching request) having a switching request level and an overhead byte is employed, together with a transmission-line designating bit of the K1 byte, to designate the number of a transmission line.

2. The method according to claim 1, wherein each of said protection transmission line connecting units:

checks to see whether the protection transmission line is being used if the numbers compared fail to agree;

sends said K1 byte to the succeeding stage if the protection transmission line is not being used;

compares a switching request level of a transmission-line switching request in accordance with which switching has been executed thus far with that of a current transmission-line switching request if the protection transmission line is being used;

if the switching request level of the current transmission-line switching request is lower, notifies, by the K2 byte, the source of issuance of said current transmission-line switching request of the fact that the switching request is to be rejected; and if the switching request level of the current transmission-line switching request is higher, notifies, by the K2 byte, the source of issuance of the transmission-line switching request prevailing thus far of the fact that the switching request is to be rejected.

3. The method according to claim 2, wherein a priority level is added on for each transmission line and, if the switching request level of a transmission-line switching request is identical, a comparison is made with the priority level of the transmission line to determine whether the switching request is to be rejected.

4. The method according to claim 1, wherein:

a priority level is added on for each transmission line and the priority level of a transmission line is set externally so as to become higher than the priority level of the transmission-line switching request;

if the numbers compared fail to agree, it is determined whether the protection transmission line is being used and, if the protection transmission line is not being used, said K1 byte is sent to the succeeding stage;

if the protection transmission line is being used, first the priority levels of the transmission lines are compared in magnitude and then the priority levels of the transmission-line switching requests are compared in magnitude to decide whether the current switching request is to be rejected.

5. The method according to claim 1, wherein an unused overhead byte is employed, together with a transmission-line designating bit of the K1 byte, to designate the number of a transmission line.

6. The method according to claim 1, wherein if self-diagnosis of a transmission-line switching function is performed periodically using the K1, K2 bytes, the protection terminal station or the protection transmission line connecting unit does not perform switching between a working transmission line designated by the K1 byte and the protection transmission line and each working terminal station or each repeater station performs self-diagnosis by monitoring whether or not the K1, K2 bytes are correctly sent and received.

7. The method according to claim 1, wherein when start of self-diagnosis is externally requested for a predetermined working terminal station, the working terminal station performs a bridge control to send optical signals to both working transmission line and protection transmission line, the protection terminal station does not perform connecting the working terminal station to the protection transmission line and performs self-diagnosis by monitoring said optical signals sent to the protection transmission line from the working terminal station at the time of self-diagnosis.

* * * * *